US 008082589B2

(12) United States Patent
Orion et al.

(10) Patent No.: US 8,082,589 B2
(45) Date of Patent: *Dec. 20, 2011

(54) DIAGNOSTIC DATA CAPTURE CONTROL FOR MULTI-DOMAIN PROCESSORS

(75) Inventors: Luc Orion, Mouans Sartoux (FR); David Hennah Mansell, Usk (GB)

(73) Assignee: ARM Limited, Cambridge (GB)

( * ) Notice: Subject to any disclaimer, the term of this patent is extended or adjusted under 35 U.S.C. 154(b) by 991 days.

This patent is subject to a terminal disclaimer.

(21) Appl. No.: 10/714,178

(22) Filed: Nov. 17, 2003

(65) Prior Publication Data
US 2004/0181682 A1 Sep. 16, 2004

(30) Foreign Application Priority Data

Nov. 18, 2002 (GB) .................................. 0226912.4
Feb. 14, 2003 (GB) .................................. 0303449.3

(51) Int. Cl.
*H04N 7/16* (2011.01)
(52) U.S. Cl. ........................................................ 726/27
(58) Field of Classification Search .................. 713/166; 714/14, 24, 26; 717/124, 128
See application file for complete search history.

(56) References Cited

U.S. PATENT DOCUMENTS

| 4,672,572 | A | * | 6/1987 | Alsberg ........................... 726/11 |
| 5,032,979 | A | * | 7/1991 | Hecht et al. ...................... 726/25 |
| 5,117,377 | A | * | 5/1992 | Finman ............................. 703/2 |
| 5,488,688 | A | * | 1/1996 | Gonzales et al. ................ 714/34 |
| 5,933,594 | A | * | 8/1999 | La Joie et al. ................... 714/26 |
| 6,199,181 | B1 | * | 3/2001 | Rechef et al. .................... 714/38 |
| 6,502,176 | B1 | * | 12/2002 | Kobayashi et al. ........... 711/170 |
| 6,574,734 | B1 | * | 6/2003 | Colson et al. .................... 726/21 |
| 6,604,123 | B1 | | 8/2003 | Bruno et al. |
| 6,711,684 | B1 | * | 3/2004 | Moroney et al. ............... 713/191 |
| 6,757,829 | B1 | * | 6/2004 | Laczko et al. ................. 713/187 |
| 6,785,822 | B1 | * | 8/2004 | Sadhwani-Tully .............. 726/28 |
| 7,020,767 | B2 | * | 3/2006 | Alverson et al. ............... 712/227 |
| 2002/0073328 | A1 | * | 6/2002 | Daniels et al. ................. 713/200 |
| 2002/0174333 | A1 | * | 11/2002 | Harrah et al. ................. 713/166 |
| 2002/0188831 | A1 | * | 12/2002 | Jackson et al. ................ 712/227 |

FOREIGN PATENT DOCUMENTS

| EP | 1 054 322 | 11/2000 |
| EP | 1 162 536 | 12/2001 |
| JP | 1987-66214449 | 9/1987 |

(Continued)

OTHER PUBLICATIONS

Trusted Computing Group (TCG), Main Specification Version 1.1a, Sep. 1, 2001, pp. i-x and 1-322.

(Continued)

*Primary Examiner* — Nasser Moazzami
*Assistant Examiner* — Daniel L Hoang
(74) *Attorney, Agent, or Firm* — Nixon & Vanderhye P.C.

(57) ABSTRACT

There is provided a processor operable in a first domain and a second domain, the processor comprising: monitoring logic operable to monitor the processor and capture diagnostic data; a storage element operable to contain at least one control parameter; control logic operable to control the monitoring logic in dependence on the at least one control parameter and the domain in which the processor is operating, to suppress capturing of diagnostic data relating to predetermined activities of the processor in the first domain. In some embodiments the first domain is a secure domain and the second domain is a non-secure domain, the monitoring function being debug or trace.

15 Claims, 56 Drawing Sheets

FOREIGN PATENT DOCUMENTS

| | | |
|---|---|---|
| JP | 833851 | 9/1987 |
| JP | 2002-526822 | 8/2002 |
| JP | 2002-318700 | 10/2002 |
| JP | 2002/318700 | 10/2002 |
| SU | 1453408 | 1/1989 |
| WO | WO 99/38073 | 7/1999 |

OTHER PUBLICATIONS

English translation of Japanese Office Action in corresponding Japanese Application No. 2003-386048 mailed Jul. 7, 2008.
Japanese Office Action in corresponding Japanese Application No. 2003-386048 mailed Jul. 11, 2008.
Related U.S. Appl. No. 10/714,518, filed Nov. 17, 2003, Watt et al.
Related U.S. Appl. No. 10/714,563, filed Nov. 17, 2003, Watt et al.
Related U.S. Appl. No. 10/714,519, filed Nov. 17, 2003, Watt et al.
Related U.S. Appl. No. 10/713,456, filed Nov. 17, 2003, Orion et al.
Related U.S. Appl. No. 10/714,521, filed Nov. 17, 2003, Belnet et al.
Related U.S. Appl. No. 10/714,561, filed Nov. 17, 2003, Watt et al.
Related U.S. Appl. No. 10/714,520, filed Nov. 17, 2003, Belnet et al.
Related U.S. Appl. No. 10/714,483, filed Nov. 17, 2003, Watt et al.
Related U.S. Appl. No. 10/714,516, filed Nov. 17, 2003, Watt et al.
Related U.S. Appl. No. 10/714,484, filed Nov. 17, 2003, Watt et al.
Related U.S. Appl. No. 10/714,562, filed Nov. 17, 2003, Watt et al.
Related U.S. Appl. No. 10/714,560, filed Nov. 17, 2003, Watt et al.
Related U.S. Appl. No. 10/714,565, filed Nov. 17, 2003, Watt et al.
Related U.S. Appl. No. 10/714,482, filed Nov. 17, 2003, Watt et al.
Related U.S. Appl. No. 10/713,454, filed Nov. 17, 2003, Mansell et al.
Related U.S. Appl. No. 10/713,303, filed Nov. 17, 2003, Symes.
Related U.S. Appl. No. 10/714,480, filed Nov. 17, 2003, Watt et al.
Related U.S. Appl. No. 10/714,481, filed Nov. 17, 2003, Watt.

* cited by examiner

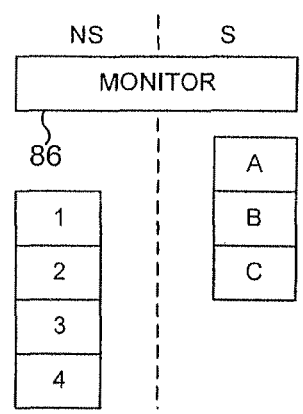
FIG. 3
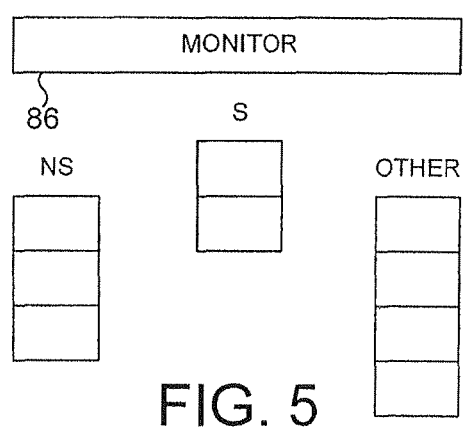
FIG. 4
FIG. 5

| EXCEPTION | VECTOR OFFSET | CORRESPONDING MODE |
|---|---|---|
| RESET | 0x00 | SUPERVISOR MODE |
| UNDEF | 0x04 | MONITOR MODE / UNDEF MODE |
| SWI | 0x08 | SUPERVISOR MODE / MONITOR MODE |
| PREFETCH ABORT | 0x0C | ABORT MODE / MONITOR MODE |
| DATA ABORT | 0x10 | ABORT MODE / MONITOR MODE |
| IRQ / SIRQ | 0x18 | IRQ MODE / MONITOR MODE |
| FIQ | 0x1C | FIQ MODE / MONITOR MODE |
| SMI | 0x20 | UNDEF MODE / MONITOR MODE |

FIG. 14

MONITOR

| RESET | VM0 |
|---|---|
| UNDEF | VM1 |
| SWI | VM2 |
| PREFETCH ABORT | VM3 |
| DATA ABORT | VM4 |
| IRQ / SIRQ | VM5 |
| FIQ | VM6 |
| SMI | VM7 |

SECURE

| RESET | VS0 |
|---|---|
| UNDEF | VS1 |
| SWI | VS2 |
| PREFETCH ABORT | VS3 |
| DATA ABORT | VS4 |
| IRQ / SIRQ | VS5 |
| FIQ | VS6 |
| SMI | VS7 |

NON-SECURE

| RESET | VNS0 |
|---|---|
| UNDEF | VNS1 |
| SWI | VNS2 |
| PREFETCH ABORT | VNS3 |
| DATA ABORT | VNS4 |
| IRQ / SIRQ | VNS5 |
| FIQ | VNS6 |
| SMI | VNS7 |

FIG. 15

| USER | SYSTEM | SUPERVISOR | ABORT | UNDEFINED | INTERRUPT | FAST INTERRUPT | MONITOR |
|---|---|---|---|---|---|---|---|
| R0 | R0 | R0 | R0 | R0 | R0 | R0 | R0 |
| R1 | R1 | R1 | R1 | R1 | R1 | R1 | R1 |
| R2 | R2 | R2 | R2 | R2 | R2 | R2 | R2 |
| R3 | R3 | R3 | R3 | R3 | R3 | R3 | R3 |
| R4 | R4 | R4 | R4 | R4 | R4 | R4 | R4 |
| R5 | R5 | R5 | R5 | R5 | R5 | R5 | R5 |
| R6 | R6 | R6 | R6 | R6 | R6 | R6 | R6 |
| R7 | R7 | R7 | R7 | R7 | R7 | R7 | R7 |
| R8 | R8 | R8 | R8 | R8 | R8 | R8_FIQ | R8 |
| R9 | R9 | R9 | R9 | R9 | R9 | R9_FIQ | R9 |
| R10 | R10 | R10 | R10 | R10 | R10 | R10_FIQ | R10 |
| R11 | R11 | R11 | R11 | R11 | R11 | R11_FIQ | R11 |
| R12 | R12 | R12 | R12 | R12 | R12 | R12_FIQ | R12 |
| R13 | R13 | R13_SVC | R13_ABT | R13_UND | R13_IRQ | R13_FIQ | R13_MON |
| R14 | R14 | R14_SVC | R14_ABT | R14_UND | R14_IRQ | R14_FIQ | R14_MON |
| PC | PC | PC | PC | PC | PC | PC | PC |

| CPSR | CPSR | CPSR | CPSR | CPSR | CPSR | CPSR | CPSR |
|---|---|---|---|---|---|---|---|
|  | SPSR_SVC | SPSR_ABT | SPSR_UND | SPSR_IRQ | SPSR_FIQ | SPSR_MON |

FIG. 22

| INTERRUPT TYPE/PRIORITY | HOW HANDLED |
| --- | --- |
| 1 | S |
| 2 | S |
| 3 | NS |
| 4 | NS/S |
| 5 | NS |
| 6 | NS/S |
| 7 | NS |
| ⋮ | ⋮ |

NO S ONLY HANDLERS LOWER THAN HIGHEST NS HANDLER

| METHOD OF ENTRY | HOW TO PROGRAM? | HOW TO ENTER? | ENTRY MODE |
|---|---|---|---|
| BREAKPOINT HITS | DEBUG TAP OR SOFTWARE (CP14) | PROGRAM BREAKPOINT REGISTER AND/OR CONTEXT-ID REGISTER AND COMPARISONS SUCCEED WITH INSTRUCTION ADDRESS AND/OR CP15 CONTEXT ID ([2]) | HALT/MONITOR ([1]) |
| SOFTWARE BREAKPOINT INSTRUCTION | PUT A BKPT INSTRUCTION INTO SCAN CHAIN 4 (INSTRUCTION TRANSFER REGISTER) THROUGH DEBUG TAP OR USE BKPT INSTRUCTION DIRECTLY IN THE CODE | BKPT INSTRUCTION MUST REACH EXECUTION STAGE | HALT/MONITOR |
| VECTOR TRAP BREAKPOINT | DEBUG TAP | PROGRAM VECTOR TRAP REGISTER AND ADDRESS MATCHES | HALT/MONITOR |
| WATCHPOINT HITS | DEBUG TAP OR SOFTWARE (CP14) | PROGRAM WATCHPOINT REGISTER AND/OR CONTEXT-ID REGISTER AND COMPARISONS SUCCEED WITH INSTRUCTION ADDRESS AND/OR CP15 CONTEXT ID ([2]) | HALT/MONITOR ([1]) |
| INTERNAL DEBUG REQUEST | DEBUG TAP | HALT INSTRUCTION HAS BEEN SCANNED IN | HALT |
| EXTERNAL DEBUG REQUEST | NOT APPLICABLE | EDBGRQ INPUT PIN IS ASSERTED | HALT |

([1]): IN MONITOR MODE, BREAKPOINTS AND WATCHPOINTS CANNOT BE DATA-DEPENDENT.
([2]): THE CORES HAVE SUPPORT FOR THREAD-AWARE BREAKPOINTS AND WATCHPOINTS IN ORDER TO ABLE TO ENABLE SECURE DEBUG ON SOME PARTICULAR THREADS.

FIG. 60

| NAME | MEANING | RESET VALUE | ACCESS | INSERTED IN SCAN CHAIN FOR TEST |
|---|---|---|---|---|
| MONITOR MODE ENABLE BIT | 0: HALT MODE 1: MONITOR MODE | 1 | R/W BY PROGRAMMING THE ICE BY THE JTAG (SCAN 1) •R/W BY USING MRC/MCR INSTRUCTION (CP14) | YES |
| SECURE DEBUG ENABLE BIT | 0: DEBUG IN NON-SECURE WORLD ONLY 1: DEBUG IN SECURE WORLD AND NON-SECURE WORLD | 0 | IN FUNCTIONAL MODE OR DEBUG MONITOR MODE:R/W BY USING MRC/MCR INSTRUCTION (CP14) (ONLY IN SECURE SUPERVISOR MODE) IN DEBUG HALT MODE: NO ACCESS - MCR/MRC INSTRUCTIONS HAVE ANY EFFECT (R/W BY PROGRAMMING THE ICE BY THE JTAG (SCAN 1) IF JSDAEN=1 | NO |
| SECURE TRACE ENABLE BIT | 0: ETM IS ENABLED IN NON-SECURE WORLD ONLY. 1: ETM IS ENABLED IN SECURE WORLD AND NON-SECURE WORLD | 0 | IN FUNCTIONAL MODE OR DEBUG MONITOR MODE:R/W BY USING MRC/MCR INSTRUCTION (CP14) (ONLY IN SECURE SUPERVISOR MODE) IN DEBUG HALT MODE: NO ACCESS - MCR/MRC INSTRUCTIONS HAVE ANY EFFECT (R/W BY PROGRAMMING THE ICE BY THE JTAG (SCAN 1) IF JSDAEN=1 | NO |
| SECURE USER-MODE ENABLE BIT | 0: DEBUG IS NOT POSSIBLE IN SECURE USER MODE 1: DEBUG IS POSSIBLE IN SECURE USER MODE | 1 | IN FUNCTIONAL MODE OR DEBUG MONITOR MODE:R/W BY USING MRC/MCR INSTRUCTION (CP14) (ONLY IN SECURE SUPERVISOR MODE) IN DEBUG HALT MODE: NO ACCESS - MCR/MRC INSTRUCTIONS HAVE ANY EFFECT (R/W BY PROGRAMMING THE ICE BY THE JTAG (SCAN 1) IF JSDAEN=1 | NO |
| SECURE THREAD-AWARE ENABLE BIT | 0: DEBUG IS NOT POSSIBLE FOR A PARTICULAR THREAD 1: DEBUG IS POSSIBLE FOR A PARTICULAR THREAD | 0 | IN FUNCTIONAL MODE OR DEBUG MONITOR MODE:R/W BY USING MRC/MCR INSTRUCTION (CP14) (ONLY IN SECURE SUPERVISOR MODE) IN DEBUG HALT MODE: NO ACCESS - MCR/MRC INSTRUCTIONS HAVE ANY EFFECT (R/W BY PROGRAMMING THE ICE BY THE JTAG (SCAN 1) IF JSDAEN=1 | NO |

FIG. 61

| CP14 BITS IN DEBUG AND STATUS CONTROL REGISTER | | | MEANING |
|---|---|---|---|
| SECURE DEBUG ENABLE BIT | SECURE USER-MODE DEBUG ENABLE BIT | SECURE THREAD-AWARE DEBUG ENABLE BIT | |
| 0 | X | X | NO INTRUSIVE DEBUG IN ENTIRE WORLD IS POSSIBLE. ANY DEBUG REQUEST, BREAKPOINTS, WATCHPOINTS, AND OTHER MECHANISM TO ENTER DEBUG STATE ARE IGNORED IN ENTIRE SECURE WORLD |
| 1 | 0 | X | DEBUG IN ENTIRE SECURE WORLD IS POSSIBLE |
| 1 | 1 | 0 | DEBUG IN SECURE USER-MODE ONLY. ANY DEBUG REQUEST, BREAKPOINTS, WATCHPOINTS, AND OTHER MECHANISM TO ENTER DEBUG STATE ARE TAKEN INTO ACCOUNT IN USER MODE ONLY. (BREAKPOINTS AND WATCHPOINTS LINKED OR NOT TO A THREAD ID ARE TAKEN INTO ACCOUNT). ACCESS IN DEBUG IS RESTRICTED TO WHAT SECURE USER CAN HAVE ACCESS TO. |
| 1 | 1 | 1 | DEBUG IS POSSIBLE ONLY IN SOME PARTICULAR THREADS. IN THAT CASE ONLY THREAD-AWARE BREAKPOINTS AND WATCHPOINTS LINKED TO A THREAD ID ARE TAKEN INTO ACCOUNT TO ENTER DEBUG STATE. EACH THREAD CAN MOREOVER DEBUG ITS OWN CODE, AND ONLY ITS OWN CODE. |

FIG. 69A

| CP14 BITS IN DEBUG AND STATUS CONTROL REGISTER | | | MEANING |
|---|---|---|---|
| SECURE TRACE ENABLE BIT | SECURE USER-MODE DEBUG ENABLE BIT | SECURE THREAD-AWARE DEBUG ENABLE BIT | |
| 0 | X | X | NO OBSERVABLE DEBUG IN ENTIRE SECURE WORLD IS POSSIBLE. TRACE MODULE (ETM) MUST NOT TRACE INTERNAL CORE ACTIVITY |
| 1 | 0 | X | TRACE IN ENTIRE SECURE WORLD IS POSSIBLE |
| 1 | 1 | 0 | TRACE IS POSSIBLE WHEN THE CORE IS IN SECURE USER-MODE ONLY |
| 1 | 1 | 1 | TRACE IS POSSIBLE ONLY WHEN THE CORE IS EXECUTING SOME PARTICULAR THREADS IN SECURE USER MODE. PARTICULAR HARDWARE MUST BE DEDICATED FOR THIS, OR RE-USE BREAKPOINT REGISTER PAIR: CONTEXT ID MATCH MUST ENABLE TRACE INSTEAD OF ENTERING DEBUG STATE |

FIG. 69B

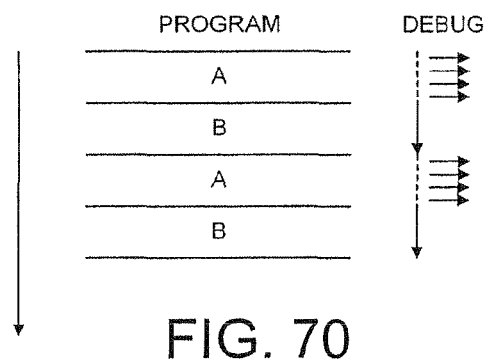

FIG. 70

| METHOD OF ENTRY | ENTRY WHEN IN NON-SECURE WORLD | ENTRY WHEN IN SECURE WORLD |
|---|---|---|
| BREAKPOINT HITS | NON-SECURE PREFETCH ABORT HANDLER | SECURE PREFETCH ABORT HANDLER |
| SOFTWARE BREAKPOINT INSTRUCTION | NON-SECURE PREFETCH ABORT HANDLER | SECURE PREFETCH ABORT HANDLER |
| VECTOR TRAP BREAKPOINT | DISABLED FOR NON-SECURE DATA ABORT AND NON-SECURE PREFETCH ABORT INTERRUPTIONS. FOR OTHER NON-SECURE EXCEPTIONS, PREFETCH ABORT | DISABLED FOR SECURE DATA ABORT AND SECURE PREFETCH ABORT EXCEPTIONS ($^1$). FOR OTHER EXCEPTIONS, SECURE PREFETCH ABORT |
| WATCHPOINT HITS | NON-SECURE DATA ABORT HANDLER | SECURE DATA ABORT HANDLER |
| INTERNAL DEBUG REQUEST | DEBUG STATE IN HALT MODE | DEBUG STATE IN HALT MODE |
| EXTERNAL DEBUG REQUEST | DEBUG STATE IN HALT MODE | DEBUG STATE IN HALT MODE |

($^1$) SEE INFORMATION ON VECTOR TRAP REGISTER ($^2$) NOTE THAT WHEN EXTERNAL OR INTERNAL DEBUG REQUEST IS ASSERTED, THE CORE ENTERS HALT MODE AND NOT MONITOR MODE

FIG. 71A

| METHOD OF ENTRY | ENTRY IN NON-SECURE WORLD | ENTRY IN SECURE WORLD |
|---|---|---|
| BREAKPOINT HITS | NON-SECURE PREFETCH ABORT HANDLER | BREAKPOINT IGNORED |
| SOFTWARE BREAKPOINT INSTRUCTION | NON-SECURE PREFETCH ABORT HANDLER | INSTRUCTION IGNORED ($^1$) |
| VECTOR TRAP BREAKPOINT | DISABLED FOR NON-SECURE DATA ABORT AND NON-SECURE PREFETCH ABORT INTERRUPTIONS. FOR OTHER INTERRUPTION NON-SECURE PREFETCH ABORT | BREAKPOINT IGNORED |
| WATCHPOINT HITS | NON-SECURE DATA ABORT HANDLER | WATCHPOINT IGNORED |
| INTERNAL DEBUG REQUEST | DEBUG STATE IN HALT MODE | REQUEST IGNORED |
| EXTERNAL DEBUG REQUEST | DEBUG STATE IN HALT MODE | REQUEST IGNORED |
| DEBUG RE-ENTRY FROM SYSTEM SPEED ACCESS | NOT APPLICABLE | NOT APPLICABLE |

($^1$) AS SUBSTITUTION OF BKPT INSTRUCTION IN SECURE WORLD FROM NON-SECURE WORLD IS NOT POSSIBLE, NON-SECURE ABORT MUST HANDLE THE VIOLATION.

FIG. 71B

DIAGNOSTIC DATA CAPTURE CONTROL FOR MULTI-DOMAIN PROCESSORS

FIELD OF THE INVENTION

The present invention relates to the field of controlling the monitoring of a processor that operates in different domains and in particular, in certain preferred embodiments, to the control of the debugging and tracing functions of such processors.

DESCRIPTION OF THE PRIOR ART

In order to be able to monitor processors to find any faults that may be present debug and trace applications have been developed. In order for these applications to be able to function properly, these applications have conventionally had access to the entire processor. This is generally needed as it allows the monitoring functions to locate a fault that may be anywhere on the processing system.

With processors that operate in more than one domain, for example, processors that operate in a secure domain and a non-secure domain, allowing a monitoring application access to the entire processor enables it to find a fault located anywhere on the system. However, such a comprehensive monitoring function may also allow data movement or leakage between the two domains. In the case of a secure and a non-secure domain this could potentially provide access to information that should be secure and could therefore introduce a weakness into the security of such a system. However, not allowing debug or trace to access certain parts of a system, makes it difficult, if not impossible, to locate certain faults that may occur in a non-accessible part of the system.

Accordingly, it is desirable to provide an improved way of controlling monitoring functions to enable a processor to be monitored while reducing the risk of data leakage between domains.

SUMMARY OF THE INVENTION

A first aspect of the present invention provides a processor operable in a plurality of modes and a plurality of domains, said plurality of domains comprising a first domain and a second domain, the processor comprising: monitoring logic operable to monitor the processor and capture diagnostic data; a storage element operable to contain at least one control parameter; control logic operable to control the monitoring logic in dependence on the at least one control parameter and the domain in which the processor is operating, to suppress capturing of diagnostic data relating to predetermined activities of the processor in the first domain.

The invention recognises that monitoring functions on a processor that is operable in more than one domain are a potential source of data leakage between domains. However, not allowing monitoring functions access to the entire system may seriously limit the fault-finding abilities of such monitoring functions. The present invention addresses these conflicting problems by enabling the suppression of the capture of diagnostic data during the monitoring of a processor in a first domain in response to a control parameter. By so doing the present invention provides monitoring functions that can operate, but that cannot provide information on certain activities within the first domain, the activities that are hidden being controlled by a control parameter. This degree of control enables a suitable compromise between the conflicting problems of potential data leakage from a first domain and the ability to find faults occurring in the first domain to be obtained. Thus, monitoring functions can be suppressed for activities where data leakage is perceived as being a particular problem and allowed for others.

Preferably, the first domain is a secure domain and the second domain is a non-secure domain, said processor being operable such that when executing a program in a secure mode within said secure domain said program has access to secure data which is not accessible when said processor is operating in a non-secure mode within said non-secure domain.

Embodiments of the present invention are particularly suited to processors having secure and non-secure domains. Providing granularity in the monitoring function enables secure data capture to be suppressed for certain activities where there is a perceived security risk. This thereby removes a possible route through which secure data could leak to the outside world.

In some embodiments the at least one control parameter provides an indication of the domain of operation of the processor, the control logic being operable to suppress capturing of diagnostic data when the processor switches from second to first domain. This embodiment is particularly suited to protect data lying in a particular domain, the capturing of diagnostic data being suppressed when the processor operates in a particular domain and commencing again when the processor switches to another domain.

Alternatively or additionally the control parameter identifies an application, the control logic being operable to suppress capturing of diagnostic data when the processor switches from an identified application in the first domain to an application in the first domain not identified by the at least one control parameter.

In this embodiment we have application specific granularity. This can inhibit data leakage between two applications running in a particular domain. In many circumstances a particular application may be run by one user and another by another. Clearly in some circumstances it is advantageous to be able to inhibit data leakage between applications run by different users.

In some embodiments, the first domain comprises a plurality of modes and the at least one control parameter identifies a particular mode within the first domain, the control logic being operable to suppress capturing of diagnostic data when the processor switches between an identified mode within the first domain and a mode within the first domain not identified by the at least one control parameter. Granularity by mode can also be helpful.

In some embodiments the plurality of modes in the first domain comprise a user mode and a privileged mode. Alternatively they may comprise different applications which may be run by different users, it being important to try to inhibit data leakage both between different users and between a privileged user such as a supervisor and a normal user.

Advantageously, the control logic is operable to control the monitoring logic to resume capturing of diagnostic data when the processor switches back from the predetermined activity to an activity for which capturing of diagnostic data is not suppressed. Thus, the monitoring functions continue to function with the capture of data being intermittently suppressed as the processor enters areas that the control parameter indicates should not be monitored.

The monitoring performed can take a variety of forms but preferably, it comprises a debug function and/or a trace.

Although the control logic can suppress capture of the diagnostic data in a variety of ways, including by software control instructions in secure privileged mode, in some embodiments the control logic suppresses capture of the diagnostic data by removing power input to the monitoring logic. This is a simple and yet sure way of preventing data capture.

A further aspect of the present invention provides a method of controlling a monitoring function operable to capture diagnostic data from a processor, the processor being operable in a plurality of modes and a plurality of domains, said plurality of domains comprising a first domain and a second domain, the method comprising the steps of: setting a control parameter indicative of whether capturing of diagnostic data is allowable; monitoring the processor to capture diagnostic data; suppressing capturing of diagnostic data relating to predetermined activities of the processor in the first domain in dependence on the control parameter.

The present invention will be described further, by way of example only, with reference to preferred embodiments thereof as illustrated in the accompanying drawings, in which:

BRIEF DESCRIPTION OF THE DRAWINGS

FIG. 3 schematically illustrates a matrix of processing modes associated with different security domains;

FIGS. 4 and 5 schematically illustrate different relationships between processing modes and security domains;

FIG. 14 is an example of a vector interrupt table;

FIG. 15 schematically illustrates multiple vector interrupt tables associated with different security domains;

FIGS. 21 to 23 illustrate a view of different processing modes and scenario for switching between secure and non-secure domains in accordance with another example embodiment(s);

FIG. 60 shows possible ways of initiating different monitoring functions;

FIG. 61 shows a table of control values for controlling availability of different monitoring functions;

FIGS. 69A and 69B show a summary of debug granularity;

FIG. 70 schematically illustrates the granularity of debug while it is running; and FIGS. 71A and 71B show monitor debug when debug is enabled in secure world and when it is not enabled respectively.

DESCRIPTION OF THE PREFERRED EMBODIMENTS

Figure 1:
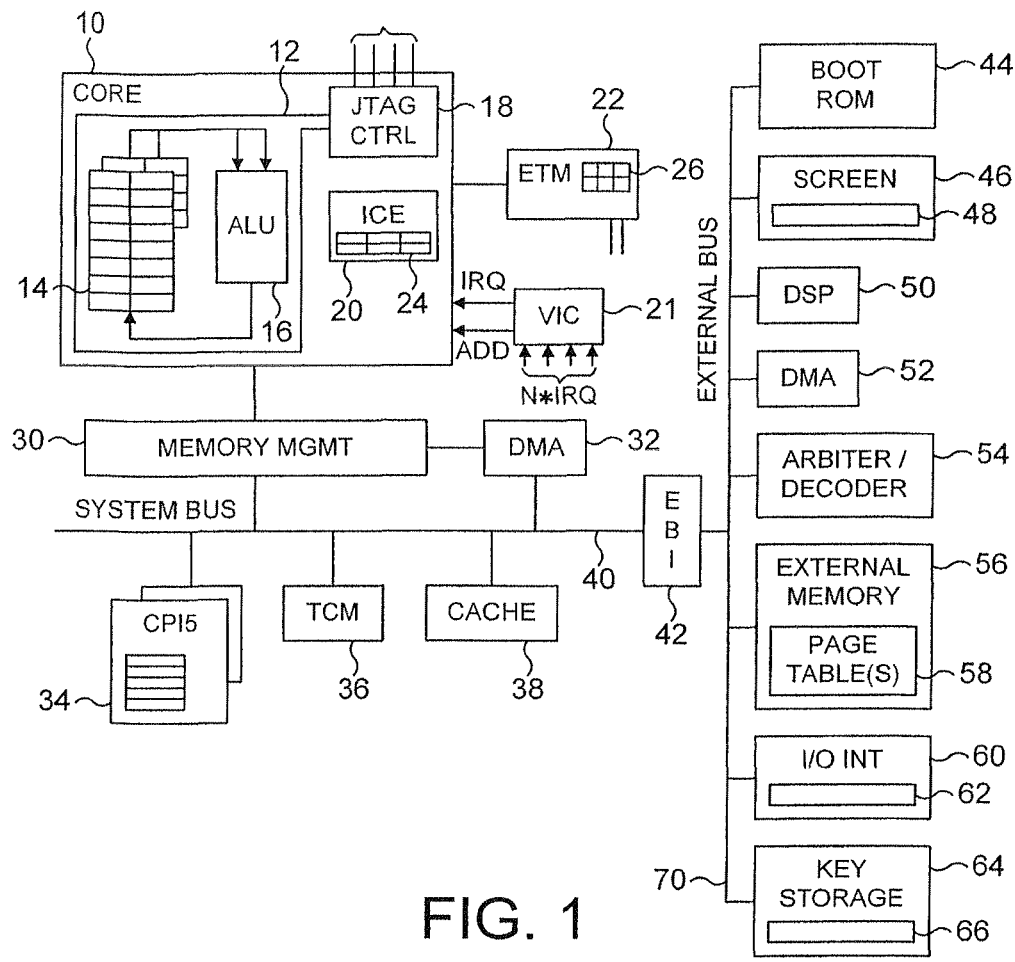
FIG. 1 is a block diagram schematically illustrating a data processing apparatus in accordance with preferred embodiments of the present invention.

FIG. 1 is a block diagram illustrating a data processing apparatus in accordance with preferred embodiments of the present invention. The data processing apparatus incorporates a processor core 10 within which is provided an arithmetic logic unit (ALU) 16 arranged to execute sequences of instructions. Data required by the ALU 16 is stored within a register bank 14. The core 10 is provided with various monitoring functions to enable diagnostic data to be captured indicative of the activities of the processor core. As an example, an Embedded Trace Module (ETM) 22 is provided for producing a real time trace of certain activities of the processor core in dependence on the contents of certain control registers 26 within the ETM 22 defining which activities are to be traced. The trace signals are typically output to a trace buffer from where they can subsequently be analysed. A vectored interrupt controller 21 is provided for managing the servicing of a plurality of interrupts which may be raised by various peripherals (not illustrated).

Further, as shown in FIG. 1, another monitoring functionality that can be provided within the core 10 is a debug function, a debugging application external to the data processing apparatus being able to communicate with the core 10 via a Joint Test Access Group (JTAG) controller 18 which is coupled to one or more scan chains 12. Information about the status of various parts of the processor core 10 can be output via the scan chains 12 and the JTAG controller 18 to the external debugging application. An In Circuit Emulator (ICE) 20 is used to store within registers 24 conditions identifying when the debug functions should be started and stopped, and hence for example will be used to store breakpoints, watchpoints, etc.

The core 10 is coupled to a system bus 40 via memory management logic 30 which is arranged to manage memory access requests issued by the core 10 for access to locations in memory of the data processing apparatus. Certain parts of the memory may be embodied by memory units connected directly to the system bus 40, for example the Tightly Coupled Memory (TCM) 36, and the cache 38 illustrated in FIG. 1. Additional devices may also be provided for accessing such memory, for example a Direct Memory Access (DMA) controller 32. Typically, various control registers 34 will be provided for defining certain control parameters of the various elements of the chip, these control registers also being referred to herein as coprocessor 15 (CP 15) registers.

The chip containing the core 10 may be coupled to an external bus 70 (for example a bus operating in accordance with the "Advanced Microcontroller Bus Architecture" (AMBA) specification developed by ARM Limited) via an external bus interface 42, and various devices may be connected to the external bus 70. These devices may include master devices such as a digital signal processor (DSP) 50, or a direct memory access (DMA) controller 52, as well as various slave devices such as the boot ROM 44, the screen driver 46, the external memory 56, an input/output (I/O) interface 60 or a key storage unit 64. These various slave devices illustrated in FIG. 1 can all be considered as incorporating parts of the overall memory of the data processing apparatus. For example, the boot ROM 44 will form part of the addressable memory of the data processing apparatus, as will the external memory 56. Further, devices such as the screen driver 46, I/O interface 60 and key storage unit 64 will all include internal storage elements such as registers or buffers 48, 62, 66, respectively, which are all independently addressable as part of the overall memory of the data processing apparatus. As will be discussed in more detail later, a part of the memory, e.g. part of external memory 56, will be used to store one or more page tables 58 defining information relevant to control of memory accesses.

As will be appreciated by those skilled in the art, the external bus 70 will typically be provided with arbiter and decoder logic 54, the arbiter being used to arbitrate between multiple memory access requests issued by multiple master devices, for example the core 10, the DMA 32, the DSP 50, the DMA 52, etc, whilst the decoder will be used to determine which slave device on the external bus should handle any particular memory access request.

Whilst in some embodiments, the external bus may be provided externally to the chip containing the core 10, in other embodiments the external bus will be provided on-chip with the core 10. This has the benefit that secure data on the external bus is easier to keep secure than when the external bus is off-chip; when the external bus is off-chip, data encryption techniques may be used to increase the security of secure data.

Figure 2:
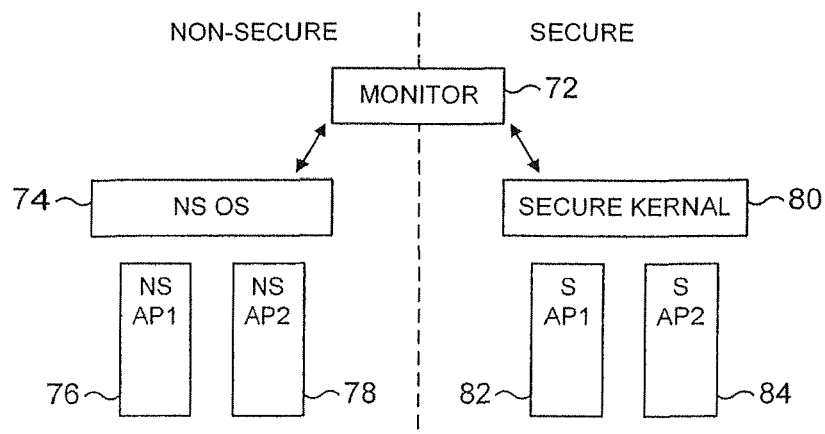
FIG. 2 schematically illustrates different programs operating in a non-secure domain and a secure domain.

FIG. 2 schematically illustrates various programs running on a processing system having a secure domain and a non-secure domain. The system is provided with a monitor program 72 which executes at least partially in a monitor mode. In this example embodiment security status flag is write accessible only within the monitor mode and may be written by the monitor program 72. The monitor program 72 is responsible for managing all changes between the secure domain and the non-secure domain in either direction. From a view external to the core the monitor mode is always secure and the monitor program is in secure memory.

Within the non-secure domain there is provided a non-secure operating system 74 and a plurality of non-secure application programs 76, 78 which execute in co-operation with the non-secure operating system 74. In the secure domain, a secure kernel program 80 is provided. The secure kernel program 80 can be considered to form a secure operating system. Typically such a secure kernel program 80 will be designed to provide only those functions which are essential to processing activities which must be provided in the secure domain such that the secure kernel 80 can be as small and simple as possible since this will tend to make it more secure. A plurality of secure applications 82, 84 are illustrated as executing in combination with the secure kernel 80.

FIG. 3 illustrates a matrix of processing modes associated with different security domains. In this particular example the processing modes are symmetrical with respect to the security domain and accordingly Mode 1 and Mode 2 exist in both secure and non-secure forms.

The monitor mode has the highest level of security access in the system and in this example embodiment is the only mode entitled to switch the system between the non-secure domain and the secure domain in either direction. Thus, all domain switches take place via a switch to the monitor mode and the execution of the monitor program 72 within the monitor mode.

FIG. 4 schematically illustrates another set of non-secure domain processing modes 1, 2, 3, 4 and secure domain processing modes a, b, c. In contrast to the symmetric arrangement of FIG. 3, FIG. 4 shows that some of the processing modes may not be present in one or other of the security domains. The monitor mode 86 is again illustrated as straddling the non-secure domain and the secure domain. The monitor mode 86 can be considered a secure processing mode, since the secure status flag may be changed in this mode and monitor program 72 in the monitor mode has the ability to itself set the security status flag it effectively provides the ultimate level of security within the system as a whole.

FIG. 5 schematically illustrates another arrangement of processing modes with respect to security domains. In this arrangement both secure and non-secure domains are identified as well as a further domain. This further domain may be such that it is isolated from other parts of a system in a way that it does not need to interact with either of the secure domain or non-secure domain illustrated and as such the issue of to which of these it belongs to is not relevant.

Figure 6:
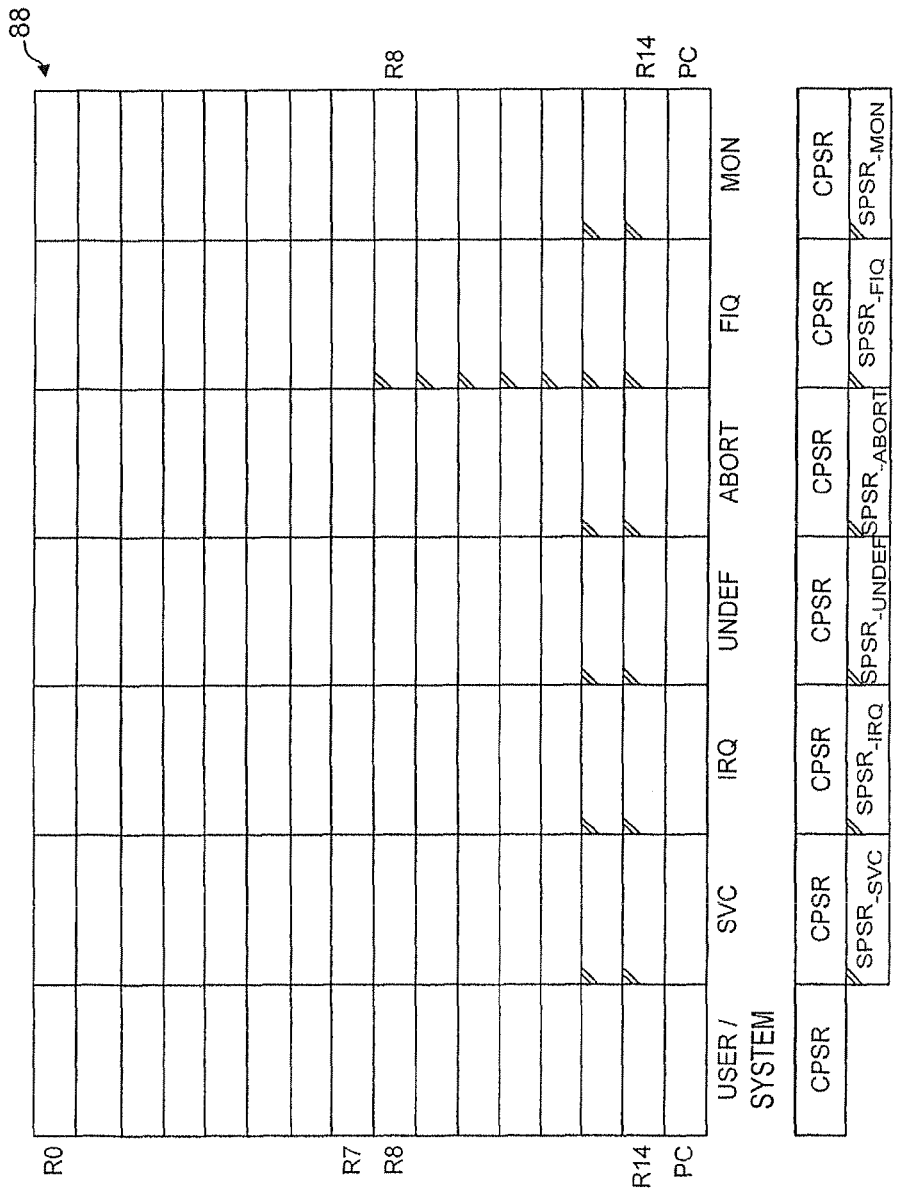
FIG. 6 illustrates one programmer's model of a register bank of a processor depending upon the processing mode.

As will be appreciated a processing system, such as a microprocessor is normally provided with a register bank 88 in which operand values may be stored. FIG. 6 illustrates a programmer's model view of an example register bank with dedicated registers being provided for certain of the register numbers in certain of the processing modes. More particularly, the example of FIG. 6 is an extension of the known ARM register bank (e.g. as provided in ARM7 processors of ARM Limited, Cambridge, England) which is provided with a dedicated saved program status register, a dedicated stack pointer register and a dedicated link register R14 for each processing mode, but in this case extended by the provision of a monitor mode. As illustrated in FIG. 6, the fast interrupt mode has additional dedicated registers provided such that upon entry of the fast interrupt mode there is no need to save and then restore register contents from other modes. The monitor mode may in alternative embodiments also be provided with dedicated further registers in a similar manner to the fast interrupt mode so as to speed up processing of a security domain switch and reduce system latency associated with such switches.

Figure 7:
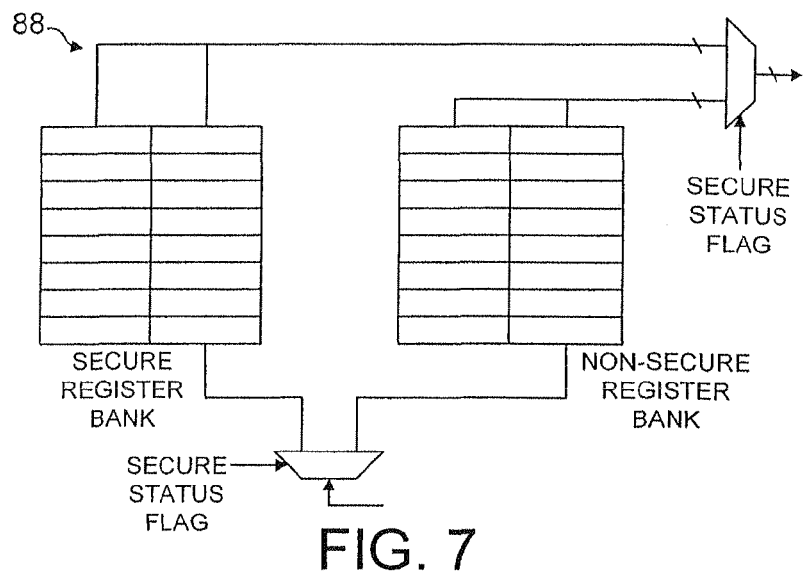
FIG. 7 illustrates an example of providing separate register banks for a secure domain and a non-secure domain.

FIG. 7 schematically illustrates another embodiment in which the register bank 88 is provided in the form of two complete and separate register banks that are respectively used in the secure domain and the non-secure domain. This is one way in which secure data stored within registers operable in the secure domain can be prevented from becoming accessible when a switch is made to the non-secure domain. However, this arrangement hinders the possibility of passing data from the non-secure domain to the secure domain as may be permitted and desirable by using the fast and efficient mechanism of placing it in a register which is accessible in both the non-secure domain and the secure domain.

An important advantage of having secure register bank is to avoid the need for flushing the contents of registers before switching from one world to the other. If latency is not a critical issue, a simpler hardware system with no duplicated registers for the secure domain world may be used, e.g. FIG. 6. The monitor mode is responsible switching from one domain to the other. Restoring context, saving previous context, as well as flushing registers is performed by a monitor program at least partially executing in monitor mode. The system behaves thus like a virtualisation model. This type of embodiment is discussed further below. Reference should be made to, for example, the programmer's model of the ARM7 upon which the security features described herein build.

Processor Modes

Figure 8:
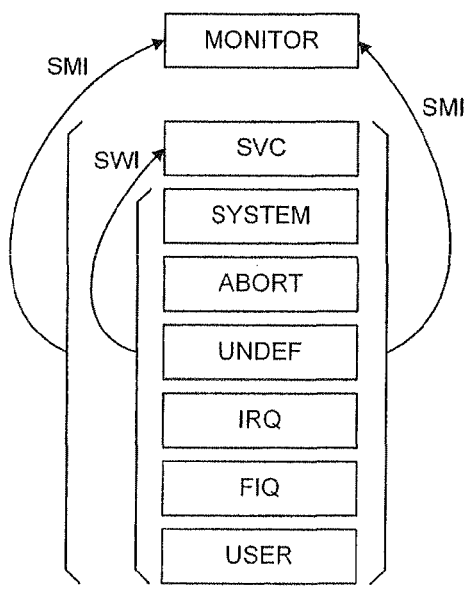
FIG. 8 schematically illustrates a plurality of processing modes with switches between security domains being made via a separate monitor mode.

Instead of duplicating modes in secure world, the same modes support both secure and non-secure domains (see FIG. 8). Monitor mode is aware of the current status of the core, either secure or non-secure (e.g. as read from an S bit stored is a coprocessor configuration register).

In the FIG. 8, whenever an SMI (Software Monitor Interrupt instruction) occurs, the core enters monitor mode to switch properly from one world to the other.

Figure 9:
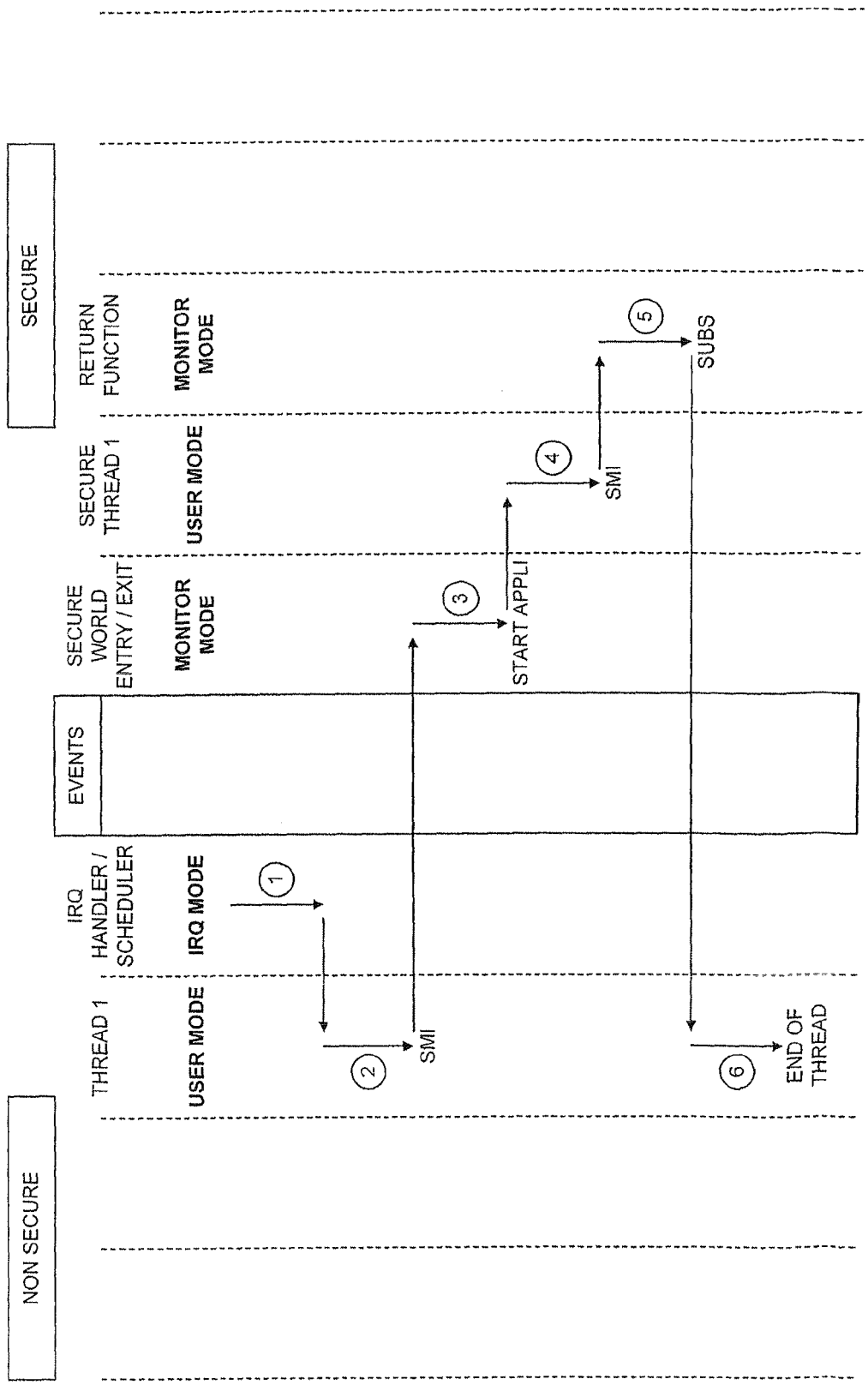
FIG. 9 schematically illustrates a scenario for security domain switching using a mode switching software interrupt instruction.

With reference to FIG. 9 in which SMIs are permitted from user mode:
1. The scheduler launches thread 1
2. Thread 1 needs to perform a secure function =>SMI secure call, the core enters monitor mode. Under hardware control the current PC and CPSR (current processor status register) are stored in R14_mon and SPSR_mon (saved processor status register for the monitor mode) and IRQ/FIQ interrupts are disabled.
3. The monitor program does the following tasks:
   The S bit is set (the secure status flag).
   Saves at least R14_mon and SPSR_mon in a stack so that non-secure context cannot be lost if an exception occurs whilst the secure application is running.
   Checks there is a new thread to launch: secure thread 1. A mechanism (via thread ID table in some example embodiments) indicates that thread 1 is active in the secure world.
   IRQ/FIQ interrupts are re-enabled. A secure application can then start in secure user mode.
4. Secure thread 1 runs until it finishes, then branches (SMI) onto the 'return from secure' function of the monitor program mode (IRQ/FIQ interrupts are then disabled when the core enters monitor mode)
5. The 'return from secure' function does the following tasks:
   indicates that secure thread 1 is finished (e.g., in the case of a thread ID table, remove thread 1 from the table).
   Restore from stack non-secure context and flush required registers, so that no secure data can be read once return has been made to the non-secure domain.
   Then branches back to the non-secure domain with a SUBS instruction (this restores the program counter to the correct point and updates the status flags), restoring the PC (from restored R14_mon) and CPSR (from SPSR_mon). So, the return point in the non-secure domain is the instruction following the previously executed SMI in thread 1.
6. Thread 1 executes until the end, then gives the hand back to the scheduler.

Some of the above functionality may be split between the monitor program and the secure operating system depending upon the particular embodiment.

In other embodiments it may be desired not to allow SMIs to occur in user modes.

Secure World Entry

Reset

When a hardware reset occurs, the MMU is disabled and the ARM core (processor) branches to secure supervisor mode with the S bit set. Once the secure boot is terminated an SMI to go to monitor mode may be executed and the monitor can switch to the OS in non-secure world (non-secure svc mode) if desired. If it is desired to use a legacy OS this can simply boot in secure supervisor mode and ignore the secure state.

SMI Instruction

This instruction (a mode switching software interrupt instruction) can be called from any non-secure modes in the non-secure domain (as previously mentioned it may be desired to restrict SMIs to privileged modes), but the target entry point determined by the associated vector is always fixed and within monitor mode. Its up to the SMI handler to branch to the proper secure function that must be run (e.g. controlled by an operand passed with the instruction).

Passing parameters from non-secure world to secure world can be performed using the shared registers of the register bank within a FIG. 6 type register bank.

When a SMI occurs in non-secure world, the ARM core may do the following actions in hardware:
  Branch to SMI vector (in secure memory access is allowed since you will now be in monitor mode) into monitor mode
  Save PC into R14_mon and CPSR into SPSR_mon
  Set the S bit using the monitor program
  Start to execute secure exception handler in monitor mode (restore/save context in case of multi-threads)
  Branch to secure user mode (or another mode, like svc mode) to execute the appropriate function
  IRQ and FIQ are disabled while the core is in monitor mode (latency is increased)

Secure World Exit

There are two possibilities to exit secure world:
  The secure function is finished and we return into previous non-secure mode that had called this function.
  The secure function is interrupted by a non-secure exception (e.g. IRQ/FIQ/SMI).

Normal End of Secure Function

The secure function terminates normally and we need to resume an application in the non-secure world at the instruction just after the SMI. In the secure user mode, a 'SMI' instruction is performed to return to monitor mode with the appropriate parameters corresponding to a 'return from secure world' routine. At this stage, the registers are flushed to avoid leakage of data between non-secure and secure worlds, then non-secure context general purpose registers are restored and non-secure banked registers are updated with the value they had in non-secure world. R14_mon and SPSR_mon thus get the appropriate values to resume the non-secure application after the SMI, by executing a 'MOVS PC, R14' instruction.

Exit of Secure Function Due to a Non-Secure Exception

In this case, the secure function is not finished and the secure context must be saved before going into the non-secure exception handler, whatever the interrupts are that need to be handled.

Secure Interrupts

There are several possibilities for secure interrupts.

Two possible solutions are proposed which depend on:
  What kind of interrupt it is (secure or non-secure)
  What mode the core is in when the IRQ occurs (either in secure or in non-secure world)

Solution One

In this solution, two distinct pins are required to support secure and non-secure interrupts.
  While in Non Secure world, if
    an IRQ occurs, the core goes to IRQ mode to handle this interrupt as in ARM cores such as the ARM7
    a SIRQ occurs, the core goes to monitor mode to save non-secure context and then to a secure IRQ handler to deal with the secure interrupt.

While in Secure world, if
 an SIRQ occurs, the core goes to the secure IRQ handler. The core does not leave the secure world
 an IRQ occurs, the core goes to monitor mode where secure context is saved, then to a non-secure IRQ handler to deal with this non-secure interrupt.

Figure 10:
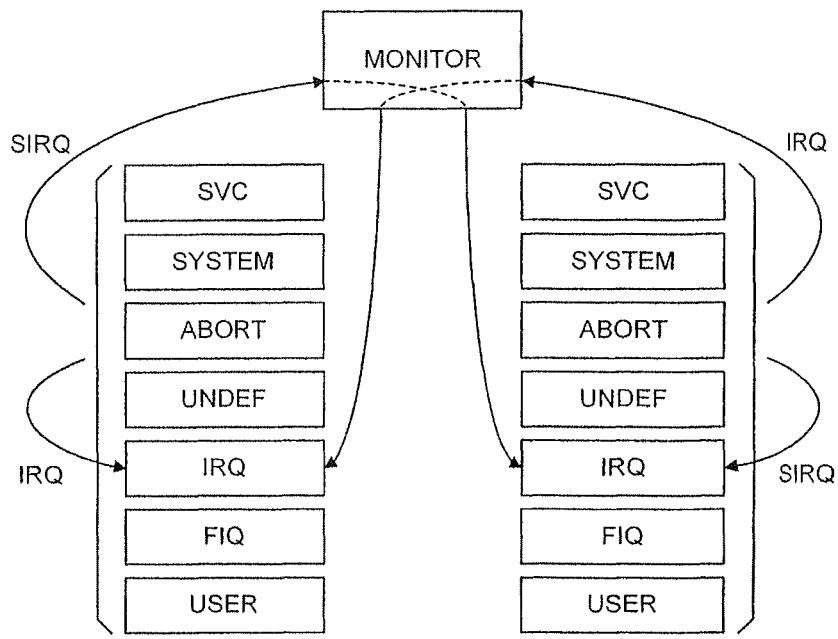
FIG. 10 schematically illustrates one example of how non-secure interrupt requests and secure interrupt requests may be processed by the system.

In other words, when an interrupt that does not belong to the current world occurs, the core goes directly to monitor mode, otherwise it stays in the current world (see FIG. 10).

Figure 11A:
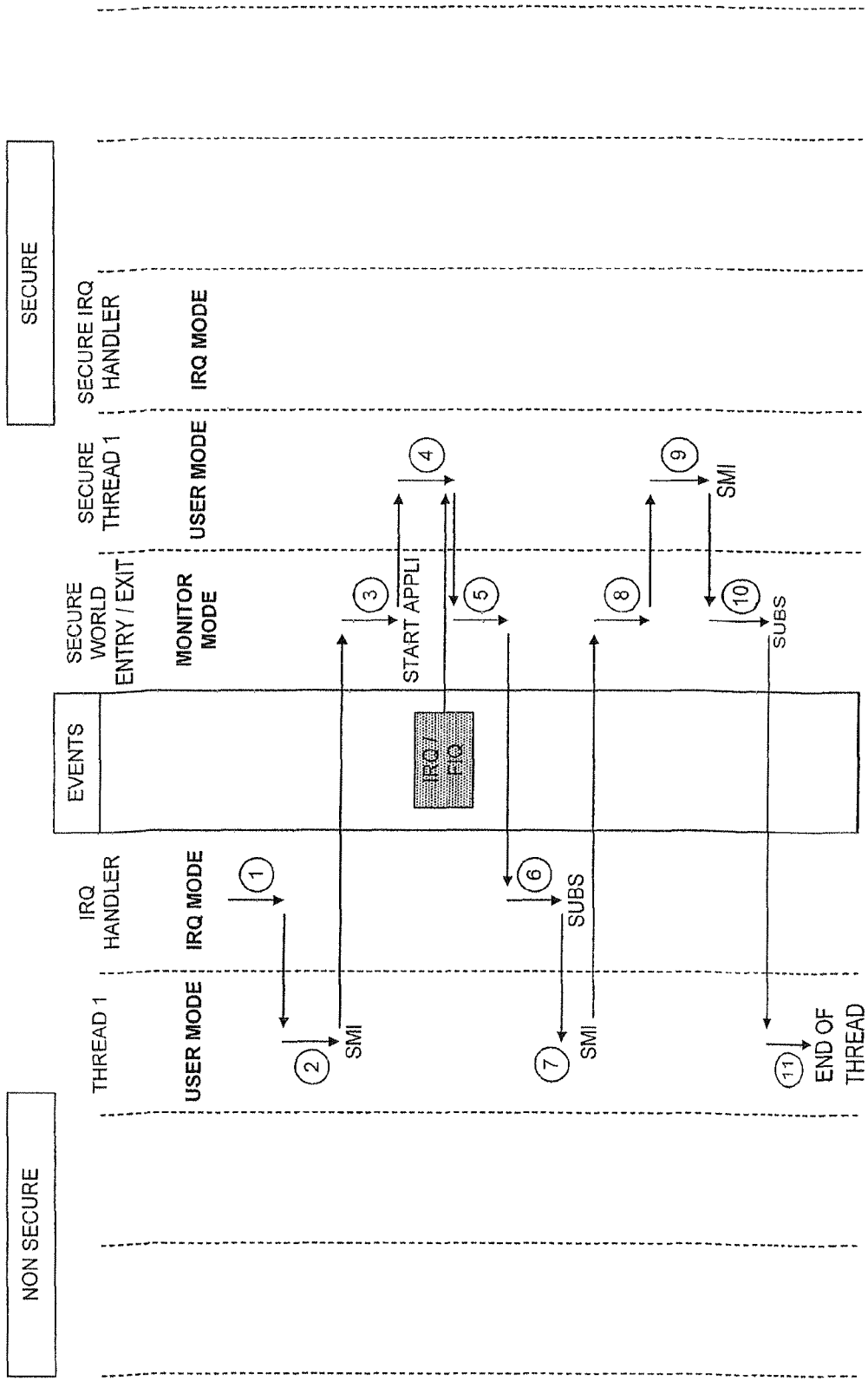
FIGS. 11A and 11B schematically illustrate an example of non-secure interrupt request processing and an example of secure interrupt request processing in accordance with FIG. 10.

IRQ Occurring in Secure World
See FIG. 11A:
1. The scheduler launches thread 1.
2. Thread 1 needs to perform a secure function =>SMI secure call, the core enters monitor mode. Current PC and CPSR are stored in R14_mon and SPSR_mon, IRQ/FIQ are disabled.
3. The monitor handler (program) does the following tasks:
   The S bit is set.
   Saves at least R14_mon and SPSR_mon in a stack (and possibly other registers are also pushed) so that non-secure context cannot be lost if an exception occurs whilst the secure application is running.
   Checks there is a new thread to launch: secure thread 1. A mechanism (via thread ID table) indicates that thread 1 is active in the secure world.
   Secure application can then start in the secure user mode. IRQ/FIQ are then re-enabled.
4. An IRQ occurs while secure thread 1 is running. The core jumps directly to monitor mode (specific vector) and stores current PC in R14_mon and CPSR in SPSR_mon in monitor mode, (IRQ/FIQ are then disabled).
5. Secure context must be saved, previous non-secure context is restored. The monitor handler may be to IRQ mode to update R14_irq/SPSR_irq with appropriate values and then passes control to a non-secure IRQ handler.
6. The IRQ handler services the IRQ, then gives control back to thread 1 in the non-secure world. By restoring SPRS_irq and R14_irq into the CPSR and PC, thread 1 is now pointing onto the SMI instruction that has been interrupted.
7. The SMI instruction is re-executed (same instruction as 2).
8. The monitor handler sees this thread has previously been interrupted, and restores the thread 1 context. It then branches to secure thread 1 in user mode, pointing onto the instruction that has been interrupted.
9. Secure thread 1 runs until it finishes, then branches onto the 'return from secure' function in monitor mode (dedicated SMI).
10. The 'return from secure' function does the following tasks:
    indicates that secure thread 1 is finished (i.e., in the case of a thread ID table, remove thread 1 from the table).
    restore from stack non-secure context and flush required registers, so that no secure data can be read once a return is made to non-secure world.
    branches back to the non-secure world with a SUBS instruction, restoring the PC (from restored R14_mon) and CPSR (from SPSR_mon). So, the return point in the non-secure world should be the instruction following the previously executed SMI in thread 1.
11. Thread 1 executes until the end, then gives control back to the scheduler.

Figure 11B:
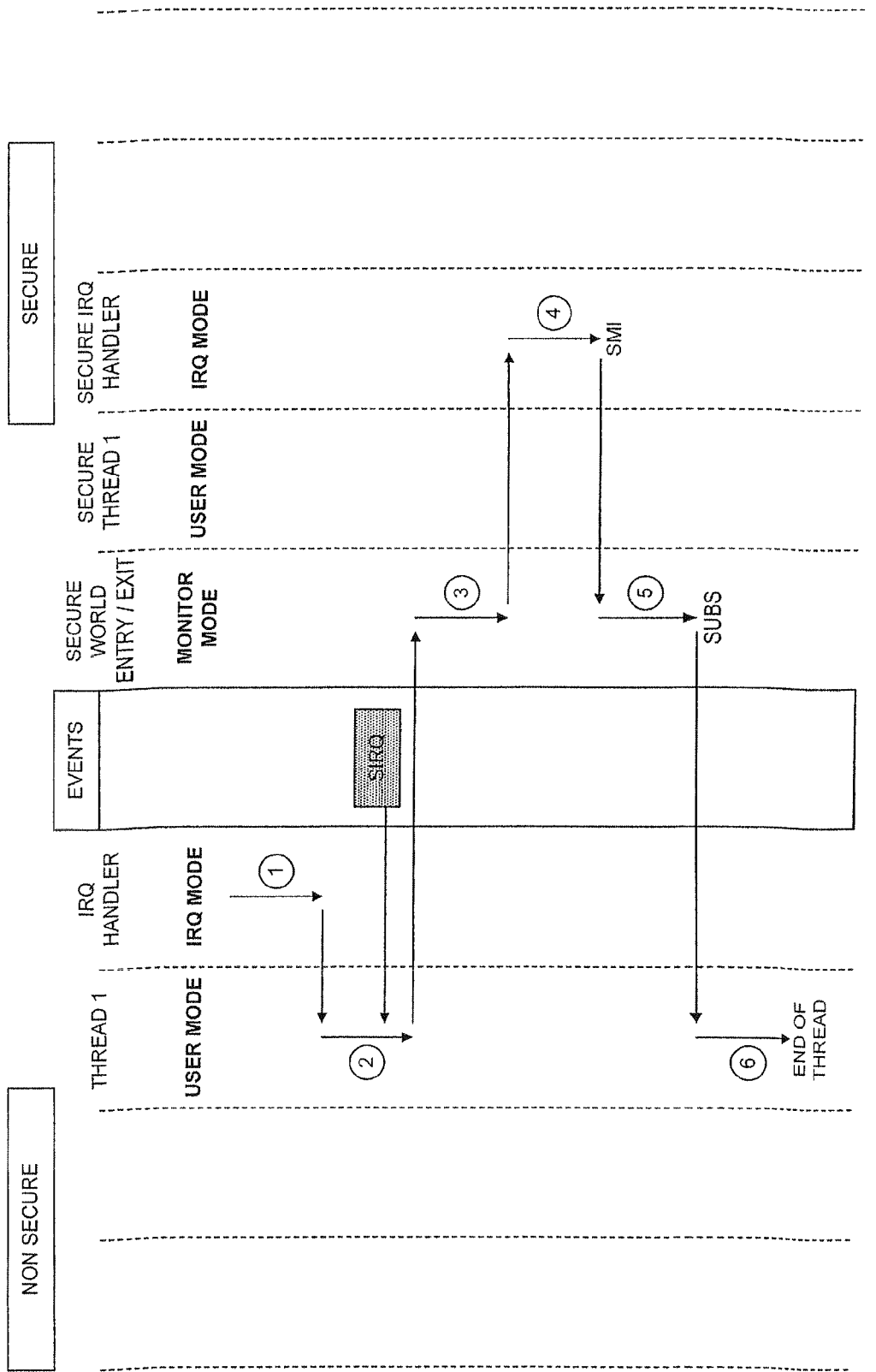

SIRQ Occurring in Non-Secure World
See FIG. 11B:
1. The schedule launches thread 1
2. A SIRQ occurs while secure thread 1 is running. The core jumps directly to monitor mode (specific vector) and stores current PC in R14_mon and CPSR in SPSR_mon in monitor mode, IRQ/FIQ are then disabled.
3. Non-Secure context must be saved, then the core goes to a secure IRQ handler.
4. The IRQ handler services the SIRQ, then gives control back to the monitor mode handler using an SMI with appropriate parameters.
5. The monitor handler restores non-secure context so that a SUBS instruction makes the core return to the non-secure world and resumes the interrupted thread 1.
6. Thread 1 executes until the end, then gives the hand back to the scheduler.

The mechanism of FIG. 11A has the advantage of providing a deterministic way to enter secure world. However, there are some problems associated with interrupt priority: e.g. while a SIRQ is running in secure interrupt handler, a non-secure IRQ with higher priority may occur. Once the non-secure IRQ is finished, there is a need to recreate the SIRQ event so that the core can resume the secure interrupt.

Solution Two

In this mechanism (See FIG. 12) two distinct pins, or only one, may support secure and non-secure interrupts. Having two pins reduces interrupt latency.

While in Non Secure world, if
 an IRQ occurs, the core goes to IRQ mode to handle this interrupt like in ARM7 systems
 a SIRQ occurs, the core goes to an IRQ handler where an SMI instruction will make the core branch to monitor mode to save non-secure context and then to a secure IRQ handler to deal with the secure interrupt.

While in a Secure world, if
 a SIRQ occurs, the core goes to the secure IRQ handler. The core does not leave the secure world
 an IRQ occurs, the core goes to the secure IRQ handler where an SMI instruction will make the core branch to monitor mode (where secure context is saved), then to a non-secure IRQ handler to deal with this non-secure interrupt.

Figure 13A:
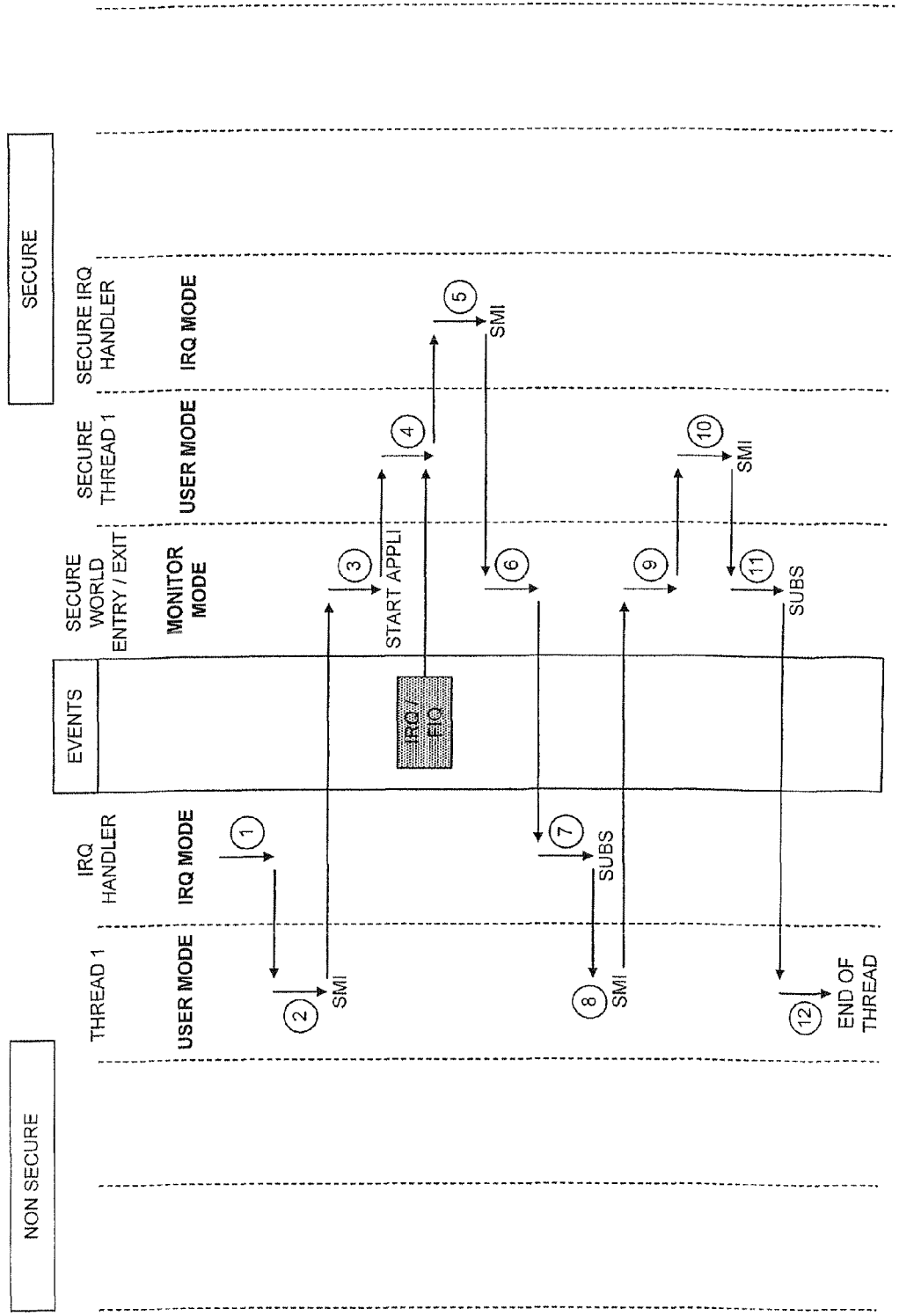
FIGS. 13A and 13B illustrate example scenarios for dealing with a non-secure interrupt request and a secure interrupt request in accordance with the scheme illustrated in FIG. 12.

IRQ Occurring In Secure World
See FIG. 13A:
1. The schedule launches thread 1.
2. Thread 1 needs to perform a secure function =>SMI secure call, the core enters monitor mode. Current PC and CPSR are stored in R14_mon and SPSR_mon, IRQ/FIQ are disabled.
3. The monitor handler does the following tasks:
   The S bit is set.
   Saves at least R14_mon and SPSR_mon in a stack (eventually other registers) so that non-secure context cannot be lost if an exception occurs whilst the secure application is running.
   Checks there is a new thread to launch: secure thread 1. A mechanism (via thread ID table) indicates that thread 1 is active in the secure world.
   Secure application can then start in the secure user mode. IRQ/FIQ are re-enabled.
4. An IRQ occurs while secure thread 1 is running. The core jumps directly to secure IRQ mode.
5. The core stores current PC in R14_irq and CPSR in SPSR_irq. The IRQ handler detects this is a non-secure interrupt and performs a SMI to enter monitor mode with appropriate parameters.
6. Secure context must be saved, previous non-secure context is restored. The monitor handler knows where the SMI came from by reading the CPSR. It can also go to IRQ mode to read R14_irq/SPSR_irq to save properly secure context. If can also save in these same registers the non-secure context that must be restored once the IRQ routine will be finished.
7. The IRQ handler services the IRQ, then gives control back to thread 1 in the non-secure world. By restoring SPRS_irq and R14_irq into the CPSR and PC, the core is now pointing onto the SMI instruction that has been interrupted.
8. The SMI instruction is re-executed (same instruction as 2).
9. The monitor handler sees this thread has previously been interrupted, and restores the thread 1 context. It then branches to secure thread 1 in user mode, pointing to the instruction that has been interrupted.
10. Secure thread 1 runs until it finishes, then branches onto the 'return from secure'; function in monitor mode (dedicated SMI).
11. The 'return from secure' function does the following tasks:
    indicates that secure thread 1 is finished (i.e., in the case of a thread ID table, remove thread 1 from the table).
    restores from stack non-secure context and flushes required registers, so that no secure information can be read once we return in non-secure world.
    branches back to the non-secure world with a SUBS instruction, restoring the PC (from restored R14_mon) and CPSR (from SPSR_mon). The return point in the non-secure world should be the instruction following the previously executed SMI in thread 1.
12. Thread 1 executes until the end, then gives the hand back to the scheduler.

Figure 13B:
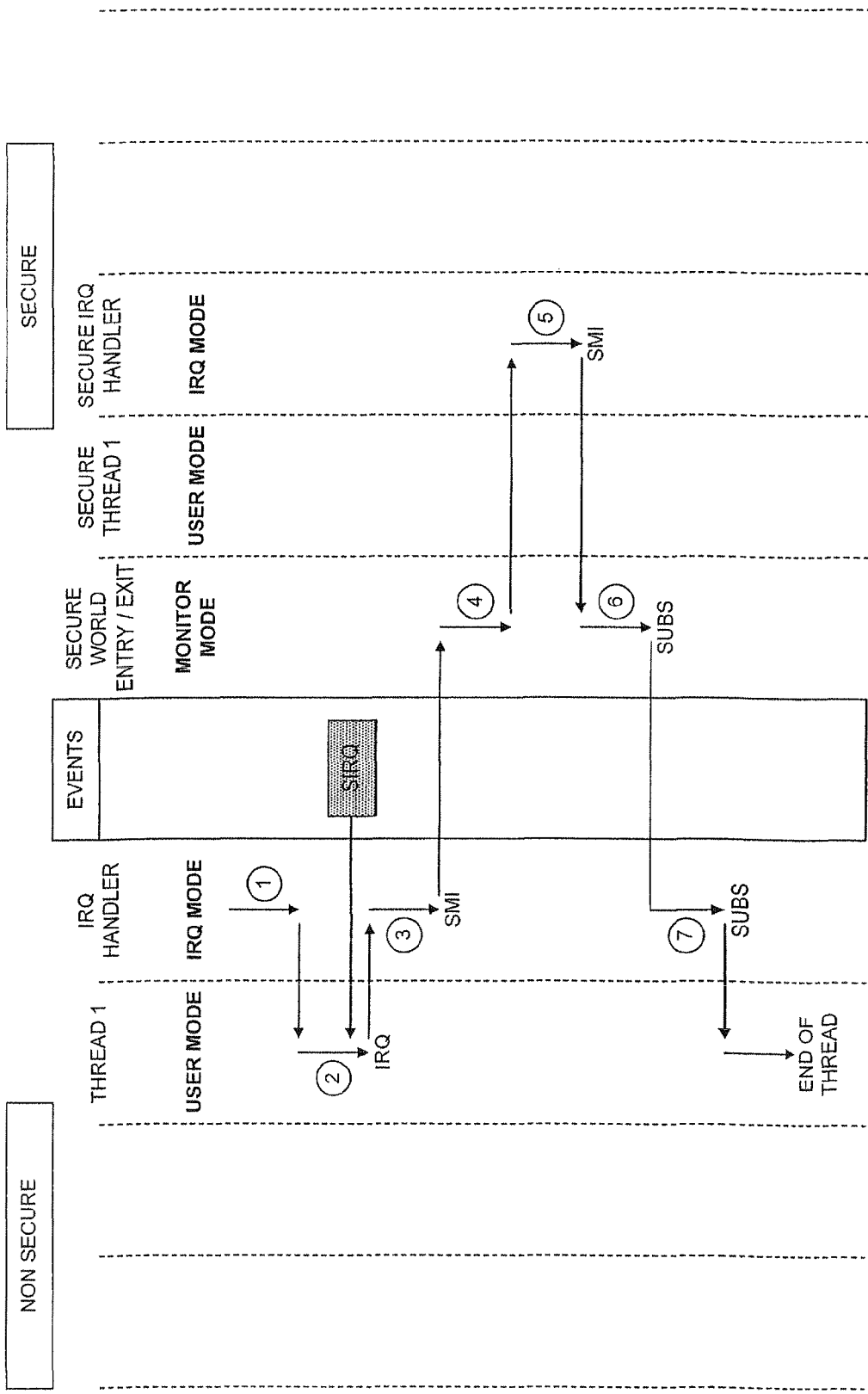

SIRQ Occurring in Non-Secure World
See FIG. 13B:
1. The schedule launches thread 1.
2. A SIRQ occurs while secure thread 1 is running.
3. The core jumps directly irq mode and stores current PC in R14_irq and CPSR in SPSR_irq. IRQ is then disabled. The IRQ handler detects this is a SIRQ and performs a SMI instruction with appropriate parameters.
4. Once in monitor mode, non-secure context must be saved, then the core goes to a secure IRQ handler.
5. The secure IRQ handler services the SIRQ service routine, then gives control back to monitor with SMI with appropriate parameters.
6. The monitor handler restores non-secure context so that a SUBS instruction makes the core returns to non-secure world and resumes the interrupted IRQ handler.
7. The IRQ handler may then return to the non-secure thread by performing a SUBS.
8. Thread 1 executes until the end, then gives control back to the scheduler.

Figure 12:
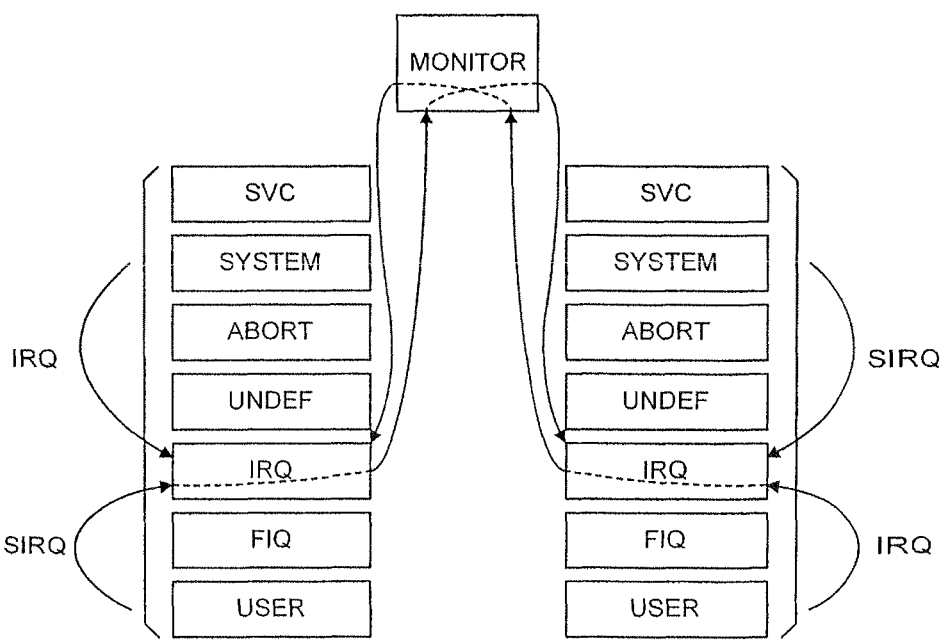
FIG. 12 illustrates an alternative scheme for the handling of non-secure interrupt request signals and secure interrupt request signals compared to that illustrated in FIG. 10.

With the mechanism of FIG. 12, there is no need to recreate the SIRQ event in the case of nested interrupts, but there is no guarantee that secure interrupts will be performed.

Exception Vectors

At least two physical vector tables are kept (although from a virtual address point of view they may appear as a single vector table), one for the non-secure world in non-secure memory, the one for the secure world in secure memory (not accessible from non-secure world). The different virtual to physical memory mappings used in the secure and non-secure worlds effectively allow the same virtual memory addresses to access different vector tables stored in physical memory. The monitor mode may always use flat memory mapping to provide a third vector table in physical memory.

If the interrupts follow the FIG. 12 mechanism, there would be the following vectors shown in FIG. 14 for each table. This vector set is duplicated in both secure and non-secure memory.

| Exception | Vector Offset | Corresponding Mode |
|---|---|---|
| Reset | 0x00 | Supervisor Mode (S bit set) |
| Undef | 0x04 | Monitor mode/Undef mode |
| SWI | 0x08 | Supervisor mode/Monitor mode |
| Prefetch Abort | 0x0C | Abort mode/Monitor mode |
| Data Abort | 0x10 | Abort mode/Monitor Mode |
| IRQ/SIRQ | 0x18 | IRQ mode |
| FIQ | 0x1X | FIQ mode |
| SMI | 0x20 | Undef mode/Monitor mode |

NB. The Reset entry is only in the secure vector table. When a Reset is performed in non secure world, the core hardware forces entry of supervisor mode and setting of the S bit so that the Reset vector can be accessed in secure memory.

Figure 16:
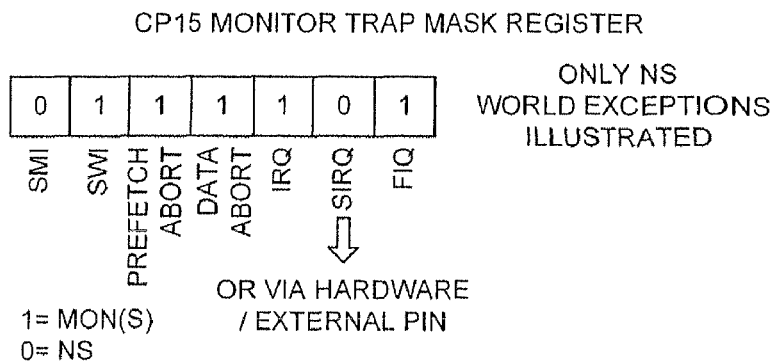
FIG. 16 schematically illustrates an exception control register.

FIG. 15 illustrates three exception vector tables respectively applicable to a secure mode, a non-secure mode and the monitor mode. These exception vector tables may be programmed with exception vectors in order to match the requirements and characteristics of the secure and non-secure operating systems. Each of the exception vector tables may have an associated vector table base address register within CP15 storing a base address pointing to that table within memory. When an exception occurs the hardware will reference the vector table base address register corresponding to the current state of the system to determine the base address of the vector table to be used. Alternatively, the different virtual to physical memory mappings applied in the different modes may be used to separate the three different vector table stored at different physical memory addresses. As illustrated in FIG. 16, an exception trap mask register is provided in a system (configuration controlling) coprocessor (CP15) associated with the processor core. This exception trap mask register provides flags associated with respective exception types. These flags indicate whether the hardware should operate to direct processing to either the vector for the exception concerned within its current domain or should force a switch to the monitor mode (which is a type of secure mode) and then follow the vector in the monitor mode vector table. The exception trap mask register (exception control register) is only writable from the monitor mode. It may be that read access is also prevented to the exception trap mask register when in a non-secure mode. It will be seen that the exception trap mask register of FIG. 16 does not include a flag for the reset vector as the system is configured to always force this to jump to the reset vector in the secure supervisor mode as specified in the secure vector table in order to ensure a secure boot and backwards compatibility. It will be seen that in FIG. 15, for the sake of completeness, reset vectors have been shown in the vector tables other than the secure supervisor mode secure vector table.

FIG. 16 also illustrates that the flags for the different exception types within the exception trap mask register are programmable, such as by the monitor program during secure boot. Alternatively, some or all of the flags may in certain implementations be provided by physical input signals, e.g. the secure interrupt flag SIRQ may be hardwired to always force monitor mode entry and execution of the corresponding monitor mode secure interrupt request vector when a secure interrupt signal is received. FIG. 16 illustrates only that portion of the exception trap register concerned with non-secure domain exceptions, a similar set of programmable bits will be provided for secure domain exceptions.

Whilst it will be understood from the above that at one level the hardware acts to either force an interrupt to be serviced by the current domain exception handler or the monitor mode exception handler depending upon the exception control register flags, this is only the first level of control that is applied. As an example, it is possible for an exception to occur in the secure mode, the secure mode exception vector to be followed to the secure mode exception handler, but this secure mode exception handler then decide that the exception is of a nature that it is better dealt with by the non-secure exception handler and accordingly utilise an SMI instruction to switch to the non-secure mode and invoke the non-secure exception handler. The converse is also possible where the hardware might act to initiate the non-secure exception handler, but this then execute instructions which direct processing to the secure exception handler or the monitor mode exception handler.

Figure 17:
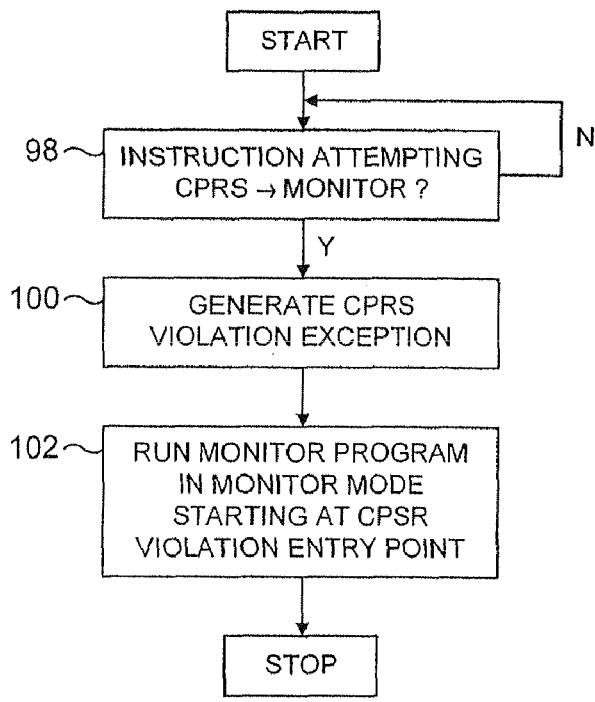
FIG. 17 is a flow diagram illustrating how an instruction attempting to change a processing status register in a manner that alters the security domain setting can generate a separate mode change exception which in turn triggers entry into the monitor mode and running of the monitor program.

FIG. 17 is a flow diagram schematically illustrating the operation of the system so as to support another possible type of switching request associated with a new type of exception. At step 98 the hardware detects any instruction which is attempting to change to monitor mode as indicate in a current program status register (CPSR). When such an attempt is detected, then a new type of exception is triggered, this being referred to herein as a CPSR violation exception. The generation of this CPSR violation exception at step 100 results in reference to an appropriate exception vector within the monitor mode and the monitor program is run at step 102 to handle the CPSR violation exception.

It will be appreciated that the mechanisms for initiating a switch between secure domain and non-secure domain discussed in relation to FIG. 17 may be provided in addition to support for the SMI instruction previously discussed. This exception mechanism may be provided to respond to unauthorised attempts to switch mode as all authorised attempts should be made via an SMI instruction. Alternatively, such a mechanism may be legitimate ways to switch between the secure domain and the non-secure domain or may be provided in order to give backwards compatibility with existing code which, for example, might seek to clear the processing status register as part of its normal operation even though it was not truly trying to make an unauthorised attempt to switch between the secure domain and the non-secure domain.

As described above, in general interrupts are disabled when the processor is operating in monitor mode. This is done to increase the security of the system. When an interrupt occurs the state of the processor at that moment is stored in interrupt exception registers so that on completion of the interrupt function the processing of the interrupted function can be resumed at the interrupt point. If this process were allowed in monitor mode it could reduce the security of the monitor mode, giving a possible secure data leakage path. For this reason interrupts are generally disabled in monitor mode. However, one consequence of disabling interrupts during monitor mode is that interrupt latency is increased.

It would be possible to allow interrupts in monitor mode if the state of the processor executing the function was not stored. This can only be done if following an interrupt the function is not resumed. Thus, the problem of interrupt latency in monitor mode may be addressed by allowing interrupts in monitor mode only of functions that can be safely restarted. In this case, following an interrupt in monitor mode, the data relating to the processing of the function is not stored but is thrown away and the processor is instructed to start processing of the function from its beginning once the interrupt has finished. In the above example this is a simple thing to do as the processor simply returns to the point at which it switched to monitor mode. It should be noted that restarting a function is only possible for certain functions that can be restarted and still produce repeatable results. If the function has changed a state of the processor such that if it were restarted it would produce a different result then it is not a good idea to restart the function. For this reason, only those functions that are safely restartable can be interrupted in monitor mode, for other functions the interrupts are disabled.

Figure 18:
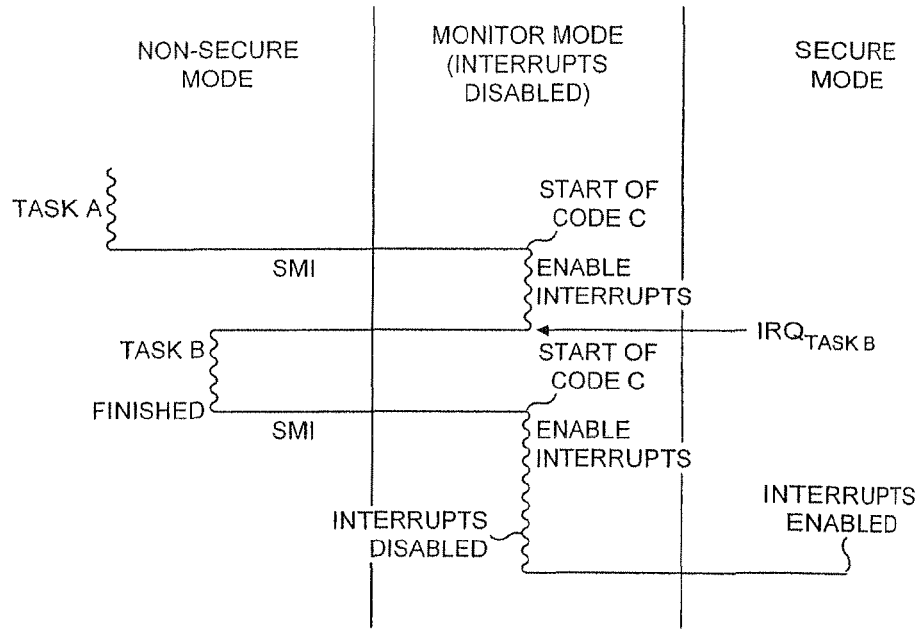
FIG. 18 schematically shows a thread of control of a processor operating in a plurality of modes, wherein a task in monitor mode is interrupted.

FIG. 18 illustrates a way of dealing with an interrupt occurring in monitor mode according to an embodiment of the present invention. An SMI occurs during processing of task A in a non-secure mode and this switches the processor to monitor mode. The SMI instruction makes the core enter the Monitor mode through a dedicated non-secure SMI vector. The current state of the PC is saved, the s bit is set and interrupts are disabled. Generally, LR_mon and SPSR_mon are used to save the PC and CPSR of the non secure mode.

A function, function C is then initiated in monitor mode. The first thing function C does is to enable the interrupts, function C is then processed. If an interrupt occurs during the processing of function C, the interrupts are not disabled so the interrupt is accepted and performed. However, the monitor mode indicator indicates to the processor that following an interrupt, the function is not to be resumed, but rather restarted. Alternatively, this may be indicated to the processor by a separate control parameter. Thus, following an interrupt the interrupt exception vectors are updated with the values of LR_mon and SPSR_mon and the current state of the processor is not stored.

As is shown in FIG. 18 following completion of the interrupt task, task B, the processor reads the address of the SMI instruction which has been copied to the interrupt register and performs an SMI and starts to process function C again.

The above process only works if function C is restartable, that is to say if restarting process C will result in repeatable processing steps. This will not be the case if function C has changed any of the states of the processor such as the stack pointer that may affect its future processing. A function that is repeatable in this way is said to have idempotence. One way of dealing with the problem of a function not having idempotence is to rearrange the code defining the function in such a way that the first portion of the code has idempotence and once it is no longer possible to arrange the code to have idempotence interrupts are disabled. For example, if code C involves writing to the stack, it may be possible to do so without updating the stack pointer at least at first. Once it is decided that the code can no longer feasibly be safely restarted, then the code for function C can instruct the processor to disable interrupts and then it can update the stack pointer to the correct position. This is shown in FIG. 18 where interrupts are disabled a certain way through the processing of function C.

Figure 19:
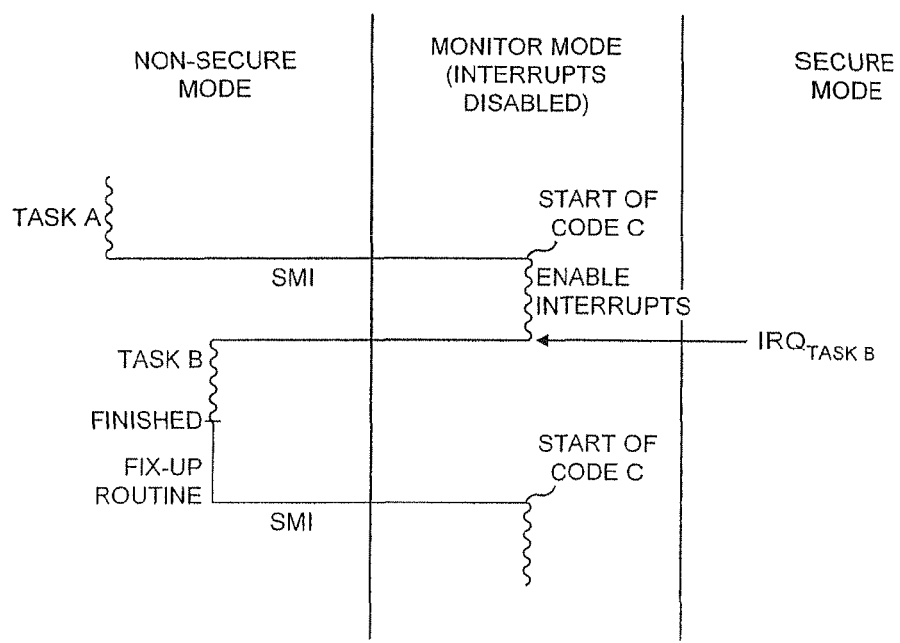
FIG. 19 schematically shows a different thread of control of a processor operating in a plurality of modes.

FIG. 19 illustrates a slightly different example. In this example, a certain way through the processing of task C, a further control parameter is set. This indicates that the following portion of task C is not strictly idempotent, but can be safely restarted provided that a fix-up routine is run first. This fix-up routine acts to restore a state of the processor to how it was at the start of task C, such that task C can be safely restarted and produce the same processor state at the end of the task as it would have done had it not been interrupted. In some embodiments at the point that the further control parameter is set interrupts may be disabled for a short while while some states of the processor are amended such as the stack pointer being updated. This allows the processor to be restored to an idempotent state later.

When an interrupt occurs after the further control parameter has been set, then there are two possible ways to proceed. Either the fix-up routine can be performed immediately (at F1) and then the interrupt can be processed, or the interrupt can be processed immediately and following completion of the interrupt, the SMI is executed and then prior to restarting task C the fix-up routine is performed (at F2). As can be seen, in both of these embodiments the fix-up routine is performed in monitor mode, and thus execution in the non-secure domain, which is not aware of the secure domain or of the monitor mode is not affected.

As can be seen from FIG. 19, a first portion of code C has idempotence and can be restarted following an interrupt. A second portion is restartable provided a fix-up routine is run first, and this is indicated by setting a "further" control parameter, and a final portion of the code cannot be restarted and thus, interrupts are disabled before this code is processed.

Figure 20:
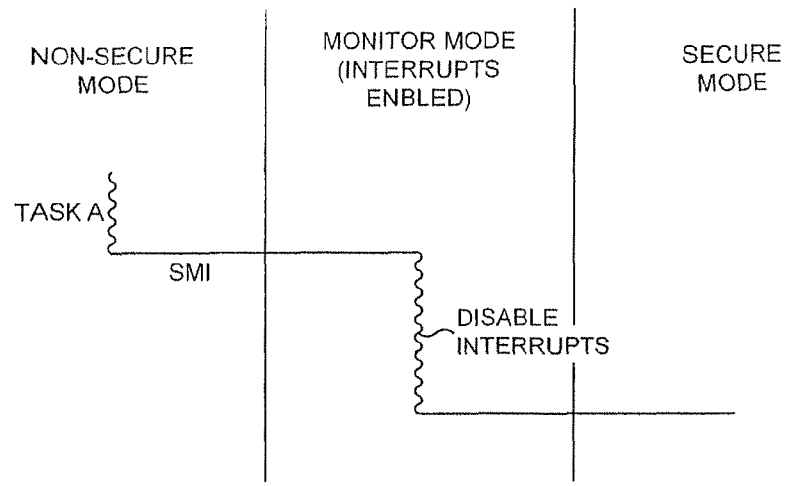
FIG. 20 schematically shows a further thread of control of a processor operating in a plurality of modes, wherein interrupts are enabled in monitor mode.

FIG. 20 illustrates an alternative example, in this case, which is different to other embodiments, interrupts are enabled during the monitor mode. Functions running in the monitor mode then act to disable interrupts as soon as they are no longer safely restartable. This is only possible if all functions interrupted in monitor mode are restarted rather than resumed.

There are several ways that it can be ensured that all functions running in a certain mode are restarted rather than resumed when interrupted. One way is by adding a new processor state in which interrupts save the address of the start of the instruction sequence rather than the address of the interrupted instruction. In this case monitor mode would then always be run in this state. An alternative way is by preloading the address of the start of a function to the interrupt exception register at the start of each function and disabling subsequent writing of the state of the processor following interrupt to interrupt exception registers.

In the embodiment illustrated in FIG. 20 restarting of the functions may be done immediately following termination of the interrupt function or it may be done following a fix-up routine, if that is required to make the function safely restartable.

Although the above described way of dealing with interrupt latency has been described with respect to a system having secure and non-secure domains and a monitor mode, it is clearly applicable to any system which has functions that should not be resumed for a particular reason. Generally such functions operate by disabling interrupts which increase interrupt latency. Amending the functions to be restartable and controlling the processor to restart them following an interrupt allows the interrupts to be enabled for at least a portion of the processing of the function and helps reduce interrupt latency. For example normal context switching of an operating system.

Access to Secure and Non-Secure Memory

As described with reference to FIG. 1, the data processing apparatus has memory, which includes, inter alia, the TCM 36, cache 38, ROM 44, memory of slave devices and external memory 56. As described with reference to FIG. 37 for example, memory is partitioned into secure and non-secure memory. It will be appreciated that there will not typically be any physical distinction between the secure memory regions and non-secure memory regions of the memory at the time of fabrication, but that these regions will instead be defined by a secure operating system of the data processing apparatus when operating in the secure domain. Hence, any physical part of the memory device may be allocated as secure memory, and any physical part may be allocated as non-secure memory.

As described with reference to FIGS. 2 to 5, the processing system has a secure domain and a non-secure domain. In the secure domain, a secure kernel program 80 is provided and which executes in a secure mode. A monitor program 72 is provided which straddles the secure and non-secure domains and which executes at least partly in a monitor mode. In embodiments of the invention the monitor program executes partly in the monitor mode and partly in a secure mode. As shown in for example FIG. 10, there are a plurality of secure modes including, inter alia, a supervisor mode SVC.

The monitor program 72 is responsible for managing all changes between the secure and non-secure domains in either direction. Some of its functions are described with reference to FIGS. 8 and 9 in the section 'Processor Modes'. The monitor program is responsive to a mode switching request SMI issued in the non-secure mode to initiate a switch from the said non-secure mode to the said secure mode and to a mode switching request SMI issued in the secure mode to initiate a switch from the said secure mode to the said non-secure mode. As described in the section 'Switching between worlds', in the monitor mode, switching takes place switching at least some of the register from one of the secure and non-secure domains to the other. That involves saving the state of a register existing in one domain and writing a new state to the register (or restoring a previously saved state in the register) in the other domain. As also described herein access to some registers may be disabled when performing such a switch. Preferably, in monitor mode all interrupts are disabled.

Because the monitor mode in which the monitor program executes straddles the secure and non-secure domains it is important that the monitor program is provably secure: that is it implements only those functions it is intended to implement. It is thus advantageous if the monitor program is a simple as possible. The secure modes allow processes to execute only in the secure domain. In this embodiment of the present invention, the privileged secure mode(s) and the monitor mode allows access to the same secure and non-secure memory. By ensuring that the privileged secure mode(s) 'see' the same secure and non-secure memory, functions which could otherwise only be implemented in the monitor mode are transferred to the secure mode allowing simplification of the monitor program. In addition, this allows a process operating in a privileged secure mode to switch directly to monitor mode and vice versa. A switch from a privileged secure mode to the monitor mode is permitted and in the monitor mode a switch to the non-secure domain may be made. Non-privileged secure modes must use an SMI to enter the monitor mode. The system enters the privileged secure mode following a reset. Switches between the monitor mode and the privileged secure mode and back are made to facilitate state saving when moving between domains.

In other embodiments access to the S flag may be allowed from within secure privileged modes as well as from within the monitor mode. If secure privileged modes are allowed to switch the processor into monitor mode whilst maintaining control of the program flow, then such secure privileged modes already effectively have the ability to change the S flag (bit). Thus, the additional complexity of providing that the S flag can only be changed within the monitor mode is not justified. The S flag can instead be stored in the same way as other configuration flags which may be changed by one or more secure privileged modes. Such embodiments where the S flag may be changed within one of more secure privileged modes are included within the current techniques.

Returning to the previously discussed example embodiment, the apparatus has a processor core 10 which defines the modes and defines the privilege levels of the modes; i.e. the set of functions which any mode allows. Thus the processor core 10 is arranged in known manner to allow the secure modes and the monitor mode access to secure and non-secure memory and the secure modes access to all memory to which the monitor mode allows access and to allow a process operating in any privileged secure mode to switch directly to monitor mode and vice versa. The processor core 10 is preferably arranged to allow the following.

In one example of the apparatus, the memory is partitioned into secure memory and non-secure memory, and both secure and non-secure memory is accessible only in the monitor and secure modes. Preferably, the non-secure memory is accessible in monitor mode, a secure mode and a non-secure mode.

In another example of the apparatus, in the monitor mode and one or more of the secure modes, access to the non-secure memory is denied to the secure mode; and in non-secure mode access to the non-secure memory is denied to the secure and monitor modes. Thus secure memory is accessed only in monitor and secure modes and non-secure memory is accessed only by non-secure modes increasing security.

In examples of the apparatus, resetting or booting of the apparatus may be performed in the monitor mode which may be regarded as a mode which is more privileged than a secure mode. privileged mode. However, in many examples of the apparatus are arranged to provide resetting or booting in a secure mode which is possible because of the direct switching allowed between the secure mode and the monitor mode.

As described with reference to FIG. 2, in the secure domain, and in a secure mode, a secure kernel 80 (or operating system) functions, and one or more secure application programs 82, 84 may be run under the secure kernel 80. The secure kernel and/or the secure application program or any other program code running in a secure mode is allowed access to both secure and non-secure memory.

Whilst examples of this invention have been described with reference to apparatus having a processor, the invention may be implemented by a computer program which when run on a suitable processor configure s the processor to operate as described in this section.

A description of an alternative embodiment(s) of the present technique considered from a programmer's model view is given below in relation to FIGS. 21 to 23 as follows:

In the following description, we will use the following terms that must be understood in the context of an ARM processor as designed by ARM Limited, of Cambridge, England.

S bit: Secure state bit, contained in a dedicated CP15 register.

'Secure/Non-Secure state'. This state is defined by the S bit value. It indicates whether the core may access the Secure world (when it is in Secure state, i.e. S=1) or is restricted to the Non-secure world only (S=0). Note that the Monitor mode (see further) overrides the S bit status.

'Non-Secure World' groups all hardware/software accessible to non-secure applications that do not require security.

'Secure World' groups all hardware/software (core, memory . . . ) that is only accessible when we execute secure code.

Monitor mode: new mode that is responsible for switching the core between the Secure and Non-secure state.

As a brief summary

The core can always access the Non-secure world.

The core can access the Secure world only when it is in Secure state or Monitor mode.

SMI: Software Monitor Interrupt: New instruction that will make the core enter the Monitor mode through a dedicated SMI exception vector. 'Thread ID': is the identifier associated to each thread (controlled by an OS). For some types of OS where the OS runs in non-secure world, each time a secure function is called, it will be necessary to pass as a parameter the current thread ID to link the secure function to its calling non-secure application. The secure world can thus support multi-threads.

Secure Interrupt defines an interrupt generated by a Secure peripheral.

Programmer's Model

Carbon Core Overview

The concept of the Carbon architecture, which is the term used herein for processors using the present techniques, consists in separating two worlds, one secure and one non-secure. The secure world must not leak any data to non-secure world.

In the proposed solution, the secure and non-secure states will share the same (existing) register bank. As a consequence, all current modes present in ARM cores (Abort, Undef, Irq, User, . . . ) will exist in each state.

The core will know it operates in secure or non-secure state thanks to a new state bit, the S (secure) bit, instantiated in a dedicated CP15 register.

Controlling which instruction or event is allowed to modify the S bit, i.e. to change from one state to the other, is a key feature of the security of the system. The current solution proposes to add a new mode, the Monitor mode, that will "supervise" switching between the two states. The Monitor mode, by writing to the appropriate CP15 register, would be the only one allowed to alter the S bit.

Finally, we propose to add some flexibility to the exception handling. All exceptions, apart from the reset, would be handled either in the state where they happened, or would be directed to the Monitor mode. This would be left configurable thanks to a dedicated CP15 register.

The details of this solution are discussed in the following paragraphs.

Processor State and Modes

Carbon New Features

Secure or Non-Secure State (S Bit)

One major feature of the Carbon core is the presence of the S bit, which indicates whether the core is in a Secure (S=1) or Non-secure (S=0) state. When in Secure state, the core would be able to access any data in the Secure or Non-secure worlds. When in Non-Secure state, the core would be restricted to the Non-secure world only.

The only exception to this rule concerns the Monitor mode, which overrides the S bit information. Even when S=0, the core will perform Secure privileged accesses when it is in Monitor mode. See next paragraph, Monitor mode, for further information The S bit can only be read and written in Monitor mode. Whatever the S bit value, if any other mode tries to access it, this will be either ignored or result in an Undefined exception.

All exceptions, apart from Reset, have no effect on the Secure state bit. On Reset, the S bit will be set, and the core will start in Supervisor mode. Refer to the boot section for detailed information.

Secure/Nonsecure states are separate and operate independently of the ARM/Thumb/Java states.

Monitor Mode

One other important feature of the Carbon system is the creation of a new mode, the Monitor mode. This will be used to control the core switching between the Secure and Non-secure states. It will always be considered as a secure mode, i.e. whatever the value of the S bit, the core will always perform Secure Privileged accesses to the external world when it is in Monitor mode.

Any Secure privileged mode (i.e. privileged modes when S=1) would be able to switch to Monitor mode by simply writing the CPSR mode bits (MSR, MOVS, or equivalent instruction). However, this would be forbidden in any Nonsecure mode or Secure user mode. If this ever happens, the instruction would be ignored or cause an exception.

There may be a need for a dedicated CPSR violation exception. This exception would be raised by any attempt to switch to Monitor mode by directly writing the CPSR from any Non-secure mode or Secure user mode.

All exceptions except Reset are in effect disabled when Monitor mode is active:
all interrupts are masked;
all memory exceptions are either ignored or cause a fatal exception.
undefined/SWI/SMI are ignored or cause a fatal exception.

When entering Monitor mode, the interrupts are automatically disabled and the system monitor should be written such that none of the other types of exception can happen while the system monitor is running.

Monitor mode needs to have some private registers. This solution proposes that we only duplicate the minimal set of registers, i.e R13 (sp_mon), R14 (lr_mon) and SPSR (spsr_mon).

In Monitor mode, the MMU will be disabled (flat address map) as well as the MPU or partition checker (the Monitor mode will always perform secure privileged external accesses). However, specially programmed MPU region attributes (cacheability, . . . ) would still be active. As an alternative the Monitor mode may use whatever mapping is used by the secure domain.

New Instruction

This proposal requires adding one new instruction to the existing ARM instruction set.

The SMI (Software Monitor Interrupt) instruction would be used to enter the Monitor mode, branching at a fixed SMI exception vector. This instruction would be mainly used to indicate to the Monitor to swap between the Non-secure and Secure State.

As an alternative (or in addition) it would be possible to add a new instruction to allow the Monitor mode to save/restore the state of any other mode onto/from the Monitor stack to improve context switching performance.

Processor Modes

As discussed in the previous paragraph, only one new mode is added in the core, the Monitor mode. All existing modes remain available, and will exist both in the secure and non-secure states.

Figure 21:
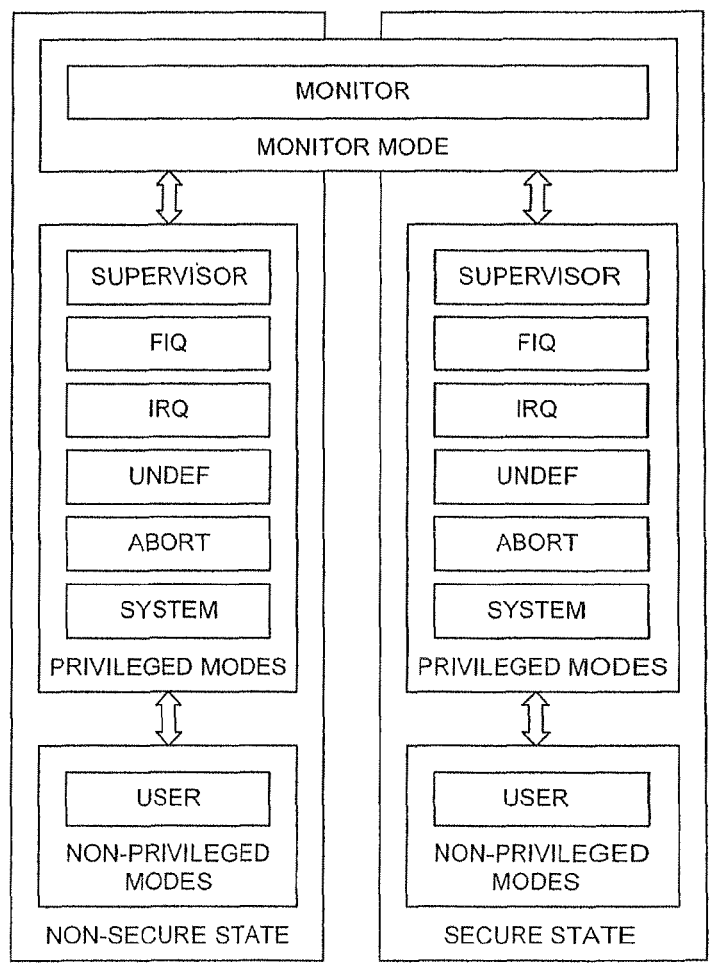

In fact, Carbon users will see the structure illustrated in FIG. 21.

Processor Registers

This embodiment proposes that the secure and the non-secure worlds share the same register bank. This implies that, when switching from one world to the other through the Monitor mode, the system monitor will need to save the first world context, and create (or restore) a context in the second world.

Passing parameters becomes an easy task: any data contained in a register in the first world will be available in the same register in the second world once the system monitor has switched the S bit.

However, apart from a limited number of registers dedicated to passing parameters, which will need to be strictly controlled, all other registers will need to be flushed when passing from Secure to Non-secure state in order to avoid any leak of Secure data. This will need to be ensured by the Monitor kernel.

The possibility of implementing a hardware mechanism or a new instruction to directly flush the registers when switching from Secure to Non-secure state is also a possibility.

Another solution proposed involves duplicating all (or most of) the existing register bank, thus having two physically separated register banks between the Secure and Non-secure state. This solution has the main advantage of clearly separating the secure and non-secure data contained in the registers. It also allows fast context switching between the secure and non-secure states. However, the drawback is that passing parameters through registers becomes difficult, unless we create some dedicated instructions to allow the secure world access the non-secure registers FIG. 22 illustrates the available registers depending on the processor mode. Note that the processor state has no impact on this topic.

Exceptions

Secure Interrupts

Current Solution

It is currently proposed to keep the same interrupt pins as in the current cores, i.e. IRQ and FIQ. In association with the Exception Trap Mask register (defined later in the document), there should be sufficient flexibility for any system to implement and handle different kind of interrupts.

VIC Enhancement

We could enhance the VIC (Vectored Interrupt Controller) in the following way: the VIC may contain one Secure information bit associated to each vectored address. This bit would be programmable by the Monitor or Secure privileged modes only. It would indicate whether the considered interrupt should be treated as Secure, and thus should be handled on the Secure side.

We would also add two new Vector Address registers, one for all Secure Interrupts happening in Non-Secure state, the other one for all Non-Secure interrupts happening in Secure state.

The S bit information contained in CP15 would be also available to the VIC as a new VIC input.

The following table summarizes the different possible scenarios, depending on the status of the incoming interrupt (Secure or Non-secure, indicated by the S bit associated to each interrupt line) and the state of the core (S bit in CP15=S input signal on the VIC).

|  | Core in secure state (CP15 − S = 1) | Core in Non-secure state (CP15 − S = 0) |
| --- | --- | --- |
| Secure Interrupt | No need to switch between worlds. The VIC directly presents to the core the Secure address associated to the interrupt line. The core simply has to branch at this address where it should find the associated ISR. | The VIC has no Vector associated to this interrupt in the Non-secure domain. It thus presents to the core the address contained in the Vector address register dedicated to all Secure interrupts occurring in Non-secure world. The core, still in Non-secure world, then branches to this address, where it should find an |

-continued

| | Core in secure state (CP15 – S = 1) | Core in Non-secure state (CP15 – S = 0) |
|---|---|---|
| Non-Secure Interrupt | The VIC has no Vector associated to this interrupt in the Secure domain. It thus presents to the core the address contained in the Vector address register dedicated to all Non-secure interrupts occurring in Secure world. The core, still in Secure world, then branches to this address, where it should find an SMI instruction to switch to Non-secure world. Once in Non-secure world, it would be able to have access to the correct ISR. | SMI instruction to switch to Secure world. Once in Secure world, it would be able to have access to the correct ISR. No need to switch between worlds. The VIC directly presents to the core the Non-secure address associated to the interrupt line. The core simply has to branch at this address where it should find the associated Non-secure ISR. |

Exception Handling Configurability

In order to improve Carbon flexibility, a new register, the Exception Trap Mask, would be added in CP15. This register would contain the following bits:

| Bit 0: | Undef exception | (Non-secure state) |
| Bit 1: | SWI exception | (Non-secure state) |
| Bit 2: | Prefetch abort exception | (Non-secure state) |
| Bit 3: | Data abort exception | (Non-secure state) |
| Bit 4: | IRQ exception | (Non-secure state) |
| Bit 5: | FIQ exception | (Non-secure state) |
| Bit 6: | SMI exception | (both Non-secure/Secure states) |
| Bit 16: | Undef exception | (Secure state) |
| Bit 17: | SWI exception | (Secure state) |
| Bit 18: | Prefetch abort exception | (Secure state) |
| Bit 19: | Data abort exception | (Secure state) |
| Bit 20: | IRQ exception | (Secure state) |
| Bit 21: | FIQ exception | (Secure state) |

The Reset exception does not have any corresponding bit in this register. Reset will always cause the core to enter the Secure supervisor mode through its dedicated vector.

If the bit is set, the corresponding exception makes the core enter the Monitor mode. Otherwise, the exception will be handled in its corresponding handler in the world where it occurred.

This register would only be visible in Monitor mode. Any instruction trying to access it in any other mode would be ignored.

This register should be initialized to a system-specific value, depending upon whether the system supports a monitor or not. This functionality could be controlled by a VIC.

Exception Vectors Tables

As there will be separate Secure and Non-secure worlds, we will also need separate Secure and Non-secure exception vectors tables.

Moreover, as the Monitor can also trap some exceptions, we may also need a third exception vectors table dedicated to the Monitor.

The following table summarizes those three different exception vectors tables:

In non-secure memory:

| Address | Exception | Mode | Automatically accessed when |
|---|---|---|---|
| 0x00 | — | — | |
| 0x04 | Undef | Undef | Undefined instruction executed when core is in Non-Secure state and Exception Trap Mask reg [Non-secure Undef] = 0 |
| 0x08 | SWI | Supervisor | SWI instruction executed when core is in Non-Secure state and Exception Trap Mask reg [Non-secure SWI] = 0 |
| 0x0C | Prefetch Abort | Abort | Aborted instruction when core is in Non-Secure state and Exception Trap Mask reg [Non-secure PAbort] = 0 |
| 0x10 | Data Abort | Abort | Aborted data when core is in Non-Secure state and Exception Trap Mask reg [Non-secure DAbort] = 0 |
| 0x14 | Reserved | | |
| 0x18 | IRQ | IRQ | IRQ pin asserted when core is in Non-Secure state and Exception Trap Mask reg [Non-secure IRQ] = 0 |
| 0x1C | FIQ | FIQ | FIQ pin asserted when core is in Non-Secure state and Exception Trap Mask reg [Non-secure FIQ] = 0 |

In secure memory:

| Address | Exception | Mode | Automatically accessed when |
|---|---|---|---|
| 0x00 | Reset* | Supervisor | Reset pin asserted |
| 0x04 | Undef | Undef | Undefined instruction executed when core is in Secure state and Exception Trap Mask reg [Secure Undef] = 0 |
| 0x08 | SWI | Supervisor | SWI instruction executed when core is in Secure state and Exception Trap Mask reg [Secure SWI] = 0 |
| 0x0C | Prefetch Abort | Abort | Aborted instruction when core is in Secure state and Exception Trap Mask reg [Secure PAbort] = 0 |
| 0x10 | Data Abort | Abort | Aborted data when core is in Secure state and Exception Trap Mask reg [Secure Dabort] = 0 |
| 0x14 | Reserved | | |
| 0x18 | IRQ | IRQ | IRQ pin asserted when core is in Secure state and Exception Trap Mask reg [Secure IRQ] = 0 |
| 0x1C | FIQ | FIQ | FIQ pin asserted when core is in Secure state and Exception Trap Mask reg [Secure FIQ] = 0 |

*Refer to "Boot" section for further explanation on the Reset mechanism

| In Monitor memory (flat mapping): | | | |
|---|---|---|---|
| Address | Exception | Mode | Automatically accessed when |
| 0x00 | — | — | — |
| 0x04 | Undef | Monitor | Undefined instruction executed when Core is in Secure state and Exception Trap Mask reg [Secure Undef] = 1 Core is in Non-secure state and Exception Trap Mask reg [Non-secure Undef] = 1 |
| 0x08 | SWI | Monitor | SWI instruction executed when Core is in Secure state and Exception Trap Mask reg [Secure SWI] = 1 Core is in Non-secure state and Exception Trap Mask reg [Non-secure SWI] = 1 |
| 0x0C | Prefetch Abort | Monitor | Aborted instruction when Core is in Secure state and Exception Trap Mask reg [Secure IAbort] = 1 Core is in Non-secure state and Exception Trap Mask reg [Non-secure Iabort] = 1 |
| 0x10 | Data Abort | Monitor | Aborted data when Core is in Secure state and Exception Trap Mask reg [Secure PAbort] = 1 Core is in Non-secure state and Exception Trap Mask reg [Non-secure Pabort] = 1 |
| 0x14 | SMI | Monitor | |
| 0x18 | IRQ | Monitor | IRQ pin asserted when core is in Secure state and Exception Trap Mask reg [Secure IRQ] = 1 core is in Non-secure state and Exception Trap Mask reg [Non-secure IRQ] = 1 |
| 0x1C | FIQ | Monitor | FIQ pin asserted when core is in Secure state and Exception Trap Mask reg [Secure FIQ] = 1 core is in Non-secure state and Exception Trap Mask reg [Non-secure FIQ] = 1 |

In Monitor mode, the exceptions vectors may be duplicated, so that each exception will have two different associated vector:

One for the exception arising in Non-secure state
One for the exception arising in Secure state This may be useful to reduce the exception latency, because the monitor kernel does not have any more the need to detect the originating state where the exception occurred.

Note that this feature may be limited to a few exceptions, the SMI being one of the most suitable candidates to improve the switching between the Secure and Non-secure states.

Switching Between Worlds

When switching between states, the Monitor mode must save the context of the first state on its Monitor stack, and restore the second state context from the Monitor stack.

The Monitor mode thus needs to have access to any register of any other modes, including the private registers (r14, SPSR, . . . ).

To handle this, the proposed solution consists in giving any privilege mode in Secure state the rights to directly switch to Monitor mode by simply writing the CPSR.

With such a system, switching between worlds is performed as follows:

enter Monitor mode
set the S bit
switch to supervisor mode—save the supervisor registers on the MONITOR stack (of course the supervisor mode will need to have access to the Monitor stack pointer, but this can be easily done, for example by using a common register (R0 to R8))
switch to System mode—save the registers (=same as the user mode) on the Monitor stack
IRQ registers on the Monitor stack etc . . . for all modes
Once all private registers of all modes are saved, revert to Monitor mode with a simple MSR instruction (=simply write Monitor value in the CPSR mode field)

The other solutions have also been considered:
Add a new instruction that would allow the Monitor to save other modes' private registers on its own stack.
Implement the Monitor as a new "state", i.e. being able to be in Monitor state (to have the appropriate access rights) and in IRQ (or any other) mode, to see the IRQ (or any other) private registers.

Figure 23:
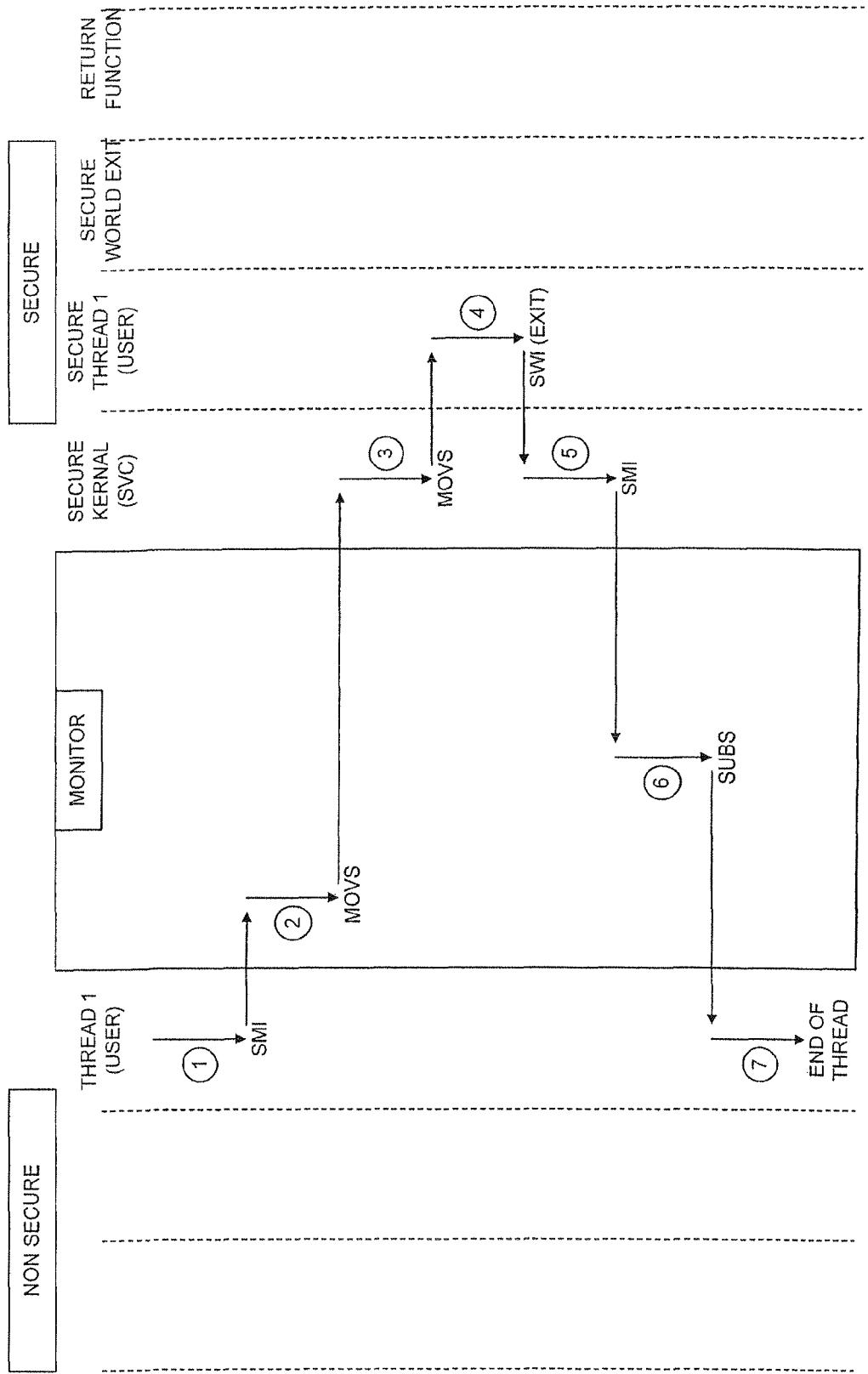

Basic Scenario (See FIG. 23)

1. Thread 1 is running in non-secure world (S bit=0)
This thread needs to perform a secure function =>SMI instruction.
2. The SMI instruction makes the core enter the Monitor mode through a non-secure SMI vector.
LR_mon and SPSR_mon are used to save the PC and CPSR of the non secure mode.
At this stage the S bit remains unchanged, although the system is now in a secure state.
The monitor kernel saves the non-secure context on the monitor.
It also pushes LR_mon and SPSR_mon.
The monitor kernel then changes the "S" bit by writing into the CP15 register.
In this embodiment the monitor kernel keeps track that a "secure thread 1" will be started in the secure world (e.g. by updating a Thread ID table).
Finally, it exits the monitor mode and switches to secure supervisor mode (MOVS instruction after having updated LR_mon and SPSR_mon?).
3. The secure kernel dispatches the application to the right secure memory location, then switches to user mode (e.g. using a MOVS).
4. The secure function in executed in secure user mode. Once finished, it calls an "exit" function by performing an appropriate SWI.
5. The SWI instruction makes the core enter the secure svc mode through a dedicated SWI vector, that in turn performs the "exit" function. This "exit" function ends with an "SMI" to switch back to monitor mode.
6. The SMI instruction makes the core enter the monitor mode through a dedicated secure SMI vector.
LR_mon and SPSR_mon are used to save the PC and CPSR of the Secure svc mode.
The S bit remains unchanged (i.e. Secure State).
The monitor kernel registers the fact that secure thread 1 is finished (removes the secure thread 1 ID from the thread ID table?).
It then changes the "S" bit by writing into the CP15 register, returning to non-secure state.
The monitor kernel restores the non-secure context from the monitor stack.
It also load the LR_mon and CPSR_mon previously saved in step 2.
Finally, it exits monitor mode with a SUBS, that will make the core return in non-secure user mode, on the instruction
7. Thread 1 can resume normally.

Referring to FIG. 6, all of the registers are shared between the secure and non-secure domains In monitor mode, switching takes place switching the registers from one of the secure and non-secure domains to the other. That involves saving the state of a register existing in one domain and writing a new state to the register (or restoring a previously saved state in the register) in the other domain as is also described in the section 'Switching between Worlds' above.

It is desirable to reduce the time taken to perform this switch. To reduce the time taken to perform the switch, the shared registers are disabled when switching between the secure and non-secure domains retaining unchanged the data values stored therein. For example, consider a switch from the non-secure domain to the secure domain. Assume that for example the FIQ registers shown in FIG. 6 are not needed in the secure world. Thus, those registers are disabled and there is no need to switch them to the secure domain and there is no need to save the contents of those registers.

Disabling of the registers may be achieved in several ways. One way is to lock out the mode which uses those registers. That is done by writing a control bit in a CP15 register indicating the disabling of that mode.

Alternatively, access to the registers may be disabled on an instruction by instruction basis again by writing control bits in a CP15 register. The bits written in the CP15 register relate explicitly to the register, not the mode, so the mode is not disabled but access to the register in the mode is disabled.

The FIQ registers store data associated with a fast interrupt. If the FIQ register(s) are disabled and a fast interrupt occurs, the processor signals an exception in the monitor. In response to an exception, the monitor mode is operable to save any data values associated with one domain and stored in the said disabled register and to load into that register new data values associated with the other domain and then re-enable the FIQ mode registers.

The processor may be arranged so that when in the monitor mode all banked registers are disabled when the processor switches domains. Alternatively, the disabling of the registers may be selective in that some predetermined ones of the shared registers are disabled when switching domains and others may be disabled at the choice of the programmer.

The processor may be arranged so that when switching domains in the monitor mode, one or more of the shared registers are disabled, and one or more others of the shared registers have their data saved when existing one domain, and have new data loaded in the other domain. The new data may be null data.

Figure 24:
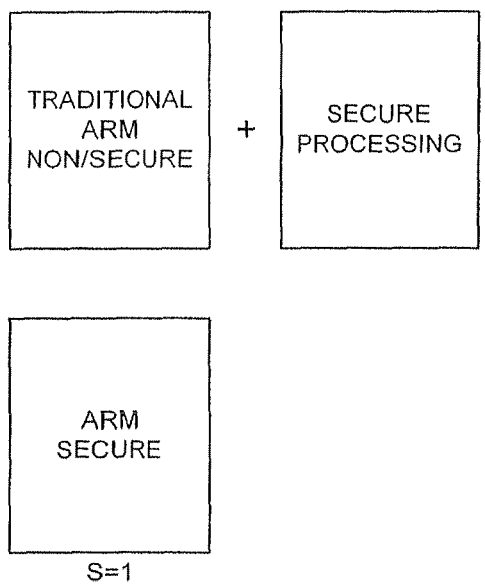
FIG. 24 schematically illustrates the concept of adding a secure processing option to a traditional ARM core.

FIG. 24 schematically illustrates the concept of adding a secure processing option to a traditional ARM core. The diagram schematically shows how a processor that contains a secure processing option can be formed by adding a secure processing option to an existing core. If the system is to be backwards compatible with an existing legacy operating system, it is intuitive to think of the legacy system operating in the traditional non-secure part of the processor. However, as is shown schematically in the lower part of the Figure and is detailed further below, it is in fact in the secure portion of the system that a legacy system operates.

Figure 25:
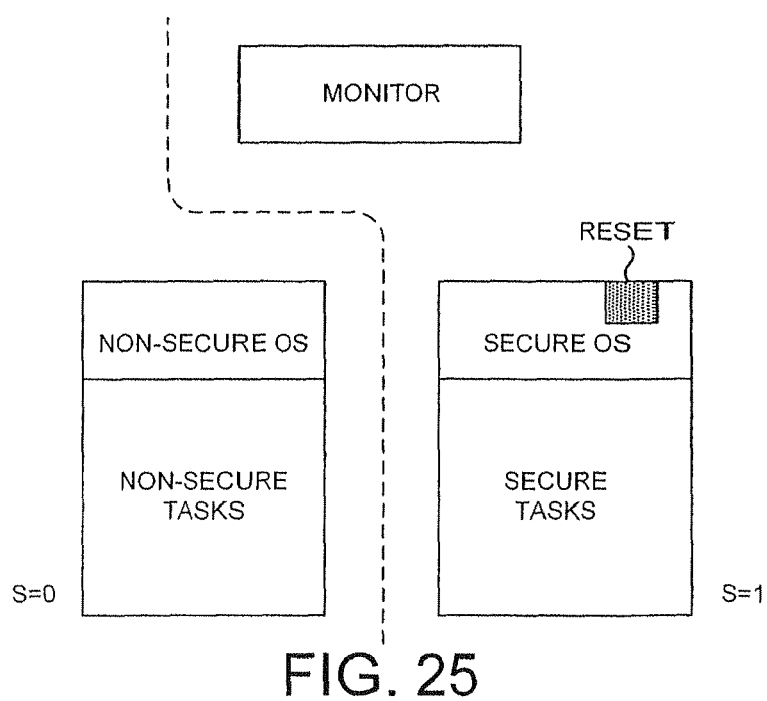
FIG. 25 schematically illustrates a processor having a secure and non-secure domain and reset.

FIG. 25 shows a processor having a secure and non-secure domain and illustrating reset and is similar to FIG. 2. FIG. 2 illustrates a processor that is adapted to run a security sensitive type of operation with a secure OS system controlling processing in the secure domain and a non-secure OS system controlling processing in the non-secure domain. The processor is however also backwards compatible with a traditional legacy operating system and thus, the processor may operate in a security insensitive way using a legacy operating system.

As is shown in FIG. 25, the reset is in the secure domain, and whatever the type of operation reset occurs here with the S-bit or security status flag set. In the case of a security insensitive type of operation, reset occurs in the secure domain and processing then continues within the secure domain. The legacy operating system controlling processing is however unaware of the security aspects of the system.

As is shown in FIG. 25 reset is performed to set the address at which to start processing within the secure supervisor mode whether processing is to be secure sensitive or is in fact secure insensitive. Once reset has been performed the additional tasks present in a boot or reboot mechanism are then performed. The boot mechanism is described below.

Boot Mechanism

The boot mechanism must respect the following features:

Keep compatibility with legacy OSes.

Boot in most privileged mode to ensure the security of the system.

As a consequence, Carbon cores will boot in Secure Supervisor mode.

The different systems will then be:

For systems wanting to run legacy OSes, the S bit is not taken into account and the core will just see it boots in Supervisor mode.

For systems wanting to use the Carbon features, the core boots in Secure privileged mode which should be able to configure all secure protections in the system (potentially after swapping to Monitor mode)

With respect to the details of the boot mechanism given above the processor of embodiments of the present invention resets the processor to start processing in the secure supervisor mode in all cases. In the case of a security insensitive type of operation the operating system is in effect operating in the secure domain although security is not here an issue, because the S bit is set (although the operating system is unaware of this). This has the advantage that parts of the memory that are inaccessible from the non-secure domain are accessible in this situation.

Booting in secure supervisor mode in all cases is also advantageous in security sensitive systems as it helps ensure the security of the system. In secure sensitive systems, the address provided at boot points to where the boot program is stored in secure supervisor mode and thus, enables the system to be configured as a secure system and to switch to monitor mode. Switching from secure supervisor mode to monitor mode is allowed in general and enables the secure system at an appropriate time to start processing in monitor mode to initialise monitor mode configuration.

Figure 26:
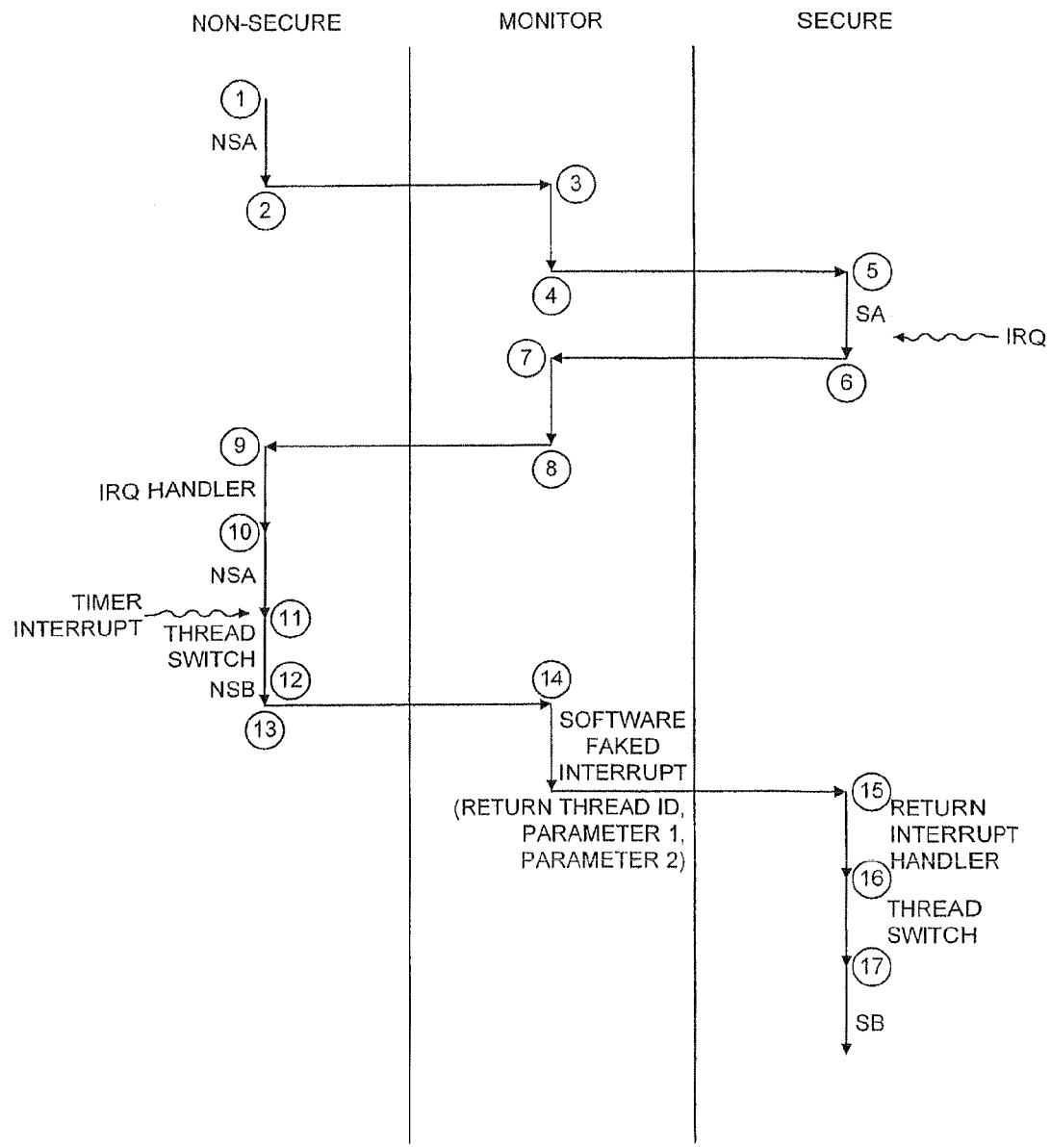
FIG. 26 schematically illustrates the delivering of processing requests to a suspended operating system using a software faked interrupt.

FIG. 26 illustrates at step 1 a non-secure thread NSA being executed by a non-secure operating system. At step 2 the non-secure thread NSA makes a call to the secure domain via the monitor mode running a monitor mode program at step 3. The monitor mode program changes the S-bit to switch domain and performs any necessary context saving and context restoring prior to moving to the secure operating system at step 5. The corresponding secure thread SA is then executed before it is subject to an interrupt irq at step 6. The interrupt handling hardware triggers a return to the monitor mode at step 7 where it is determined as to whether the interrupt will be handled by the secure operating system or the non-secure operating system. In this case, the interrupt is handled by the non-secure operating system starting at step 9. When this interrupt has been handled by the non-secure operating system, the non-secure thread NSA is resumed as the current task in the non-secure operating system prior to a normal thread switching operation at step 11. This thread switching may be the result of a timing event or the like. A different thread NSB is executed in the non-secure domain by the non-secure operating system at step 12 and this then makes a call to the secure domain via the monitor domain/ program at step 14. The monitor program at step 7 has stored a flag, used some other mechanism, to indicate that the secure operating system was last suspended as a result of an interrupt rather than having been left because a secure thread had finished execution or due to a normal request to leave. Accordingly, since the secure operating system was suspended by an interrupt, the monitor program at step 15 re-enters the secure operating system using a software faked interrupt which specifies a return thread ID (e.g. an identifier of the thread to be started by the secure operating system as requested by the non-secure thread NSB, as well as other parameter data). These parameters of the software faked interrupt may be passed as register values.

The software faked interrupt triggers a return interrupt handler routine of the secure operating system at step 15. This return interrupt handler routine examines the return thread ID of the software faked interrupt to determine whether or not this matches the thread ID of the secure thread SA which was interrupted the last time the secure operating system was executed prior to its suspension. In this case, there is not a match and accordingly at step 16 the secure operating system is triggered to perform a thread switch to the return thread as specified by the non-secure thread NSB after the context of the secure thread SA has been saved. The secure thread SA can then later be restarted from the point at which it was interrupted as required.

Figure 27:
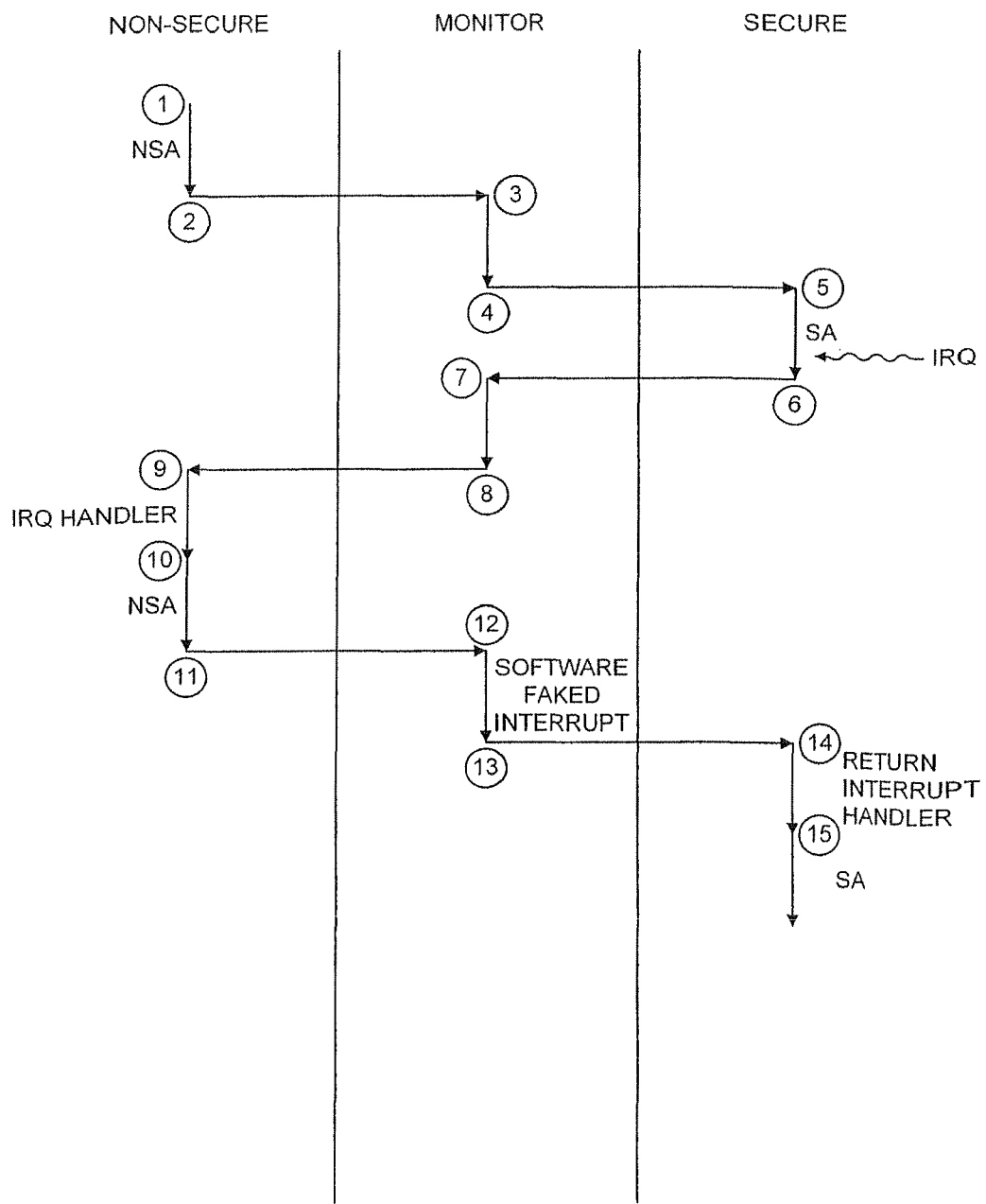
FIG. 27 schematically illustrates another example of the delivering of a processing request to a suspended operating system via a software faked interrupt.

FIG. 27 schematically illustrates another example of the type of behaviour illustrated in FIG. 26. In this example whilst processing proceeds under control of the non-secure operating system to handle the irq, there is no non-secure thread switch and accordingly when the software faked interrupt is received by the return interrupt handler of the secure operating system it determines that no thread switch is required and simply resumes the secure thread SA at step 15.

Figure 28:
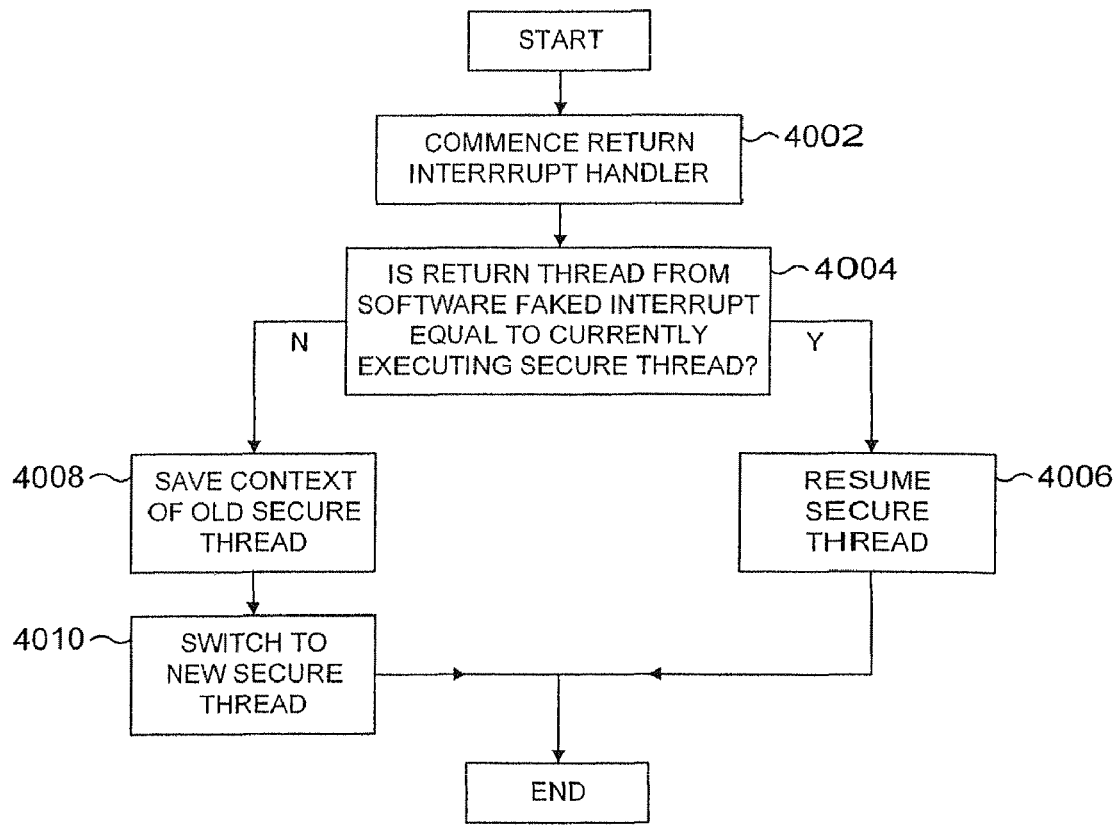
FIG. 28 is a flow diagram schematically illustrating processing performed upon receipt of a software faked interrupt of the type generated in FIGS. 26 and 27.

FIG. 28 is a flow diagram schematically illustrating the processing performed by the return thread handler. At step 4002 the return thread handler is started. At step 4004 the return thread identifier from the software faked interrupt is examined and compared with the currently executing secure thread when the secure operating system was suspended. If these match, then processing proceeds to step 4006 at which the secure thread is resumed. If the comparison at step 4004 is not matched, then processing proceeds to step 4008 at which the context of the old secure thread is saved, (for subsequent resumption) prior to a switch being made to the new secure thread at step 4010. The new thread might already be under way and so step 4010 is a resumption.

Figure 29:
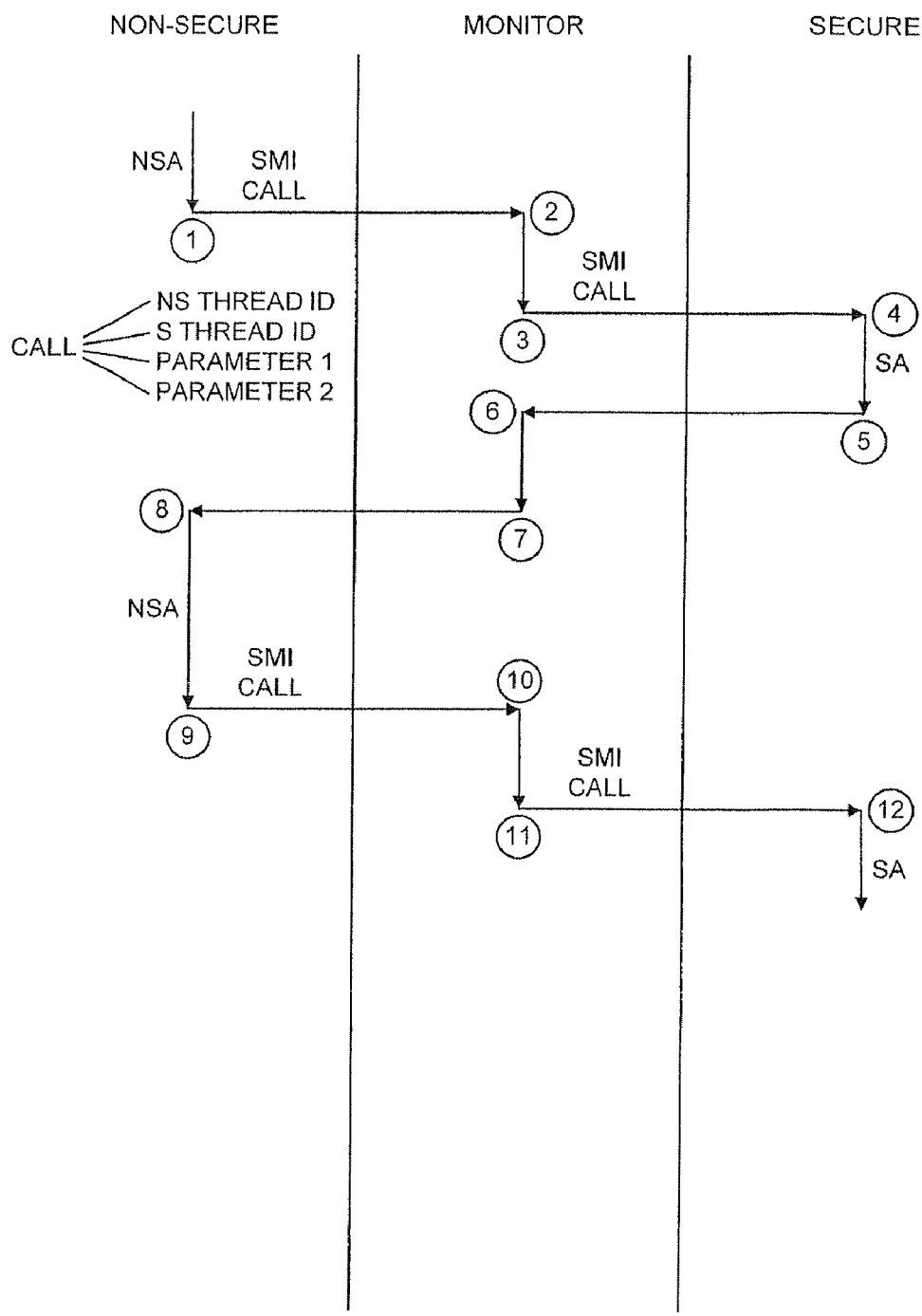
FIGS. 29 and 30 schematically illustrate task following by a secure operating system to track possible task switches made by a non-secure operating system.

FIG. 29 schematically illustrates processing whereby a slave secure operating system may follow task switches performed by a master non-secure operating system. The master non-secure operating system may be a legacy operating system with no mechanisms for communicating and co-ordinating its activities to other operating systems and accordingly operate only as a master. As an initial entry point in FIG. 29 the non-secure operating system is executing a non-secure thread NSA. This non-secure thread NSA makes a call to a secure thread which is to be executed by the secure operating system using a software interrupt, an SMI call. The SMI call goes to a monitor program executing in a monitor mode at step 2 whereupon the monitor program performs any necessary context saving and switching before passing the call onto the secure operating system at step 4. The secure operating system then starts the corresponding secure thread SA. This secure thread may return control via the monitor mode to the non-secure operating system, such as as a result of a timer event or the like. When the non-secure thread NSA again passes control to the secure operating system at step 9 it does so by reissuing the original software interrupt. The software interrupt includes the non-secure thread ID identifying NSA, the secure thread ID of the target secure thread to be activated, i.e. the thread ID identifying secure thread SA as well as other parameters.

When the call generated at step 9 is passed on by the monitor program and received at step 12 in the secure domain by the secure operating system, the non-secure thread ID can be examined to determine whether or not there has been a context switch by the non-secure operating system. The secure thread ID of the target thread may also be examined to see that the correct thread under the secure operating system is restarted or started as a new thread. In the example of FIG. 29, no thread switch is required in the secure domain by the secure operating system.

Figure 30:
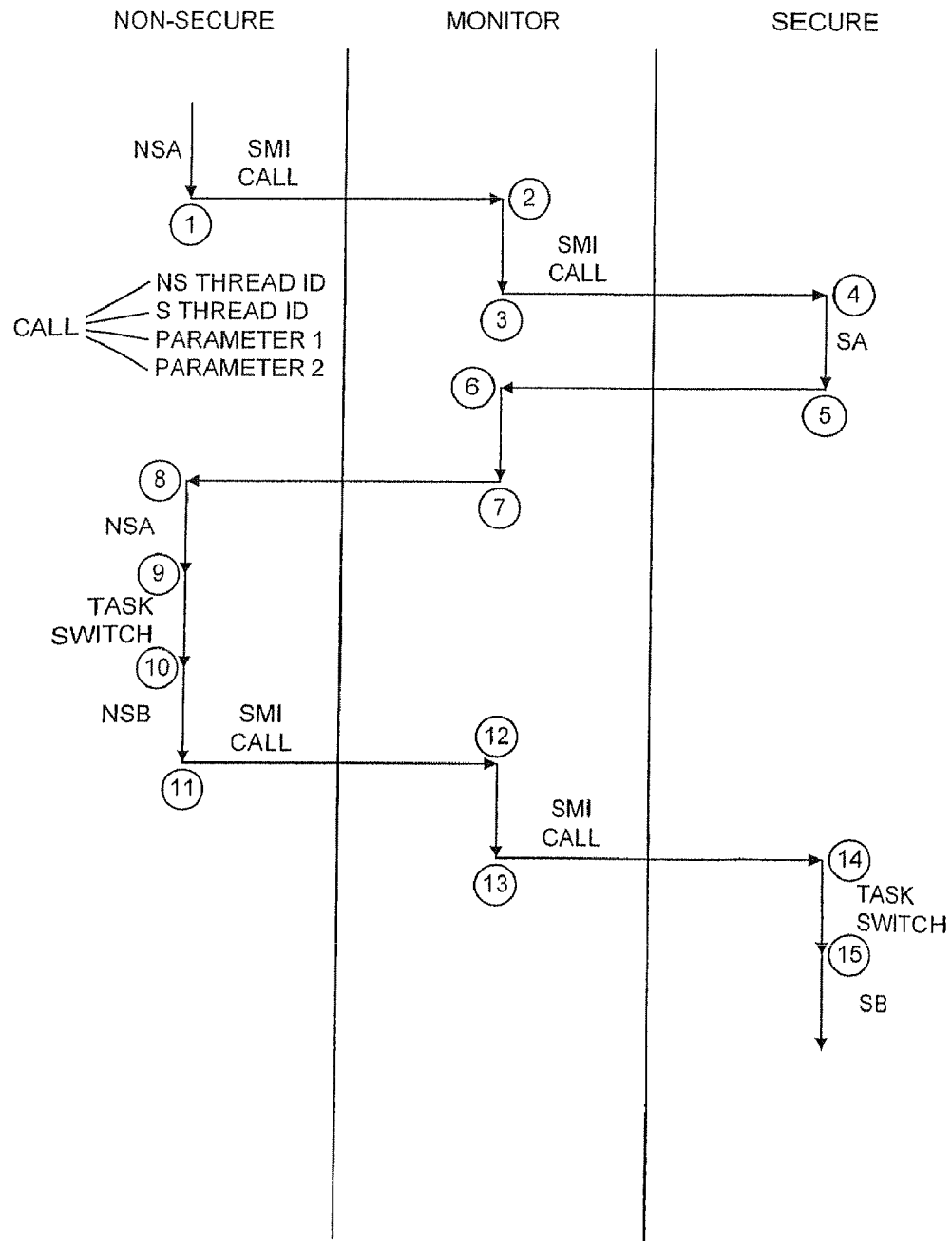

FIG. 30 is similar to FIG. 29 except that a switch in thread occurs at step 9 in the non-secure domain under control of the non-secure operating system. Accordingly, it is a different non-secure thread NSB which makes the software interrupt call across to the secure operating system at step 11. At step 14, the secure operating system recognises the different thread ID of the non-secure thread NSB and accordingly performs a task switch involving saving the context of the secure thread SA and starting the secure thread SB.

Figure 31:
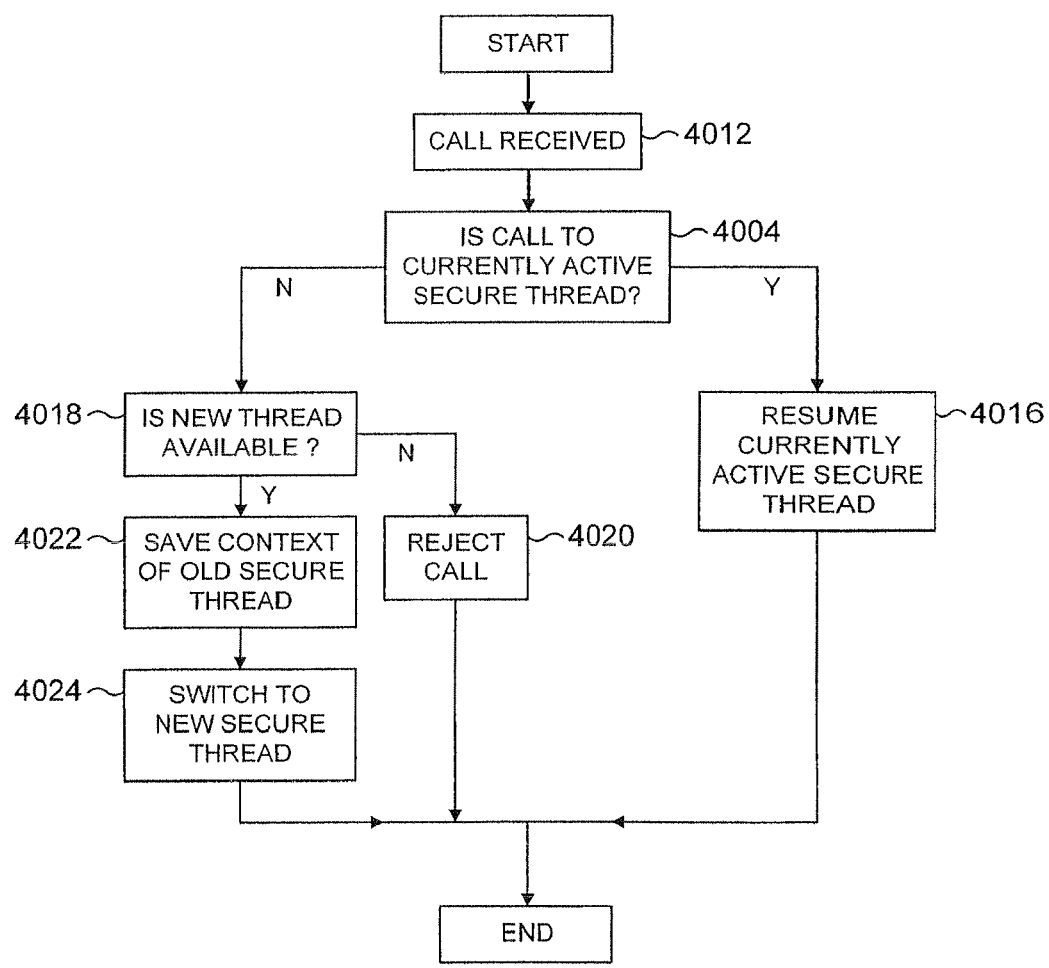
FIG. 31 is a flow diagram schematically illustrating the processing performed upon receipt of a call at the secure operating system of FIGS. 29 and 30.

FIG. 31 is a flow diagram schematically illustrating processing performed by the secure operating system when receiving a software interrupt as a call to start a thread or resume a thread of the secure operating system. At step 4012 the call is received. At step 4014 the parameters of the call are examined to determine if they match the currently active secure thread upon the secure operating system. If a match occurs, then this secure thread is restarted at step 4016. If a match does not occur, then processing proceeds to step 4018 where a determination is made as to whether or not the newly requested thread is available. The newly requested thread might be unavailable due to a reason such as it being or requiring an exclusive resource which is already in use by some other thread executing on a secure operating system. In such a case, the call is rejected at step 4020 with an appropriate message being returned to the non-secure operating system. If the determination at step 4018 is that the new thread is available, then processing proceeds to step 4022 at which the context of the old secure thread is saved for possible later resumption. At step 4024 a switch is made to the new secure thread as specified in the software interrupt call made to the secure operating system.

Figure 32:
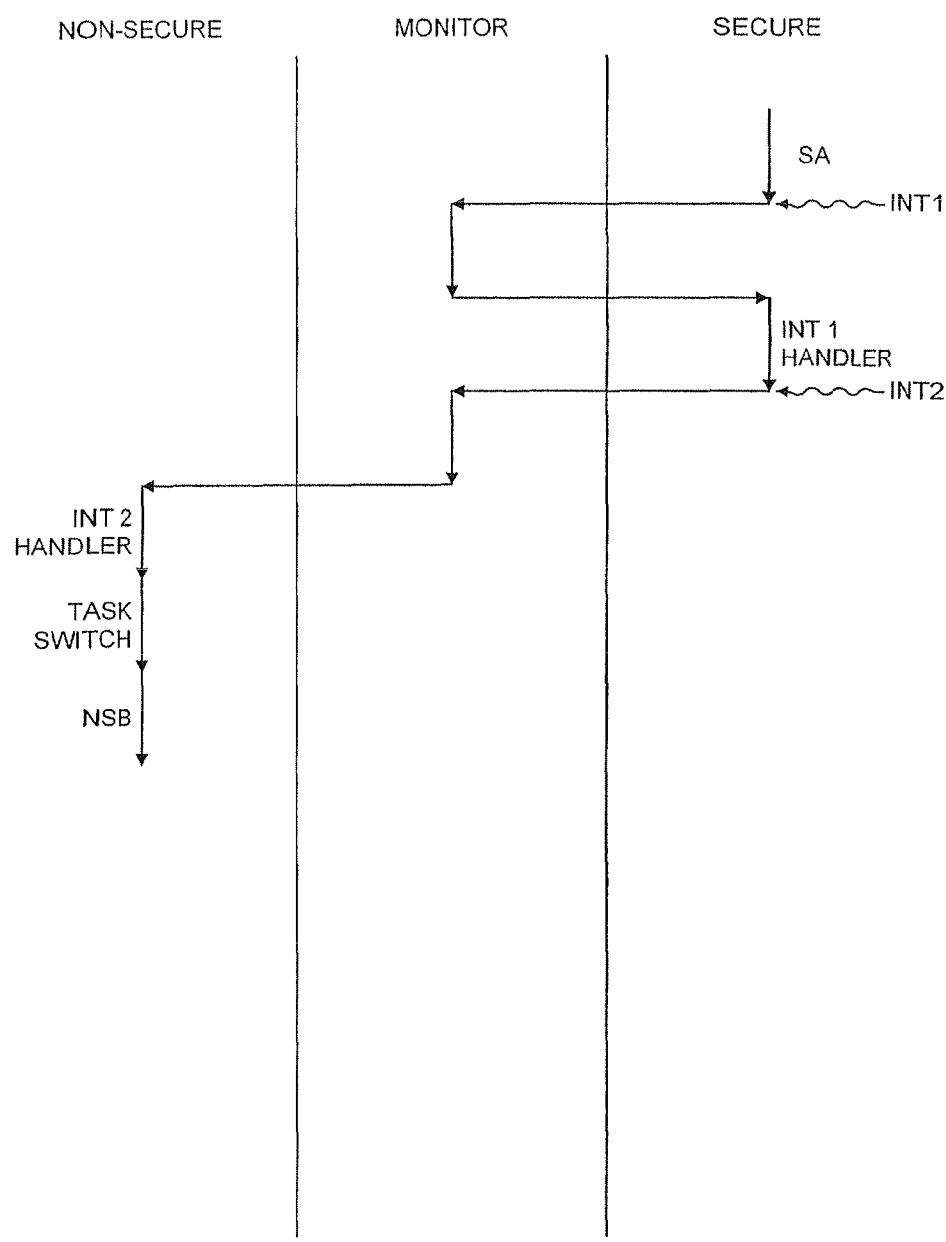
FIG. 32 is a diagram schematically illustrating the problem of interrupt priority inversion which may occur in a system having multiple operating systems where different interrupts may be handled by different operating systems.

FIG. 32 schematically illustrates operation whereby a priority inversion may occur when handling interrupts within a system having multiple operating systems with different interrupts being handled by different operating systems.

Processing starts with the secure operating system executing a secure thread SA. This is then interrupted by a first interrupt Int1. This triggers the monitor program within the monitor mode to determine whether or not the interrupt is to be handled in the secure domain or the non-secure domain. In this case, the interrupt is to be handled in the secure domain and processing is returned to the secure operating system and the interrupt handling routine for interrupt Int1 is started. Partway through execution of the interrupt handling routine for Int1, a further interrupt Int2 is received which has a higher priority. Thus, the interrupt handler for Int1 is stopped and the monitor program in the monitor mode used to determine where the interrupt Int2 is to be handled. In this case the interrupt Int2 is to be handled by the non-secure operating system and accordingly control is passed to the non-secure operating system and the interrupt handler for Int2 started. When this interrupt handler for the interrupt Int2 has completed, the non-secure operating system has no information indicating that there is a pending interrupt Int1 for which servicing has been suspended in the secure domain. Accordingly, the non-secure operating system may perform some further processing, such as a task switch or the starting of a different non-secure thread NSB, whilst the original interrupt Int1 remains unserviced.

Figure 33:
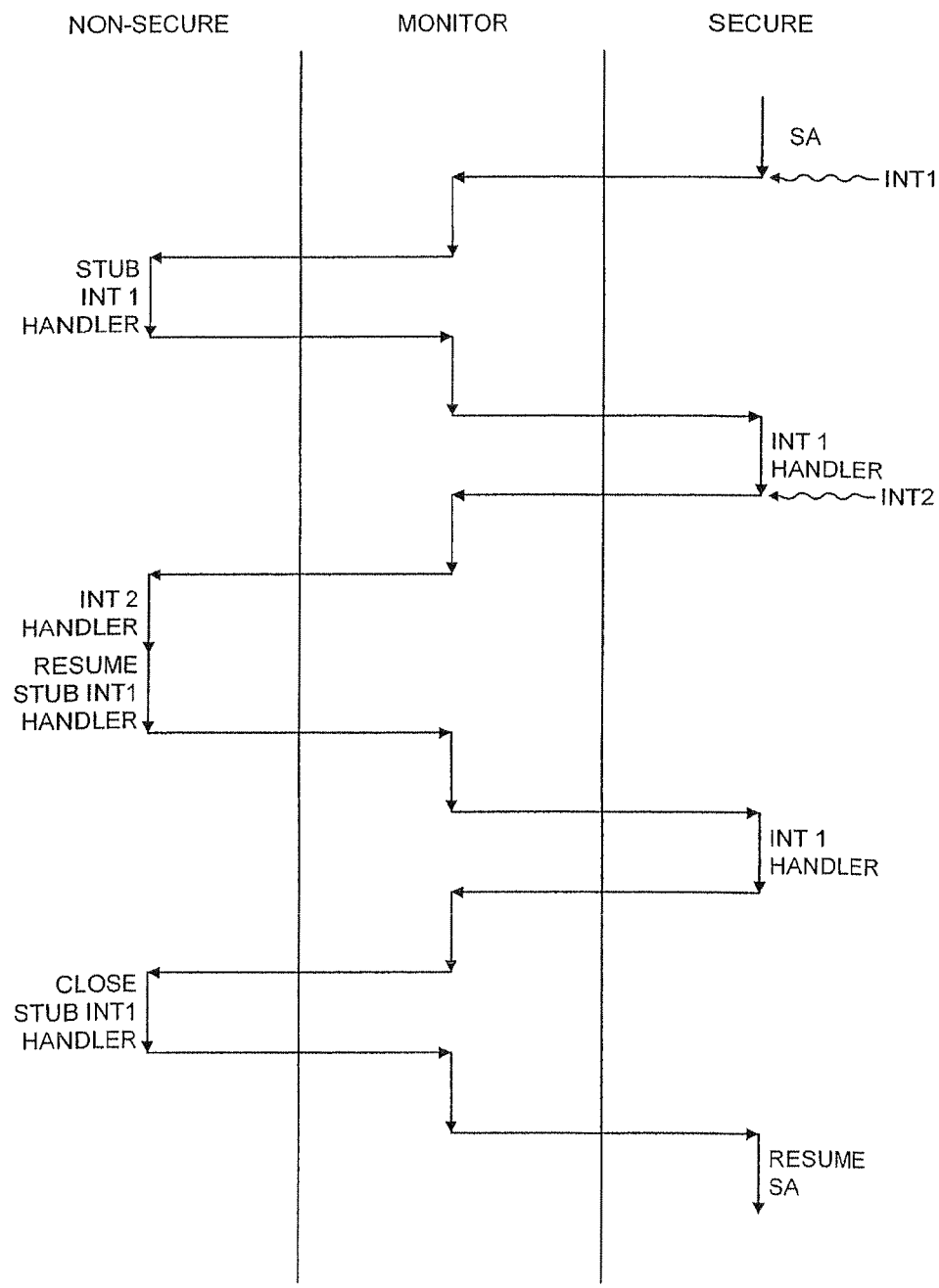
FIG. 33 is a diagram schematically illustrating the use of stub interrupt handlers to avoid the problem illustrated in FIG. 32.

FIG. 33 illustrates a technique whereby the problems associated with the operation of FIG. 32 may be avoided. When the interrupt Int1 occurs, the monitor program passes this to the non-secure domain where a stub interrupt handler is started. This stub interrupt handler is relatively small and quickly returns processing to the secure domain via the monitor mode and triggers an interrupt handler for the interrupt Int1 within the secure domain. The interrupt Int1 is primarily processed within the secure domain and the starting of the stub interrupt handler in the non-secure domain can be regarded as a type of placeholder to indicate to the non-secure domain that the interrupt is pending in the secure domain.

The interrupt handler in the secure domain for the interrupt Int1 is again subject to a high priority Int2. This triggers execution of the interrupt handler for the interrupt Int2 in the non-secure domain as before. However, in this case, when that interrupt handler for Int2 has finished, the non-secure operating system has data indicating that the stub interrupt handler for interrupt Int1 is still outstanding and accordingly will resume this stub interrupt handler. This stub interrupt handler will appear as if it were suspended at the point at which it made its call back to the secure domain and accordingly this call will be re-executed and thus the switch made to the secure domain. Once back in the secure domain, the secure domain can itself re-start the interrupt handler for the interrupt Int1 at the point at which it was suspended. When the interrupt handler for the interrupt Int1 has completed within the secure domain, a call is made back to the non-secure domain to close down the stub interrupt handler in the non-secure domain before the originally executing secure thread SA is resumed.

Figures 34, 35:
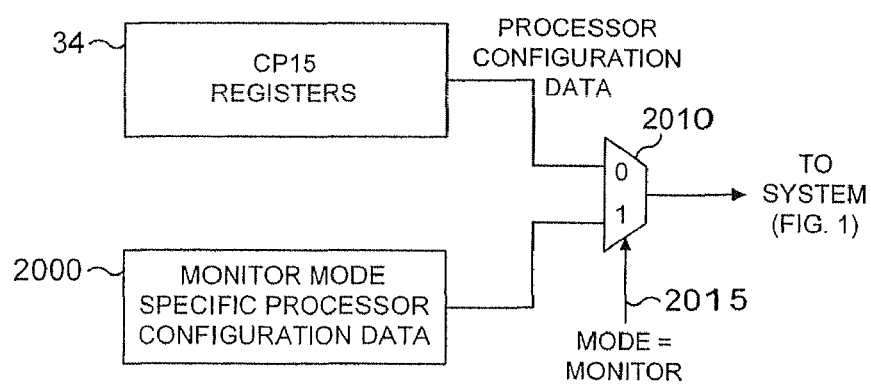
FIG. 34 schematically illustrates how different types and priorities of interrupts may be handled depending upon whether or not they can be interrupted by an interrupt which will be serviced using a different operating system.
FIG. 35 illustrates how the processor configuration data is overridden with monitor mode specific processor configuration data when the processor is operating in monitor mode.

FIG. 34 schematically illustrates different types of interrupt with their associated priorities and how they may be handled. High priority interrupts may be handled using purely secure domain interrupt handlers providing there is no higher priority interrupt that is handled by the non-secure domain. Once there is an interrupt having a priority higher than subsequent interrupts and which is handled in the non-secure domain, then all lower interrupts must either be handled purely in the non-secure domain or utilise the stub interrupt handler technique illustrated in FIG. 33 whereby the non-secure domain can keep track of these interrupts even though their main handling is occurring within the secure domain.

As mentioned earlier, the monitor mode is used to perform switching between the secure domain and the non-secure domain. In embodiments where registers are shared between the two different domains, this involves saving the state within those registers into memory, and then loading the new state for the destination domain from memory into those registers. For any registers which are not shared between the two domains, the state need not be saved away, since those registers will not be accessed by the other domain, and switching between the states is implemented as a direct result of switching between the secure and non-secure domains (i.e. the value of the S bit stored in one of the CP15 registers determines which of the non-shared registers are used)

Part of the state that needs to be switched whilst in the monitor mode is the processor configuration data controlling access to memory by the processor. Since within each domain there is a different view of the memory, for example the secure domain having access to secure memory for storing secure data, this secure memory not being accessible from the non-secure domain, it is clear that the processor configuration data will need to be changed when switching between the domains.

As illustrated in FIG. 35, this processor configuration data is stored within the CP15 registers 34, and in one embodiment these registers are shared between the domains. Hence, when the monitor mode is switched between the secure domain and the non-secure domain, the processor configuration data currently in the CP15 registers 34 needs to be switched out of the CP15 registers into memory, and processor configuration data relating to the destination domain needs to be loaded into the CP15 registers 34.

Since the processor configuration data in the CP15 registers typically has an immediate effect on the access to memory within the system, then it is clear that these settings would become immediately effective as they are updated by the processor whilst operating in the monitor mode. However, this is undesirable since it is desirable for the monitor mode to have a static set of processor configuration data that control access to memory whilst in monitor mode.

Accordingly, as shown in FIG. 35, in one embodiment of the present invention monitor mode specific processor configuration data 2000 is provided, which can be used to override the processor configuration data in the CP15 registers 34 whilst the processor is operating in the monitor mode. This is achieved in the embodiment illustrated in FIG. 35 through the provision of a multiplexer 2010 which receives at its inputs both the processor configuration data stored in the CP15 registers and the monitor mode specific processor configuration data 2000. Furthermore, the multiplexer 2010 receives a control signal over path 2015 indicating whether the processor is currently operating in the monitor mode or not. If the processor is not operating in the monitor mode, then the processor configuration data in the CP15 registers 34 is output to the system, but in the event that the processor is operating in the monitor mode, the multiplexer 2010 instead outputs the monitor mode specific processor configuration data 2000 to ensure that a consistent set of processor configuration data is applied while the processor is operating in the monitor mode.

The monitor mode specific processor configuration data can be hard-coded within the system, thereby ensuring that it cannot be manipulated. However, it is possible that the monitor mode specific processor configuration data 2000 could be made programmable without compromising security, provided that that monitor mode specific processor configuration data could only be modified by the processor when operating in a secure privileged mode. This would allow some flexibility as to the setting of the monitor mode specific processor configuration data. If the monitor mode specific processor configuration data is arranged to be programmable, that configuration data can be stored in any appropriate place within the system, for example within a separate set of registers within the CP15 registers 34.

Typically, the monitor mode specific processor configuration data will be set so as to provide a very secure environment for operation of the processor in the monitor mode. Hence, in the above-described embodiment, the monitor mode specific processor configuration data may specify that the memory management unit 30 is disabled whilst the processor is operating in the monitor mode, thereby disabling any virtual to physical address translation that might otherwise be applied by the memory management unit. In such a situation, the processor will always be arranged to directly issue physical addresses when issuing memory access requests, i.e. flat mapping will be employed. This ensures that the processor can reliably access memory whilst operating in the monitor mode, irrespective of whether any virtual to physical address mappings have been tampered with.

The monitor mode specific processor configuration data would also typically specify that the processor is allowed to access the secure data whilst the processor is operating in the monitor mode. This is preferably specified by memory permission data taking the form of a domain status bit, this domain status bit having the same value that would be specified for the corresponding domain status bit ("S" bit) within the secure processor configuration data. Hence, irrespective of the actual value of the domain status bit stored within the CP15 registers, that value will get overridden by the domain status bit specified by the monitor mode specific processor configuration data, to ensure that the monitor mode has access to secure data.

The monitor mode specific processor configuration data may also specify other data used to control access to parts of the memory. For example, the monitor mode specific processor configuration data may specify that the cache 38 is not to be used to access data whilst the processor is operating in the monitor mode.

In the embodiment described above, it has been assumed that all of the CP15 registers containing processor configuration data are shared between the domains. However, in an alternative embodiment, a number of the CP15 registers are "banked", so that for example there are two registers for storing a particular item of processor configuration data, one register being accessible in the non-secure domain and containing the value of that item of processor configuration data for the non-secure domain, and the other register being accessible in the secure domain and containing the value of that item of processor configuration data for the secure domain.

One CP15 register that will not be banked is the one containing the "S" bit, but in principle any of the other CP15 registers may be banked if desired. In such embodiments, the switching of the processor configuration data by the monitor mode involves switching out of any shared CP15 registers into memory the processor configuration data currently in those shared registers, and loading into those shared CP15 registers the processor configuration data relating to the destination domain. For any banked registers, the processor configuration data need not be stored away to memory, and instead the switching will occur automatically as a result of changing the S bit value stored in the relevant shared CP15 register.

As mentioned earlier, the monitor mode processor configuration data will include a domain status bit which overrides that stored in the relevant CP15 register but has the same value as that used for the domain status bit used in the secure domain (i.e. an S bit value of 1 in the above described embodiments). When a number of the CP15 registers are banked, this means that at least part of the monitor mode specific processor configuration data 2000 in FIG. 35 can be derived from the secure processor configuration data stored in banked registers since those registers contents are not written out to memory during the switching process.

Hence, as an example, since the monitor mode specific processor configuration data will specify a domain status bit to override that which is otherwise used when not in monitor mode, and in preferred embodiments this has the same value as that used in the secure domain, this means that the logic that selects which of the banked CP15 registers are accessible will allow the secure banked CP15 registers to be accessed. By allowing the monitor mode to use this secure processor configuration data as the relevant part of the monitor mode specific processor configuration data, a saving in resource can be realised since it is no longer necessary to provide a separate set of registers for those items of monitor mode specific processor configuration data.

Figure 36:
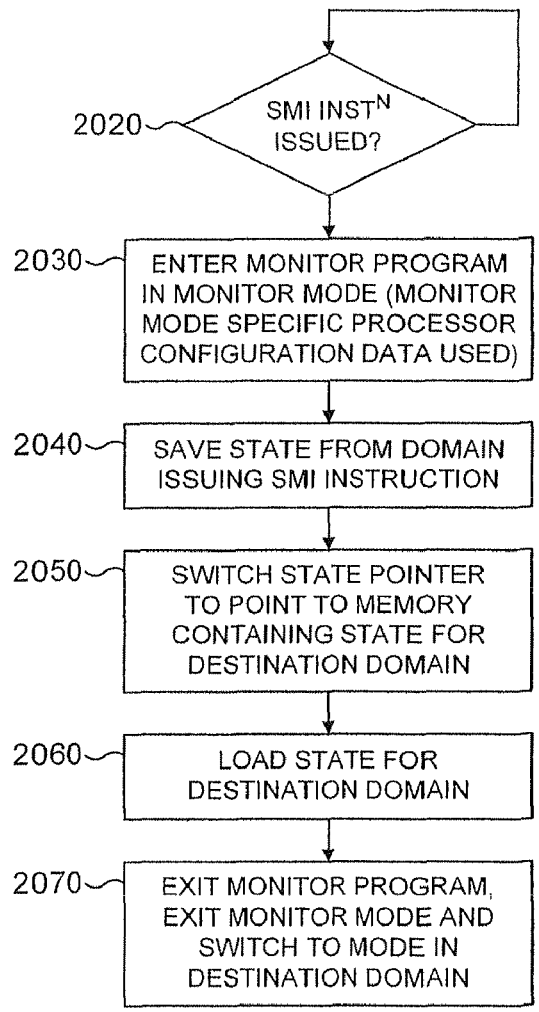
FIG. 36 is a flow diagram illustrating how the processor configuration data is switched when transitioning between the secure domain and the non-secure domain in accordance with one embodiment to the present invention.

FIG. 36 is a flow diagram illustrating the steps performed to switch the processor configuration data when a transition between one domain and the other is required. As mentioned previously, an SMI instruction is issued in order to instigate the transition between domains. Accordingly, at step 2020, the issuance of an SMI instruction is awaited. When an SMI instruction is received, the processor proceeds to step 2030, where the processor begins running the monitor program in monitor mode, this causing the monitor mode specific processor configuration data to be used as a result of the control signal on path 2015 into the multiplexer 2010 causing the multiplexer to switch to that monitor mode specific processor configuration data. As mentioned earlier, this can be a self-contained set of data, or certain parts of it may be derived from the secure processor configuration data stored in banked registers.

Thereafter, at step 2040, the current state is saved from the domain issuing the SMI instruction into memory, this including saving from any shared CP15 registers the state of the processor configuration data relevant to that domain. Typically, there will be a portion of memory set aside for the storage of such state. Then, at step 2050, the state pointer is switched to point to the portion of memory that contains the corresponding state for the destination domain. Hence, typically, there will be two portions of memory allocated for storing state information, one allocated for storing the state for the non-secure domain, and one allocated for storing the state for the secure domain.

Once the state pointer has been switched at step 2050, that state now pointed to by the state pointer is loaded into the relevant shared CP15 registers at step 2060, this including loading in the relevant processor configuration data for the destination domain. Thereafter, at step 2070, the monitor program is exited, as is the monitor mode, and the processor then switches to the required mode in the destination domain.

Figure 37:
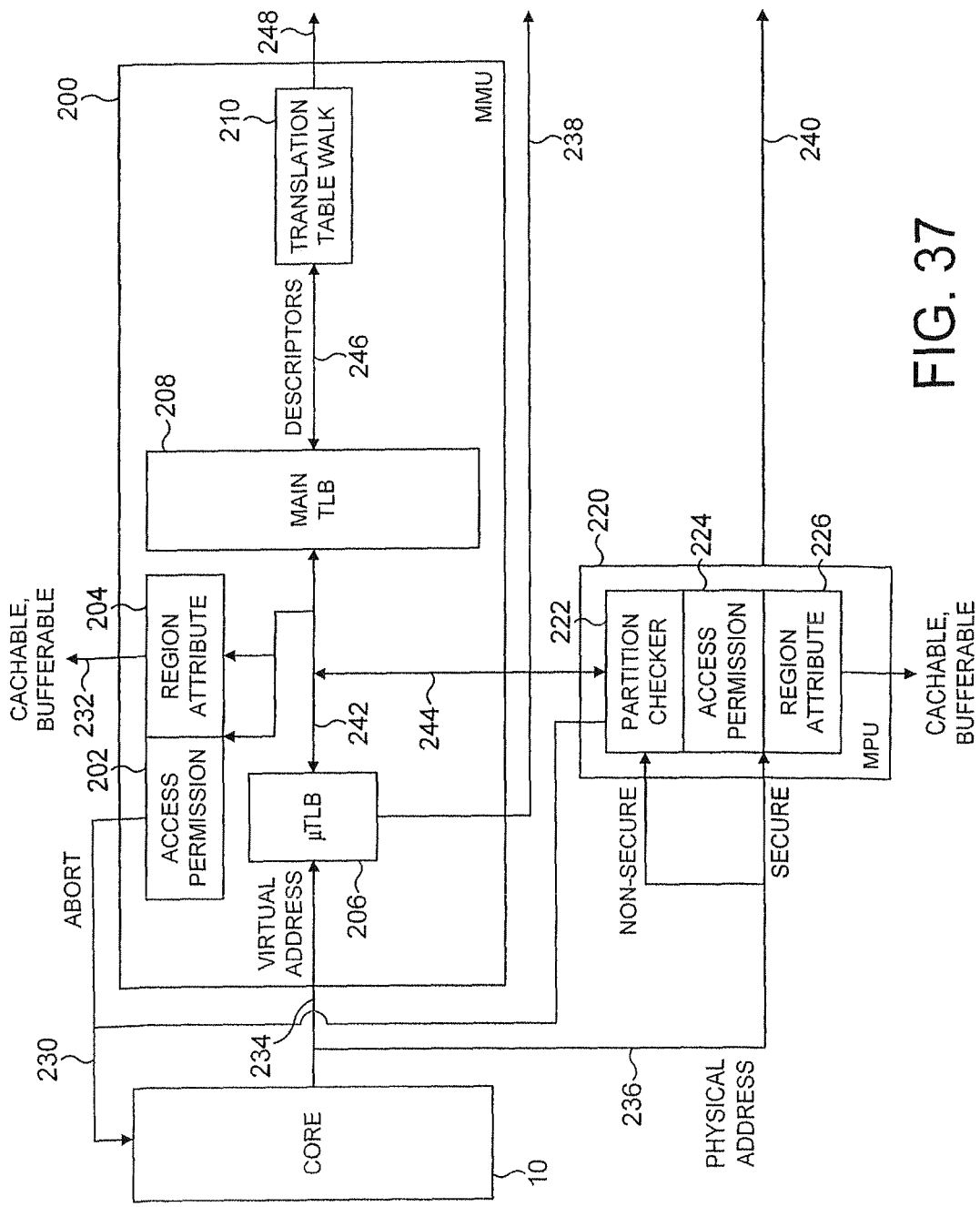
FIG. 37 is a diagram illustrating the memory management logic used in one embodiment of the present invention to control access to memory.

FIG. 37 illustrates in more detail the operation of the memory management logic 30 of one embodiment of the present invention. The memory management logic consists of a Memory Management Unit (MMU) 200 and a Memory Protection Unit (MPU) 220. Any memory access request issued by the core 10 that specifies a virtual address will be passed over path 234 to the MMU 200, the MMU 200 being responsible for performing predetermined access control functions, more particularly for determining the physical address corresponding to that virtual address, and for resolving access permission rights and determining region attributes.

The memory system of the data processing apparatus consists of secure memory and non-secure memory, the secure memory being used to store secure data that is intended only to be accessible by the core 10, or one or more other master devices, when that core or other device is operating in a secure mode of operation, and is accordingly operating in the secure domain.

In the embodiment of the present invention illustrated in FIG. 37, the policing of attempts to access secure data in secure memory by applications running on the core 10 in non-secure mode is performed by the partition checker 222 within the MPU 220, the MPU 220 being managed by the secure operating system, also referred to herein as the secure kernel.

In accordance with preferred embodiments of the present invention a non-secure page table 58 is provided within non-secure memory, for example within a non-secure memory portion of external memory 56, and is used to store for each of a number of non-secure memory regions defined within that page table a corresponding descriptor. The descriptor contains information from which the MMU 200 can derive access control information required to enable the MMU to perform the predetermined access control functions, and accordingly in the embodiment described with reference to FIG. 37 will provide information about the virtual to physical address mapping, the access permission rights, and any region attributes.

Furthermore, in accordance with the preferred embodiments of the present invention, at least one secure page table 58 is provided within secure memory of the memory system, for example within a secure part of external memory 56, which again for a number of memory regions defined within the table provides an associated descriptor. When the processor is operating in a non-secure mode, the non-secure page table will be referenced in order to obtain relevant descriptors for use in managing memory accesses, whilst when the processor is operating in secure mode, descriptors from the secure page table will be used.

The retrieval of descriptors from the relevant page table into the MMU proceeds as follows. In the event that the memory access request issued by the core 10 specifies a virtual address, a lookup is performed in the micro-TLB 206 which stores for one of a number of virtual address portions the corresponding physical address portions obtained from the relevant page table. Hence, the micro-TLB 206 will compare a certain portion of the virtual address with the corresponding virtual address portion stored within the micro-TLB to determine if there is a match. The portion compared will typically be some predetermined number of most significant bits of the virtual address, the number of bits being dependent on the granularity of the pages within the page table 58. The lookup performed within the micro-TLB 206 will typically be relatively quick, since the micro-TLB 206 will only include a relatively few number of entries, for example eight entries In the event that there is no match found within the micro-TLB 206, then the memory access request is passed over path 242 to the main TLB 208 which contains a number of descriptors obtained from the page tables. As will be discussed in more detail later, descriptors from both the non-secure page table and the secure page table can co-exist within the main TLB 208, and each entry within the main TLB has a corresponding flag (referred to herein as a domain flag) which is settable to indicate whether the corresponding descriptor in that entry has been obtained from a secure page table or a non-secure page table. In any embodiments where all secure modes of operation specify physical addresses directly within their memory access requests, it will be appreciated that there will not be a need for such a flag within the main TLB, as the main TLB will only store non-secure descriptors.

Within the main TLB 208, a similar lookup process is performed to determine whether the relevant portion of the virtual address issued within the memory access request corresponds with any of the virtual address portions associated with descriptors in the main TLB 208 that are relevant to the particular mode of operation. Hence, if the core 10 is operating in non-secure mode, only those descriptors within the main TLB 208 which have been obtained from the non-secure page table will be checked, whereas if the core 10 is operating in secure mode, only the descriptors within the main TLB that have been obtained from the secure page table will be checked.

If there is a hit within the main TLB as a result of that checking process, then the access control information is extracted from the relevant descriptor and passed back over path 242. In particular, the virtual address portion and the corresponding physical address portion of the descriptor will be routed over path 242 to the micro-TLB 206, for storage in an entry of the micro-TLB, the access permission rights will be loaded into the access permission logic 202, and the region attributes will be loaded into the region attribute logic 204.

The access permission logic 202 and region attribute logic 204 may be separate to the micro-TLB, or may be incorporated within the micro-TLB.

At this point, the MMU 200 is then able to process the memory access request since there will now be a hit within the micro-TLB 206. Accordingly, the micro-TLB 206 will generate the physical address, which can then be output over path 238 onto the system bus 40 for routing to the relevant memory, this being either on-chip memory such as the TCM 36, cache 38, etc, or one of the external memory units accessible via the external bus interface 42. At the same time, the access permission logic 202 will determine whether the memory access is allowed, and will issue an abort signal back to the core 10 over path 230 if it determines that the core is not allowed to access the specified memory location in its current mode of operation. For example, certain portions of memory, whether in secure memory or non-secure memory, may be specified as only being accessible by the core when that core is operating in supervisor mode, and accordingly if the core 10 is seeking to access such a memory location when in, for example, user mode, the access permission logic 202 will detect that the core 10 does not currently have the appropriate access rights, and will issue the abort signal over path 230. This will cause the memory access to be aborted. Finally, the region attribute logic 204 will determine the region attributes for the particular memory access, such as whether the access is cacheable, bufferable, etc, and will issue such signals over path 232, where they will then be used to determine whether the data the subject of the memory access request can be cached, for example within the cache 38, whether in the event of a write access the write data can be buffered, etc.

In the event that there was no hit within the main TLB 208, then the translation table walk logic 210 is used to access the relevant page table 58 in order to retrieve the required descriptor over path 248, and then pass that descriptor over path 246 to the main TLB 208 for storage therein. The base address for both the non-secure page table and the secure page table will be stored within registers of CP15 34, and the current domain in which the processor core 10 is operating, i.e. secure domain or non-secure domain, will also be set within a register of CP15, that domain status register being set by the monitor mode when a transition occurs between the non-secure domain and the secure domain, or vice versa. The content of the domain status register will be referred to herein as the domain bit. Accordingly, if a translation table walk process needs to be performed, the translation table walk logic 210 will know in which domain the core 10 is executing, and accordingly which base address to use to access the relevant table. The virtual address is then used as an offset to the base address in order to access the appropriate entry within the appropriate page table in order to obtain the required descriptor.

Once the descriptor has been retrieved by the translation table walk logic 210, and placed within the main TLB 208, a hit will then be obtained within the main TLB, and the earlier described process will be invoked to retrieve the access control information, and store it within the micro-TLB 206, the access permission logic 202 and the region attribute logic 204. The memory access can then be actioned by the MMU 200.

As mentioned earlier, in preferred embodiments, the main TLB 208 can store descriptors from both the secure page table and the non-secure page table, but the memory access requests are only processed by the MMU 200 once the relevant information is stored within the micro-TLB 206. In preferred embodiments, the transfer of information between the main TLB 208 and the micro-TLB 206 is monitored by the partition checker 222 located within the MPU 220 to ensure that, in the event that the core 10 is operating in a non-secure mode, no access control information is transferred into the micro-TLB 206 from descriptors in the main TLB 208 if that would cause a physical address to be generated which is within secure memory.

The memory protection unit is managed by the secure operating system, which is able to set within registers of the CP15 34 partitioning information defining the partitions between the secure memory and the non-secure memory. The partition checker 222 is then able to reference that partitioning information in order to determine whether access control information is being transferred to the micro-TLB 206 which would allow access by the core 10 in a non-secure mode to secure memory. More particularly, in preferred embodiments, when the core 10 is operating in a non-secure mode of operation, as indicated by the domain bit set by the monitor mode within the CP15 domain status register, the partition checker 222 is operable to monitor via path 244 any physical address portion seeking to be retrieved into the micro-TLB 206 from the main TLB 208 and to determine whether the physical address that would then be produced for the virtual address based on that physical address portion would be within the secure memory. In such circumstances, the partition checker 222 will issue an abort signal over path 230 to the core 10 to prevent the memory access from taking place.

It will be appreciated that in addition the partition checker 222 can be arranged to actually prevent that physical address portion from being stored in the micro-TLB 206 or alternatively the physical address portion may still be stored within the micro-TLB 206, but part of the abort process would be to remove that incorrect physical address portion from the micro-TLB 206, for example by flushing the micro-TLB 206.

Whenever the core 10 changes via the monitor mode between a non-secure mode and a secure mode of operation, the monitor mode will change the value of the domain bit within the CP15 domain status register to indicate the domain into which the processor's operation is changing. As part of the transfer process between domains, the micro-TLB 206 will be flushed and accordingly the first memory access following a transition between secure domain and non-secure domain will produce a miss in the micro-TLB 206, and require access information to be retrieved from main TLB 208, either directly, or via retrieval of the relevant descriptor from the relevant page table.

By the above approach, it will be appreciated that the partition checker 222 will ensure that when the core is operating in the non-secure domain, an abort of a memory access will be generated if an attempt is made to retrieve into the micro-TLB 206 access control information that would allow access to secure memory.

If in any modes of operation of the processor core 10, the memory access request is arranged to specify directly a physical address, then in that mode of operation the MMU 200 will be disabled, and the physical address will pass over path 236 into the MPU 220. In a secure mode of operation, the access permission logic 224 and the region attribute logic 226 will perform the necessary access permission and region attribute analysis based on the access permission rights and region attributes identified for the corresponding regions within the partitioning information registers within the CP15 34. If the secure memory location seeking to be accessed is within a part of secure memory only accessible in a certain mode of operation, for example secure privileged mode, then an access attempt by the core in a different mode of operation, for example a secure user mode, will cause the access permission logic 224 to generate an abort over path 230 to the core in the same way that the access permission logic 202 of the MMU would have produced an abort in such circumstances. Similarly, the region attribute logic 226 will generate cacheable and bufferable signals in the same way that the region attribute logic 204 of the MMU would have generated such signals for memory access requests specified with virtual addresses. Assuming the access is allowed, the access request will then proceed over path 240 onto the system bus 40, from where it is routed to the appropriate memory unit.

For a non-secure access where the access request specifies a physical address, the access request will be routed via path 236 into the partition checker 222, which will perform partition checking with reference to the partitioning information in the CP15 registers 34 in order to determine whether the physical address specifies a location within secure memory, in which event the abort signal will again be generated over path 230.

Figure 39:
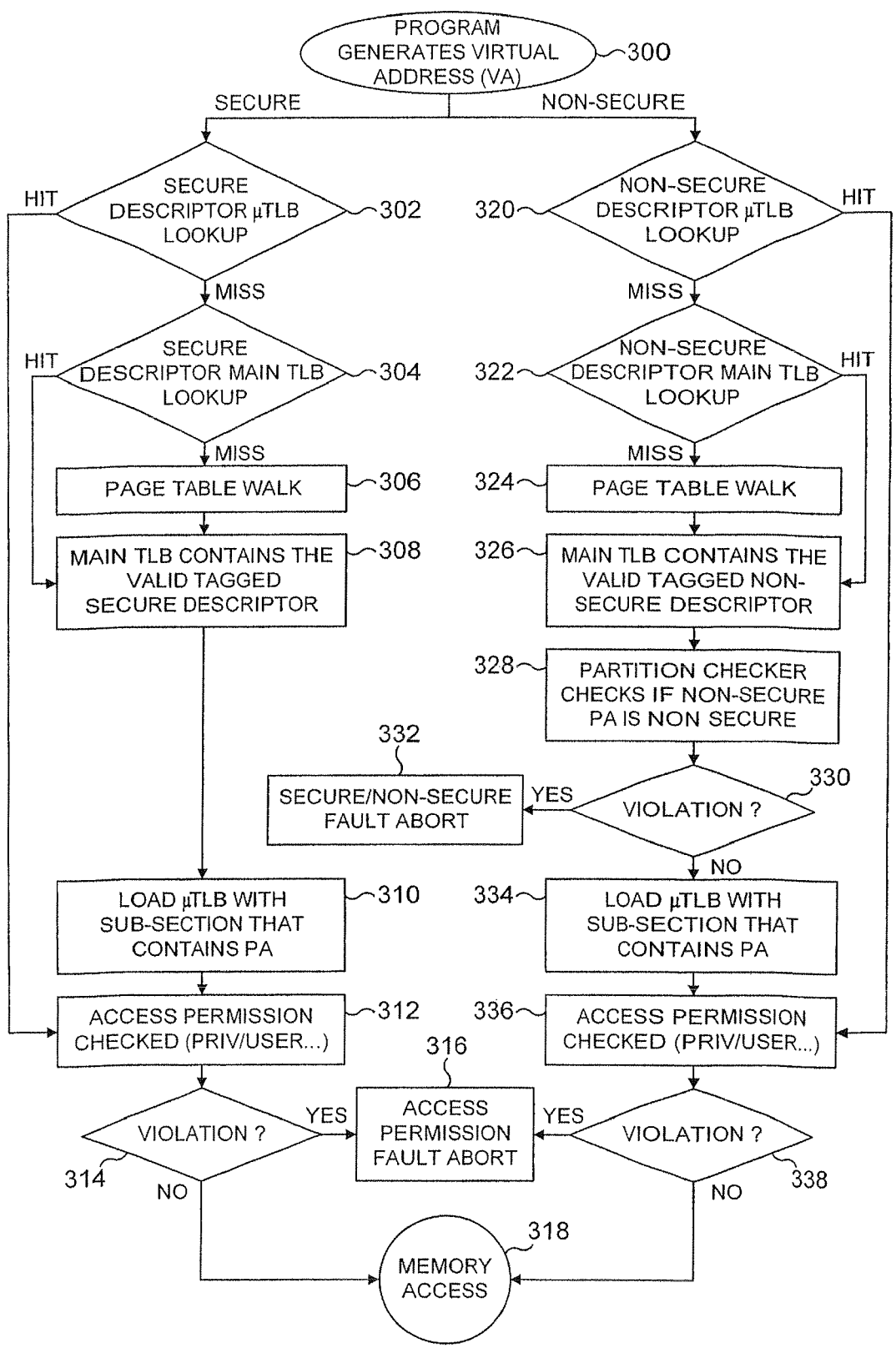
FIG. 39 is a flow diagram illustrating the process performed in one embodiment of the present invention within the memory management logic to process a memory access request that specifies a virtual address.
Figure 40:
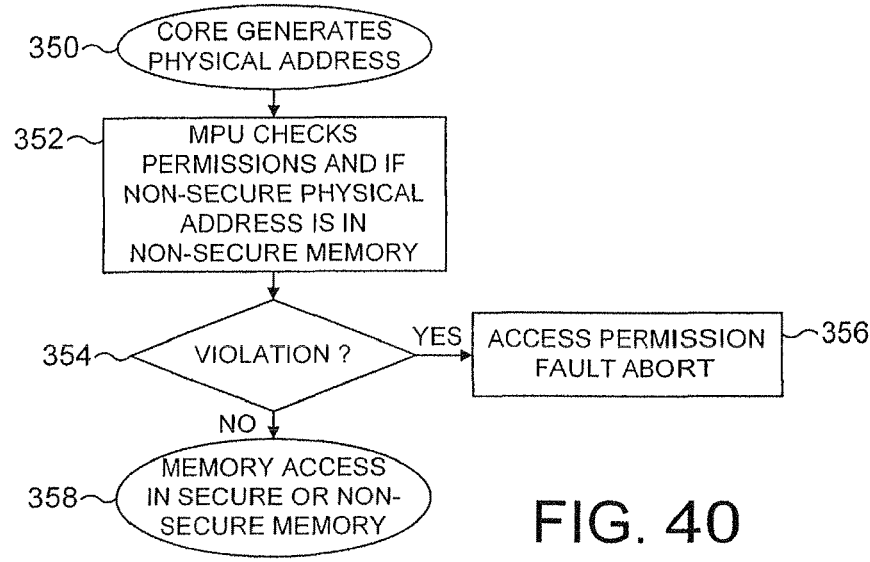
FIG. 40 is a flow diagram illustrating the process performed in one embodiment of the present invention within the memory management logic to process a memory access request that specifies a physical address.

The above described processing of the memory management logic will now be described in more detail with reference to the flow diagrams of FIGS. 39 and 40. FIG. 39 illustrates the situation in which the program running on the core 10 generates a virtual address, as indicated by step 300. The relevant domain bit within the CP15 domain status register 34 as set by the monitor mode will indicate whether the core is currently running in a secure domain or the non-secure domain. In the event that the core is running in the secure domain, the process branches to step 302, where a lookup is performed within the micro-TLB 206 to see if the relevant portion of the virtual address matches with one of the virtual address portions within the micro-TLB. In the event of a hit at step 302, the process branches directly to step 312, where the access permission logic 202 performs the necessary access permission analysis. At step 314, it is then determined whether there is an access permission violation, and if there is the process proceeds to step 316, where the access permission logic 202 issues an abort over path 230. Otherwise, in the absence of such an access permission violation, the process proceeds from step 314 to step 318, where the memory access proceeds. In particular the region attribute logic 204 will output the necessary cacheable and bufferable attributes over path 232, and the micro-TLB 206 will issue the physical address over path 238 as described earlier.

If at step 302 there is a miss in the micro-TLB, then a lookup process is performed within the main TLB 208 at step 304 to determine whether the required secure descriptor is present within the main TLB. If not, then a page table walk process is executed at step 306, whereby the translation table walk logic 210 obtains the required descriptor from the secure page table, as described earlier with reference to FIG. 37. The process then proceeds to step 308, or proceeds directly to step 308 from step 304 in the event that the secure descriptor was already in the main TLB 208.

At step 308, it is determined that the main TLB now contains the valid tagged secure descriptor, and accordingly the process proceeds to step 310, where the micro-TLB is loaded with the sub-section of the descriptor that contains the physical address portion. Since the core 10 is currently running in secure mode, there is no need for the partition checker 222 to perform any partition checking function.

The process then proceeds to step 312 where the remainder of the memory access proceeds as described earlier.

In the event of a non-secure memory access, the process proceeds from step 300 to step 320, where a lookup process is performed in the micro-TLB 206 to determine whether the corresponding physical address portion from a non-secure descriptor is present. If it is, then the process branches directly to step 336, where the access permission rights are checked by the access permission logic 202. It is important to note at this point that if the relevant physical address portion is within the micro-TLB, it is assumed that there is no security violation, since the partition checker 222 effectively polices the information prior to it being stored within the micro-TLB, such that if the information is within the micro-TLB, it is assumed to be the appropriate non-secure information. Once the access permission has been checked at step 336, the process proceeds to step 338, where it is determined whether there is any violation, in which event an access permission fault abort is issued at step 316. Otherwise, the process proceeds to step 318 where the remainder of the memory access is performed, as discussed earlier.

In the event that at step 320 no hit was located in the micro-TLB, the process proceeds to step 322, where a lookup process is performed in the main TLB 208 to determine whether the relevant non-secure descriptor is present. If not, a page table walk process is performed at step 324 by the translation table walk logic 210 in order to retrieve into the main TLB 208 the necessary non-secure descriptor from the non-secure page table. The process then proceeds to step 326, or proceeds directly to step 326 from step 322 in the event that a hit within the main TLB 208 occurred at step 322. At step 326, it is determined that the main TLB now contains the valid tagged non-secure descriptor for the virtual address in question, and then at step 328 the partition checker 222 checks that the physical address that would be generated from the virtual address of the memory access request (given the physical address portion within the descriptor) will point to a location in non-secure memory. If not, i.e. if the physical address points to a location in secure memory, then at step 330 it is determined that there is a security violation, and the process proceeds to step 332 where a secure/non-secure fault abort is issued by the partition checker 222.

If however the partition checker logic 222 determines that there is no security violation, the process proceeds to step 334, where the micro-TLB is loaded with the sub-section of the relevant descriptor that contains the physical address portion, whereafter at step 336 the memory access is then processed in the earlier described manner.

The handling of memory access requests that directly issue a physical address will now be described with reference to FIG. 40. As mentioned earlier, in this scenario, the MMU 200 will be deactivated, this preferably being achieved by the setting within a relevant register of the CP15 registers an MMU enable bit, this setting process being performed by the monitor mode. Hence, at step 350 the core 10 will generate a physical address which will be passed over path 236 into the MPU 220. Then, at step 352, the MPU checks permissions to verify that the memory access being requested can proceed given the current mode of operation, i.e. user, supervisor, etc. Furthermore, if the core is operating in non-secure mode, the partition checker 222 will also check at step 352 whether the physical address is within non-secure memory. Then, at step 354, it is determined whether there is a violation, i.e. whether the access permission processing has revealed a violation, or if in non-secure mode, the partition checking process has identified a violation. If either of these violations occurs, then the process proceeds to step 356 where an access permission fault abort is generated by the MPU 220. It will be appreciated that in certain embodiments there may be no distinction between the two types of abort, whereas in alternative embodiments the abort signal could indicate whether it relates to an access permission fault or a security fault.

If no violation is detected at step 354, the process proceeds to step 358, where the memory access to the location identified by the physical address occurs.

In preferred embodiments only the monitor mode is arranged to generate physical addresses directly, and accordingly in all other cases the MMU 200 will be active and generation of the physical address from the virtual address of the memory access request will occur as described earlier.

Figure 38:
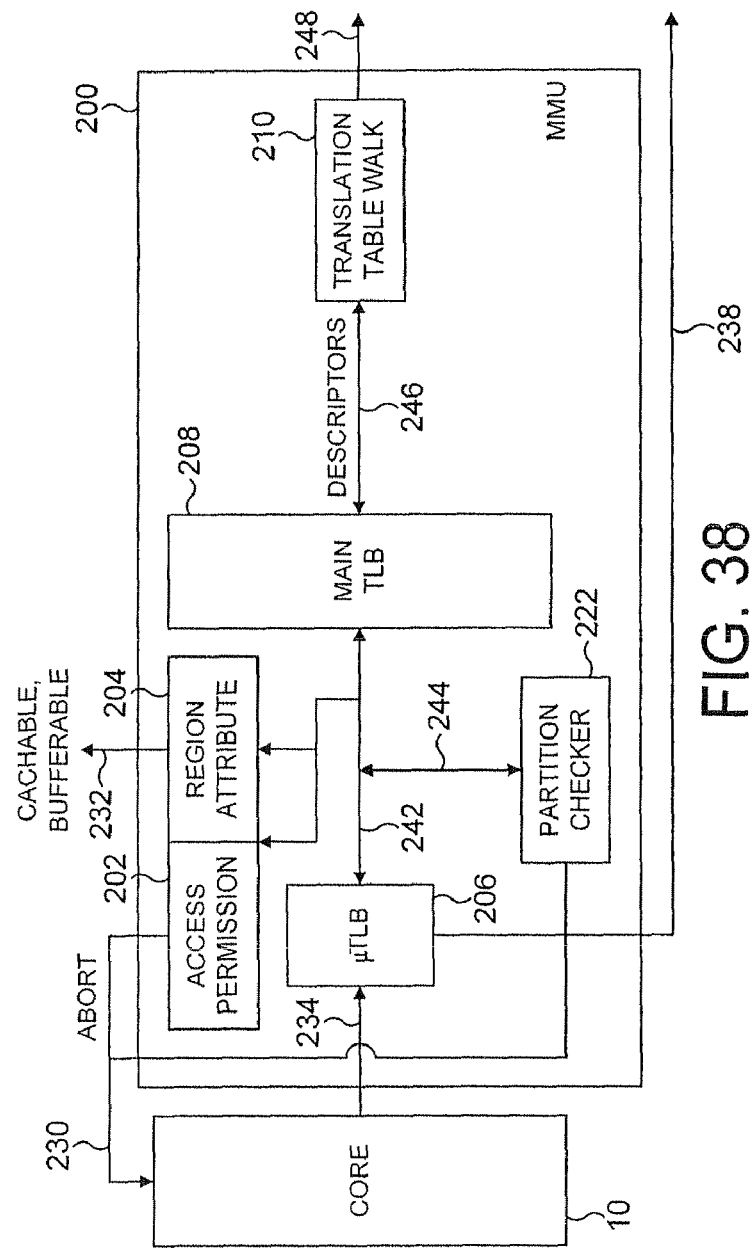
FIG. 38 is a block diagram illustrating the memory management logic of a second embodiment of the present invention used to control access to memory.

FIG. 38 illustrates an alternative embodiment of the memory management logic in a situation where all memory access requests specify a virtual address, and accordingly physical addresses are not generated directly in any of the modes of operation. In this scenario, it will be appreciated that a separate MPU 220 is not required, and instead the partition checker 222 can be incorporated within the MMU 200. This change aside, the processing proceeds in exactly the same manner as discussed earlier with reference to FIGS. 37 and 39.

It will be appreciated that various other options are also possible. For example, assuming memory access requests may be issued by both secure and non-secure modes specifying virtual addresses, two MMUs could be provided, one for secure access requests and one for non-secure access requests, i.e. MPU 220 in FIG. 37 could be replaced by a complete MMU. In such cases, the use of flags with the main TLB of each MMU to define whether descriptors are secure or non-secure would not be needed, as one MMU would store non-secure descriptors in its main TLB, and the other MMU would store secure descriptors in its main TLB. Of course, the partition checker would still be required to check whether an access to secure memory is being attempted whilst the core is in the non-secure domain.

If, alternatively, all memory access requests directly specified physical addresses, an alternative implementation might be to use two MPUs, one for secure access requests and one for non-secure access requests. The MPU used for non-secure access requests would have its access requests policed by a partition checker to ensure accesses to secure memory are not allowed in non-secure modes.

As a further feature which may be provided with either the FIG. 37 or the FIG. 38 arrangement, the partition checker 222 could be arranged to perform some partition checking in order to police the activities of the translation table walk logic 210. In particular, if the core is currently operating in the non-secure domain, then the partition checker 222 could be arranged to check, whenever the translation table walk logic 210 is seeking to access a page table, that it is accessing the non-secure page table rather than the secure page table. If a violation is detected, an abort signal would preferably be generated. Since the translation table walk logic 210 typically performs the page table lookup by combining a page table base address with certain bits of the virtual address issued by the memory access request, this partition checking may involve, for example, checking that the translation table walk logic 210 is using a base address of a non-secure page table rather than a base address of a secure page table.

Figure 41:
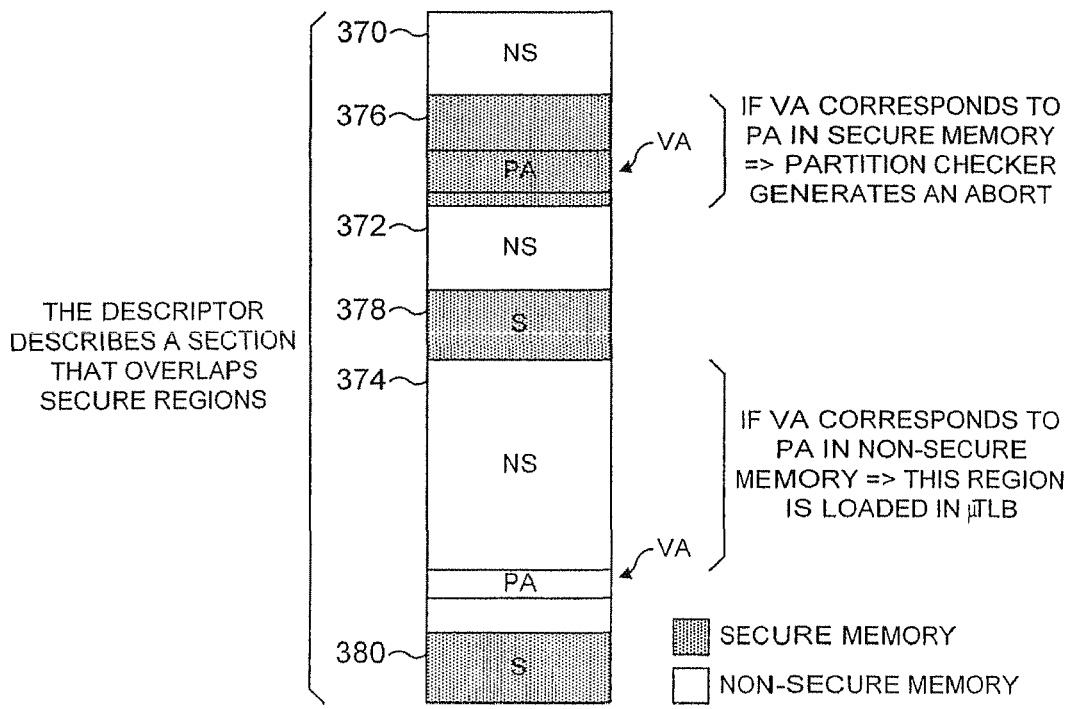
FIG. 41 schematically illustrates how the partition checker of preferred embodiments is operable to prevent access to a physical address within secure memory when the device issuing the memory access request is operating in a non-secure mode.

FIG. 41 illustrates schematically the process performed by the partition checker 222 when the core 10 is operating in a non-secure mode. It will be appreciated that in normal operation a descriptor obtained from the non-secure page table should describe a page mapped in non-secure memory only. However, in the case of software attack, the descriptor may be tampered with in order that it now describes a section that contains both non-secure and secure regions of memory. Hence, considering the example in FIG. 41, the corrupted non-secure descriptor may cover a page that includes non-secure areas 370, 372, 374 and secure areas 376, 378, 380. If the virtual address issued as part of the memory access request would then correspond to a physical address in a secure memory region, for example the secure memory region 376 as illustrated in FIG. 41, then the partition checker 222 is arranged to generate an abort to prevent that access taking place. Hence, even though the non-secure descriptor has been corrupted in an attempt to gain access to secure memory, the partition checker 222 prevents the access taking place. In contrast, if the physical address that would be derived using this descriptor corresponds to a non-secure memory region, for example region 374 as illustrated in FIG. 41, then the access control information loaded into the micro-TLB 206 merely identifies this non-secure region 374. Hence, accesses within that non-secure memory region 374 can occur but no accesses into any of the secure regions 376, 378 or 380 can occur. Thus, it can be seen that even though the main TLB 208 may contain descriptors from the non-secure page table that have been tampered with, the micro-TLB will only contain physical address portions that will enable access to non-secure memory regions.

Figure 42:
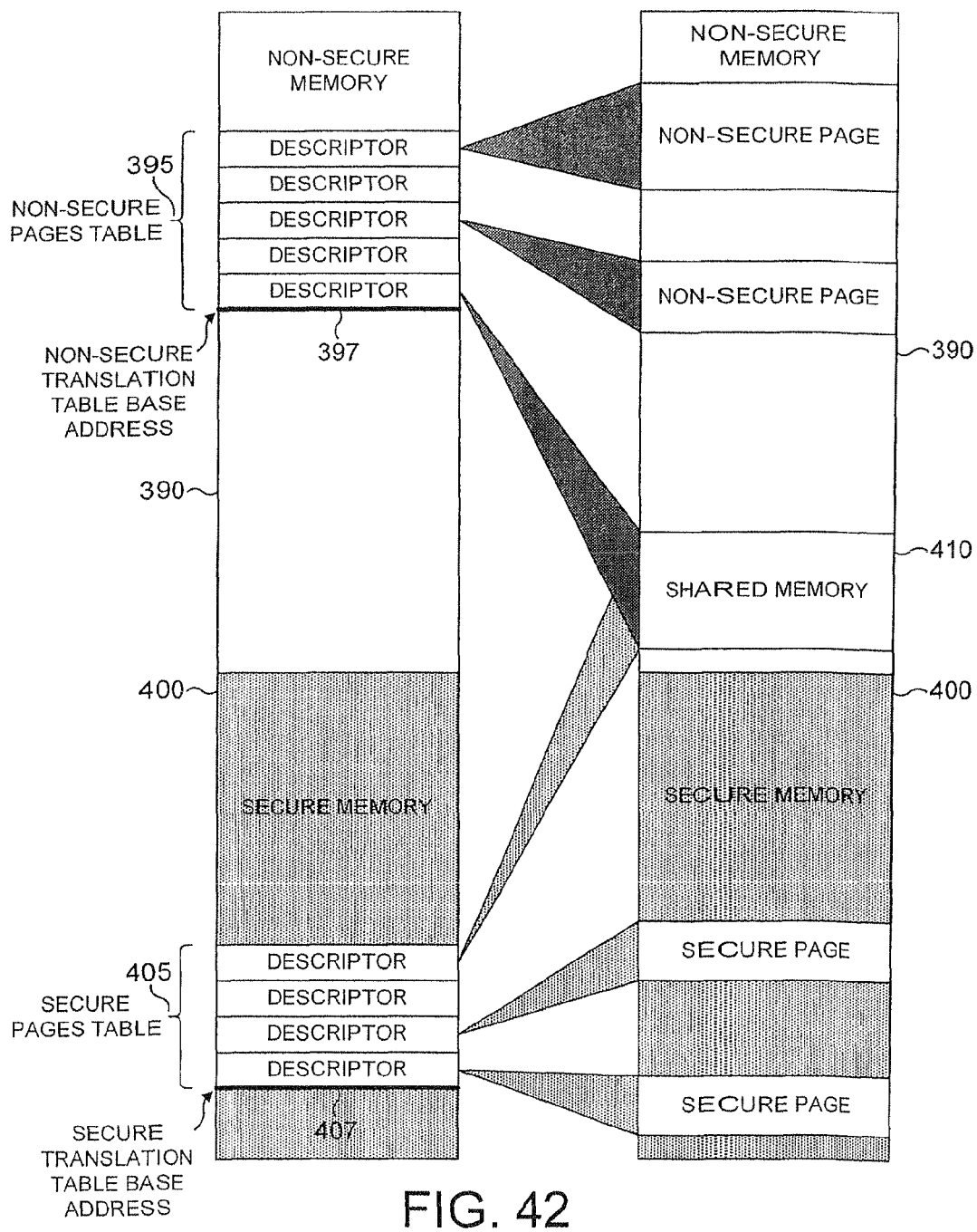
FIG. 42 is a diagram illustrating the use of both a non-secure page table and a secure page table in preferred embodiments of the present invention.

As described earlier, in embodiments where both non-secure modes and secure modes may generate memory access requests specifying virtual addresses, then the memory preferably comprises both a non-secure page table within non-secure memory, and a secure page table within secure memory. When in non-secure mode, the non-secure page table will be referenced by the translation table walk logic 210, whereas when in secure mode, the secure page table will be referenced by the translation table walk logic 210. FIG. 42 illustrates these two page tables. As shown in FIG. 42, the non-secure memory 390, which may for example be within external memory 56 of FIG. 1, includes within it a non-secure page table 395 specified in a CP15 register 34 by reference to a base address 397. Similarly, within secure memory 400, which again may be within the external memory 56 of FIG. 1, a corresponding secure page table 405 is provided which is specified within a duplicate CP15 register 34 by a secure page table base address 407. Each descriptor within the non-secure page table 395 will point to a corresponding non-secure page in non-secure memory 390, whereas each descriptor within the secure page table 405 will define a corresponding secure page in the secure memory 400. In addition, as will be described in more detail later, it is possible for certain areas of memory to be shared memory regions 410, which are accessible by both non-secure modes and secure modes.

Figure 43:
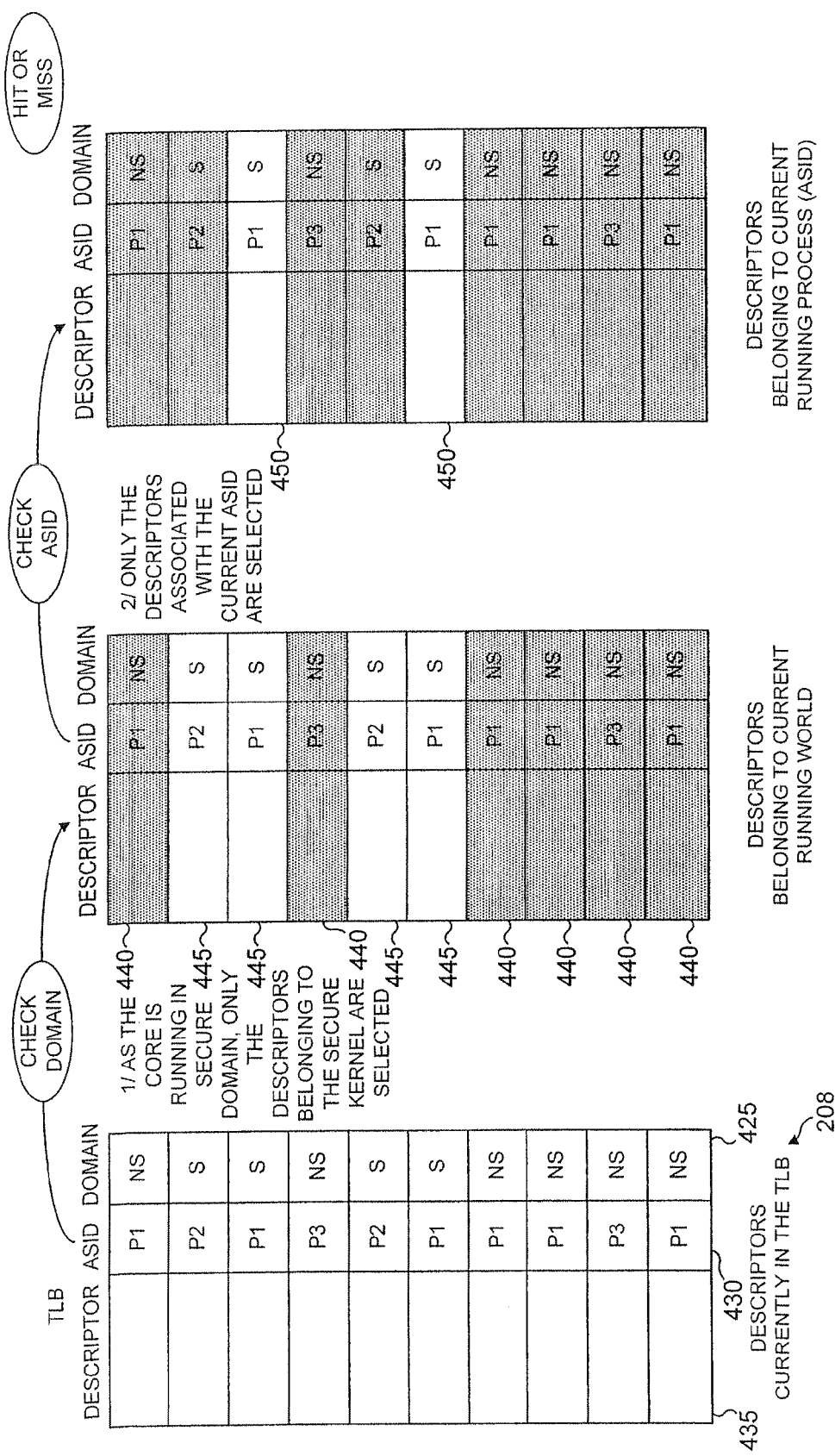
FIG. 43 is a diagram illustrating two forms of flag used within the main translation lookaside buffer (TLB) of preferred embodiments.

FIG. 43 illustrates in more detail the lookup process performed within the main TLB 208 in accordance with preferred embodiments. As mentioned earlier, the main TLB 208 includes a domain flag 425 which identifies whether the corresponding descriptor 435 is from the secure page table or the non-secure page table. This ensures that when a lookup process is performed, only the descriptors relevant to the particular domain in which the core 10 is operating will be checked. FIG. 43 illustrates an example where the core is running in the secure domain, also referred to as the secure world. As can be seen from FIG. 43, when a main TLB 208 lookup is performed, this will result in the descriptors 440 being ignored, and only the descriptors 445 being identified as candidates for the lookup process.

In accordance with preferred embodiments, an additional process ID flag 430, also referred to herein as the ASID flag, is provided to identify descriptors from process specific page tables. Accordingly, processes P1, P2 and P3 may each have corresponding page tables provided within the memory, and further may have different page tables for non-secure operation and secure operation. Further, it will be appreciated that the processes P1, P2, P3 in the secure domain may be entirely separate processes to the processes P1, P2, P3 in the non-secure domain. Accordingly, as shown in FIG. 43, in addition to checking the domain when a main TLB lookup 208 is required, the ASID flag is also checked.

Accordingly, in the example in FIG. 43 where in the secure domain, process P1 is executing, this lookup process identifies just the two entries 450 within the main TLB 208, and a hit or miss is then generated dependent on whether the virtual address portion within those two descriptors matches with the corresponding portion of the virtual address issued by the memory access request. If it does, then the relevant access control information is extracted and passed to the micro-TLB 206, the access permission logic 202 and the region attribute logic 204. Otherwise, a miss occurs, and the translation table walk logic 210 is used to retrieved into the main TLB 208 the required descriptor from the page table provided for secure process P1. As will be appreciated by those skilled in the art, there are many techniques for managing the content of a TLB, and accordingly when a new descriptor is retrieved for storage in the main TLB 208, and the main TLB is already full, any one of a number of known techniques may be used to determine which descriptor to evict from the main TLB to make room for the new descriptor, for example least recently used approaches, etc.

It will be appreciated that the secure kernel used in secure modes of operation may be developed entirely separately to the non-secure operating system. However, in certain cases the secure kernel and the non-secure operating system development may be closely linked, and in such situations it may be appropriate to allow secure applications to use the non-secure descriptors. Indeed, this will allow the secure applications to have direct access to non-secure data (for sharing) by knowing only the virtual address. This of course presumes that the secure virtual mapping and the non-secure virtual mapping are exclusive for a particular ASID. In such scenarios, the tag introduced previously (i.e. the domain flag) to distinguish between secure and non-secure descriptors will not be needed. The lookup in the TLB is instead then performed with all of descriptors available.

In preferred embodiments, the choice between this configuration of the main TLB, and the earlier described configuration with separate secure and non-secure descriptors, can be set by a particular bit provided within the CP15 control registers. In preferred embodiments, this bit would only be set by the secure kernel.

In embodiments where the secure application were directly allowed to use a non-secure virtual address, it would be possible to make a non-secure stack pointer available from the secure domain. This can be done by copying a non-secure register value identifying the non-secure stack pointer into a dedicated register within the CP15 registers 34. This will then enable the non-secure application to pass parameters via the stack according to a scheme understood by the secure application.

As described earlier, the memory may be partitioned into non-secure and secure parts, and this partitioning is controlled by the secure kernel using the CP15 registers 34 dedicated to the partition checker 222. The basic partitioning approach is based on region access permissions as definable in typical MPU devices. Accordingly, the memory is divided into regions, and each region is preferably defined with its base address, size, memory attributes and access permissions. Further, when overlapping regions are programmed, the attributes of the upper region take highest priority. Additionally, in accordance with preferred embodiments of the present invention, a new region attribute is provided to define whether that corresponding region is in secure memory or in nonsecure memory. This new region attribute is used by the secure kernel to define the part of the memory that is to be protected as secure memory.

Figure 44:
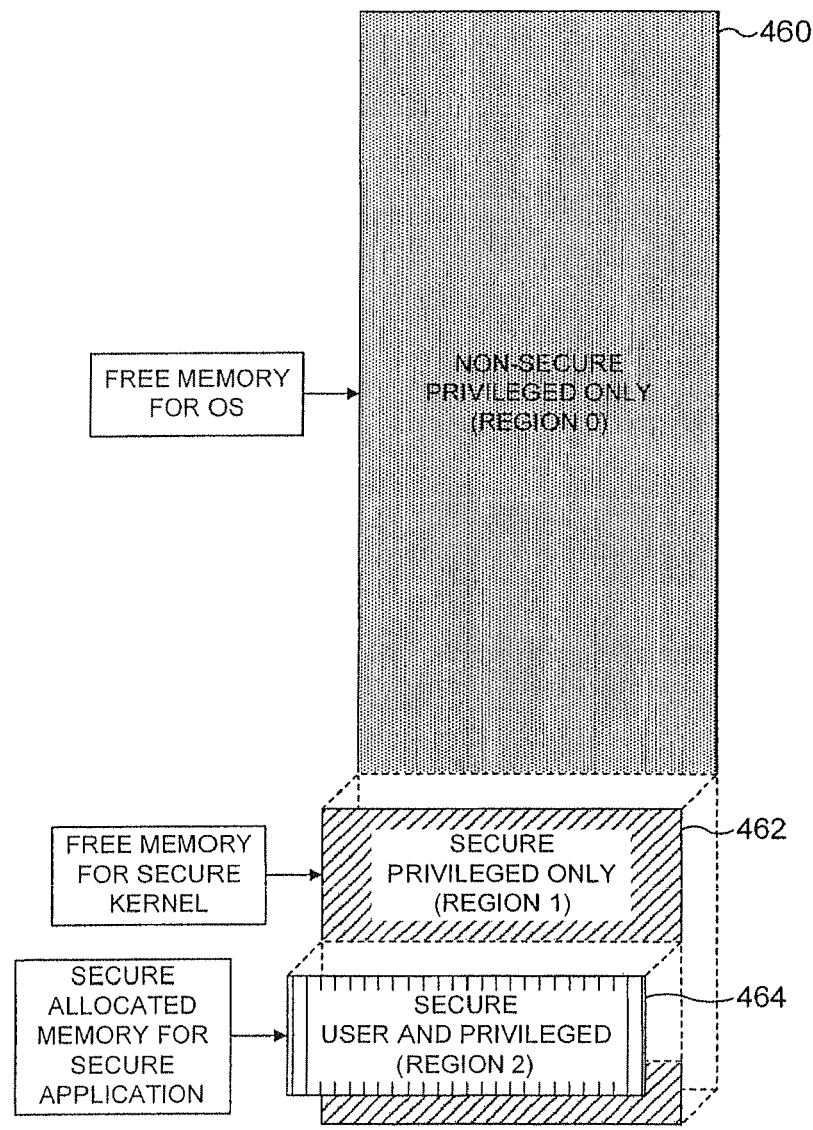
FIG. 44 illustrates how memory may be partitioned after a boot stage in one embodiment of the present invention.

At the boot stage, a first partition is performed as illustrated in FIG. 44. This initial partition will determine the amount of memory 460 allocated to the non-secure world, non-secure operating system and non-secure applications. This amount corresponds to the non-secure region defined in the partition. This information will then be used by the non-secure operating system for its memory management. The rest of the memory 462, 464, which is defined as secure, is unknown by the non-secure operating system. In order to protect integrity in the non-secure world, the non-secure memory may be programmed with access permission for secure privileged modes only. Hence, secure applications will not corrupt the non-secure ones. As can be seen from FIG. 44, following this boot stage partition, memory 460 is available for use by the non-secure operating system, memory 462 is available for use by the secure kernel, and memory 464 is available for use by secure applications.

Figure 45:
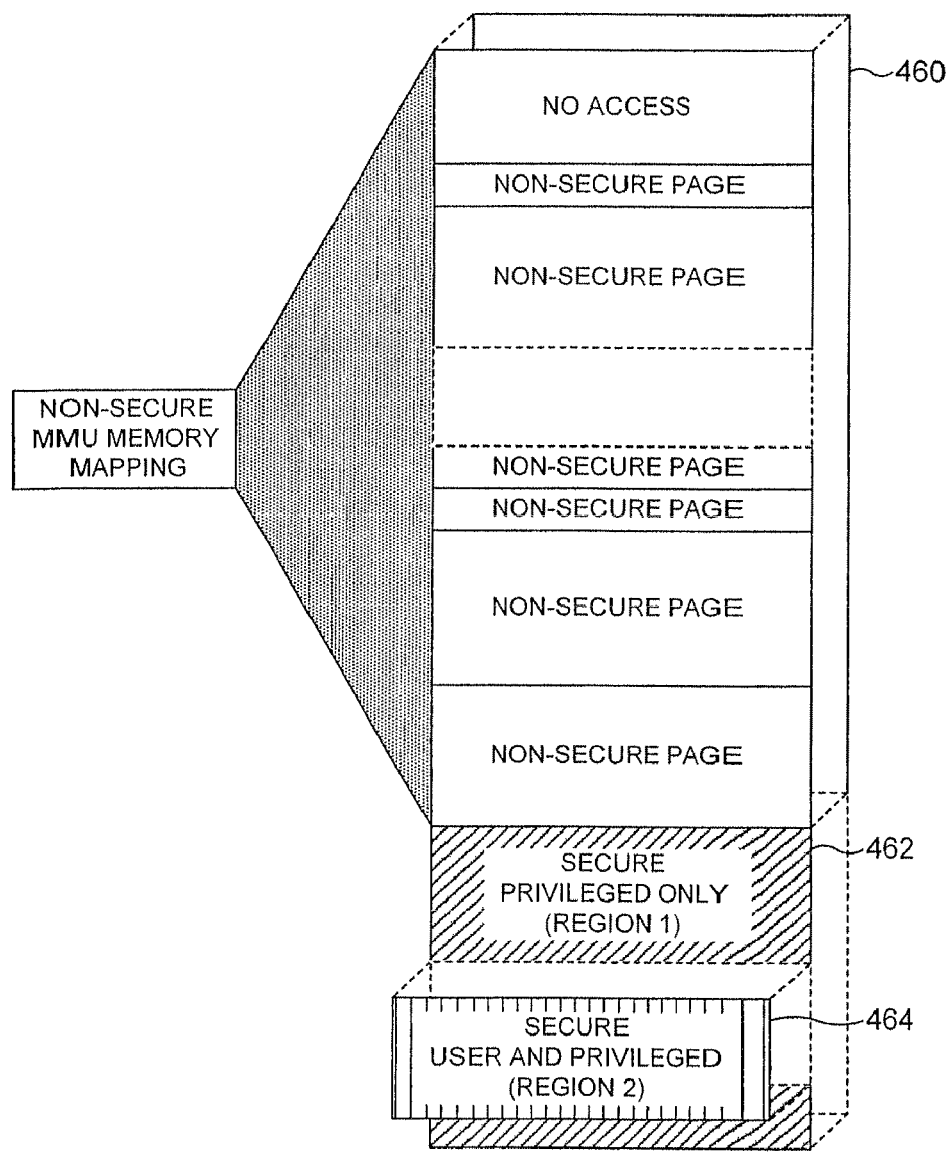
FIG. 45 illustrates the mapping of the non-secure memory by the memory management unit following the performance of the boot partition in accordance with an embodiment of the present invention.

Once the boot stage partition has been performed, memory mapping of the non-secure memory 460 is handled by the non-secure operating system using the MMU 200, and accordingly a series of non-secure pages can be defined in the usual manner. This is illustrated in FIG. 45.

Figure 46:
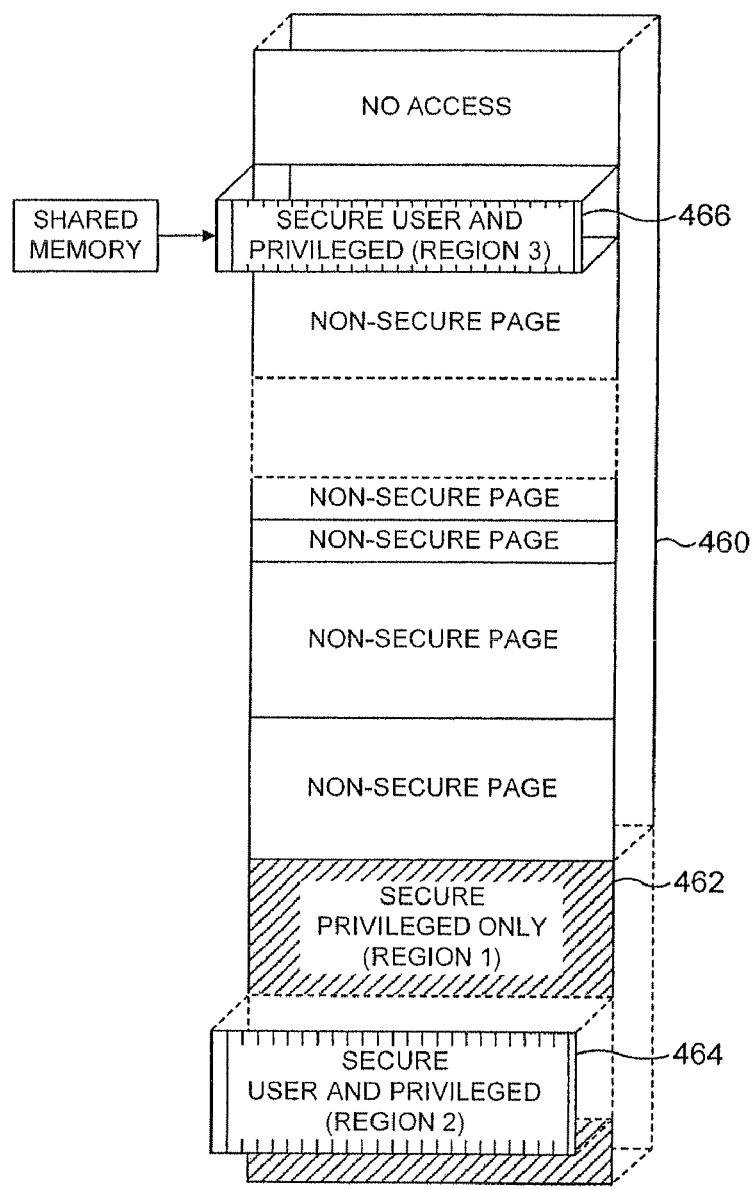
FIG. 46 illustrates how the rights of a part of memory can be altered to allow a secure application to share memory with a non-secure application in accordance with an embodiment of the present invention.

If a secure application needs to share memory with a non-secure application, the secure kernel can change the rights of a part of the memory to transfer artificially data from one domain to the other. Hence, as illustrated in FIG. 46, the secure kernel can, after checking the integrity of a non-secure page, change the rights of that page such that it becomes a secure page 466 accessible as shared memory.

When the partition of the memory is changed, the micro-TLB 206 needs to be flushed. Hence, in this scenario, when a non-secure access subsequently occurs, a miss will occur in the micro-TLB 206, and accordingly a new descriptor will be loaded from the main TLB 208. This new descriptor will subsequently be checked by the partition checker 222 of the MPU as it is attempted to retrieve it into the micro-TLB 206, and so will be consistent with the new partition of the memory.

In preferred embodiments, the cache 38 is virtual-indexed and physical-tagged. Accordingly, when an access is performed in the cache 38, a lookup will have already been performed in the micro-TLB 206 first, and accordingly access permissions, especially secure and non-secure permissions, will have been checked. Accordingly, secure data cannot be stored in the cache 38 by non-secure applications. Access to the cache 38 is under the control of the partition checking performed by the partition checker 222, and accordingly no access to secure data can be performed in non-secure mode.

However, one problem that could occur would be for an application in the non-secure domain to be able to use the cache operations register to invalidate, clean, or flush the cache. It needs to be ensured that such operations could not affect the security of the system. For example, if the non-secure operating system were to invalidate the cache 38 without cleaning it, any secure dirty data must be written to the external memory before being replaced. Preferably, secure data is tagged in the cache, and accordingly can be dealt with differently if desired.

In preferred embodiments, if an "invalidate line by address" operation is executed by a non-secure program, the physical address is checked by the partition checker 222, and if the cache line is a secure cache line, the operation becomes a "clean and invalidate" operation, thereby ensuring that the security of the system is maintained. Further, in preferred embodiments, all "invalidate line by index" operations that are executed by a non-secure program become "clean and invalidate by index" operations. Similarly, all "invalidate all" operations executed by a non-secure program become "clean and invalidate all" operations.

Furthermore, with reference to FIG. 1, any access to the TCM 36 by the DMA 32 is controlled by the micro-TLB 206. Hence, when the DMA 32 performs a lookup in the TLB to translate its virtual address into a physical one, the earlier described flags that were added in the main TLB allow the required security checking to be performed, just as if the access request had been issued by the core 10. Further, as will be discussed later, a replica partition checker is coupled to the external bus 70, preferably being located within the arbiter/decoder block 54, such that if the DMA 32 directly accesses the memory coupled to the external bus 70 via the external bus interface 42, the replica partition checker connected to that external bus checks the validity of the access. Furthermore, in certain preferred embodiments, it would be possible to add a bit to the CP15 registers 34 to define whether the DMA controller 32 can be used in the non-secure domain, this bit only being allowed to be set by the secure kernel when operating in a privileged mode.

Considering the TCM 36, if secure data is to placed within the TCM 36, this must be handled with care. As an example, a scenario could be imagined where the non-secure operating system programs the physical address range for the TCM memory 36 so that it overlaps an external secure memory part. If the mode of operation then changes to a secure mode, the secure kernel may cause data to be stored in that overlapping part, and typically the data would be stored in the TCM 36, since the TCM 36 will typically have a higher priority than the external memory. If the non-secure operating system were then to change the setting of the physical address space for the TCM 36 so that the previous secure region is now mapped in a non-secure physical area of memory, it will be appreciated that the non-secure operating system can then access the secure data, since the partition checker will see the area as non-secure and won't assert an abort. Hence, to summarise, if the TCM is configured to act as normal local RAM and not as SmartCache, it may be possible for the non-secure operating system to read secure world data if it can move the TCM base register to non-secure physical address.

To prevent this kind of scenario, a control bit is in preferred embodiments provided within the CP15 registers 34 which is only accessible in secure privilege modes of operation, and provides two possible configurations. In a first configuration, this control bit is set to "1", in which event the TCM can only be controlled by the secure privilege modes. Hence, any non-secure access attempted to the TCM control registers within the CP15 34 will cause an undefined instruction exception to be entered. Thus, in this first configuration, both secure modes and non-secure modes can use the TCM, but the TCM is controlled only by the secure privilege mode. In the second configuration, the control bit is set to "0", in which event the TCM can be controlled by the non-secure operating system. In this case, the TCM is only used by the non-secure applications. No secure data can be stored to or loaded from the TCM. Hence, when a secure access is performed, no look-up is performed within the TCM to see if the address matched the TCM address range.

By default, it is envisaged that the TCM would be used only by non-secure operating systems, as in this scenario the non-secure operating system would not need to be changed.

As mentioned earlier, in addition to the provision of the partition checker 222 within the MPU 220, preferred embodiments of the present invention also provide an analogous partition checking block coupled to the external bus 70, this additional partition checker being used to police accesses to memory by other master devices, for example the digital signal processor (DSP) 50, the DMA controller 52 coupled directly to the external bus, the DMA controller 32 connectable to the external bus via the external bus interface 42, etc. Indeed in some embodiments, as will be discussed later, it is possible to solely have a partition checking block coupled to the external (or device) bus, and not to provide a partition checker as part of the memory management logic 30. In some such embodiments, a partition checker may optionally be provided as part of the memory management logic 30, in such instances this partition checker be considered as a further partition checker provided in addition to the one coupled to the device bus.

As mentioned earlier, the entire memory system can consist of several memory units, and a variety of these may exist on the external bus 70, for example the external memory 56, boot ROM 44, or indeed buffers or registers 48, 62, 66 within peripheral devices such as the screen driver 46, I/O interface 60, key storage unit 64, etc. Furthermore, different parts of the memory system may need to be defined as secure memory, for example it may be desired that the key buffer 66 within the key storage unit 64 should be treated as secure memory. If an access to such secure memory were to be attempted by a device coupled to the external bus, then it is clear that the earlier described memory management logic 30 provided within the chip containing the core 10 would not be able to police such accesses.

Figure 47:
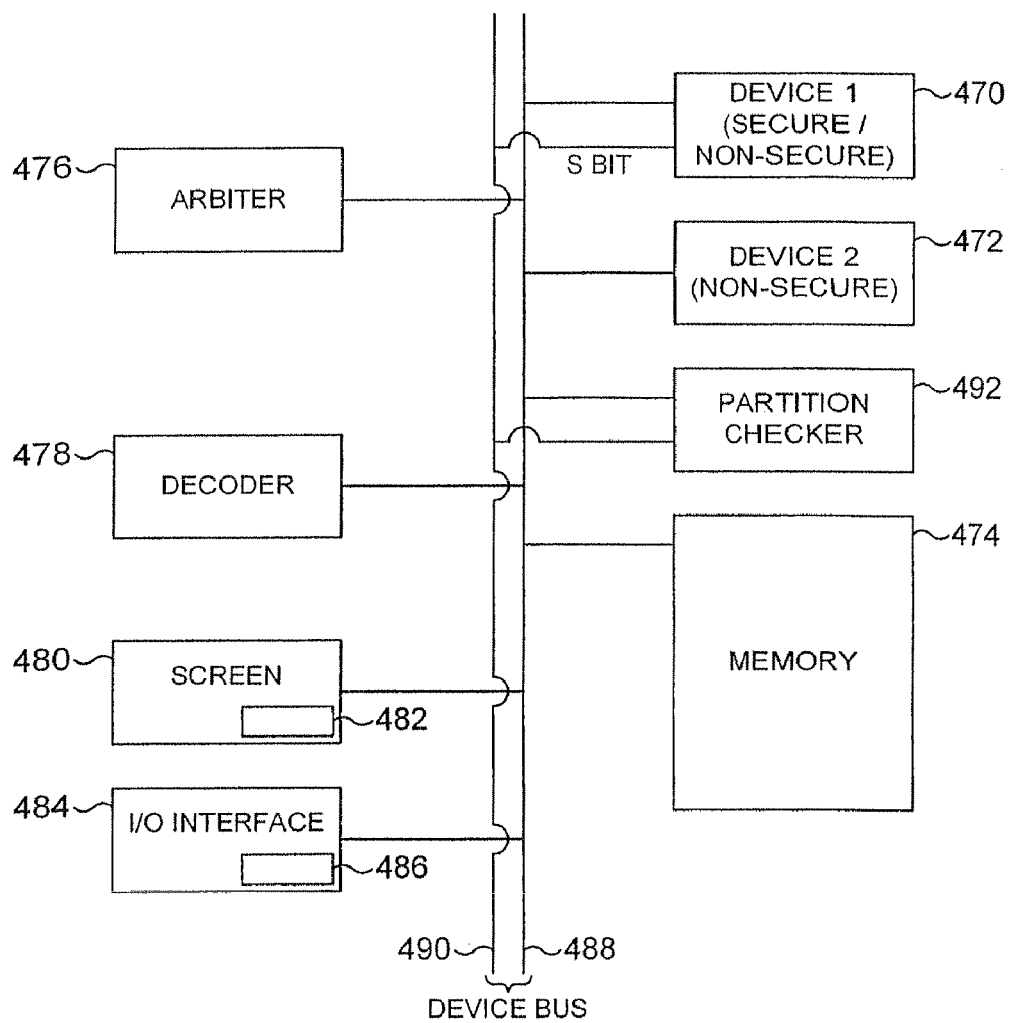
FIG. 47 illustrates how devices may be connected to the external bus of the data processing apparatus in accordance with one embodiment of the present invention.

FIG. 47 illustrates how the additional partition checker 492 coupled to the external bus, also referred to herein as the device bus, is used. The external bus would typically be arranged such that whenever memory access requests were issued onto that external bus by devices, such as devices 470, 472, those memory access requests would also include certain signals on the external bus defining the mode of operation, for example privileged, user, etc. In accordance with preferred embodiments of the present invention the memory access request also involves issuance of a domain signal onto the external bus to identify whether the device is operating in secure mode or non-secure mode. This domain signal is preferably issued at the hardware level, and in preferred embodiments a device capable of operating in secure or non-secure domains will include a predetermined pin for outputting the domain signal onto path 490 within the external bus. For the purpose of illustration, this path 490 is shown separately to the other signal paths 488 on the external bus.

This domain signal, also referred to herein as the "S bit" will identify whether the device issuing the memory access request is operating in secure domain or non-secure domain, and this information will be received by the partition checker 492 coupled to the external bus. The partition checker 492 will also have access to the partitioning information identifying which regions of memory are secure or non-secure, and accordingly can be arranged to only allow a device to have access to a secure part of memory if the S bit is asserted to identify a secure mode of operation.

By default, it is envisaged that the S bit would be unasserted, and accordingly a pre-existing non-secure device, such as device 472 illustrated in FIG. 47, would not output an asserted S bit and accordingly would never be granted access by the partition checker 492 to any secure parts of memory, whether that be within registers or buffers 482, 486 within the screen driver 480, the I/O interface 484, or within the external memory 474.

For the sake of illustration, the arbiter block 476 used to arbitrate between memory access requests issued by master devices, such as devices 470, 472, is illustrated separately to the decoder 478 used to determine the appropriate memory device to service the memory access request, and separate from the partition checker 492. However, it will be appreciated that one or more of these components may be integrated within the same unit if desired.

Figure 48:
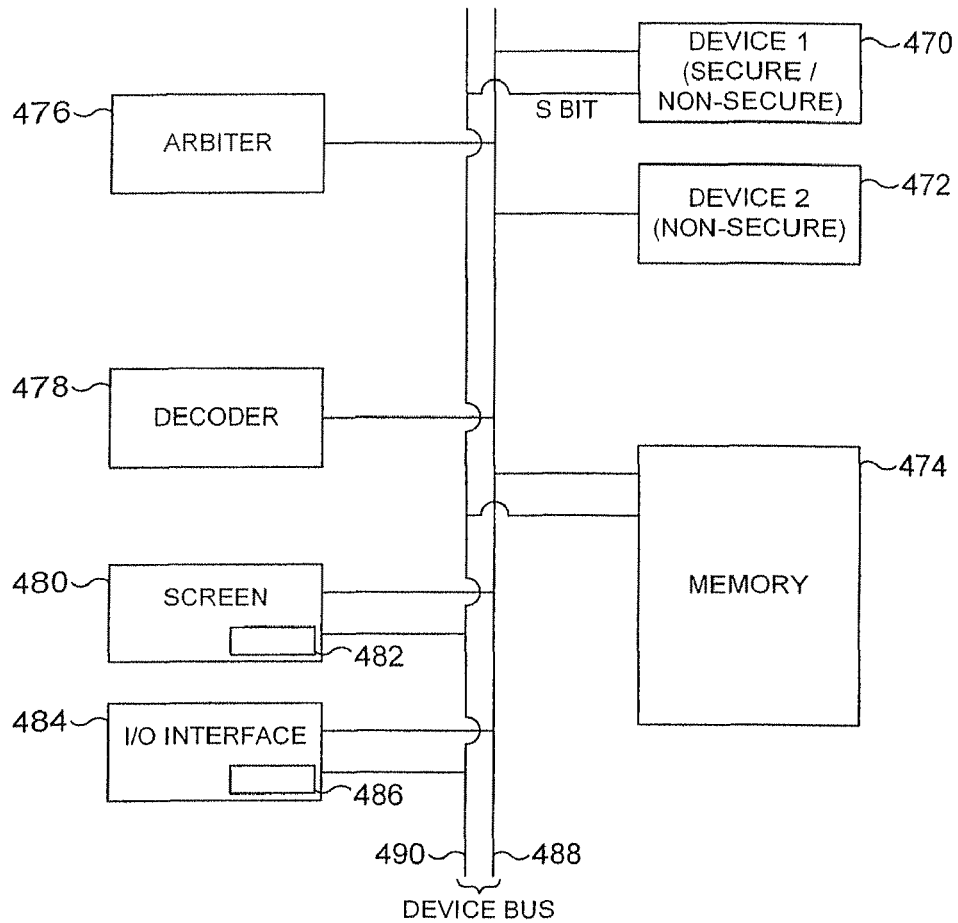
FIG. 48 is a block diagram illustrating how devices may be coupled to the external bus in accordance with the second embodiment of the present invention.

FIG. 48 illustrates an alternative embodiment, in which a partition checker 492 is not provided, and instead each memory device 474, 480, 484 is arranged to police its own memory access dependent on the value of the S bit. Accordingly, if device 470 were to assert a memory access request in non-secure mode to a register 482 within the screen driver 480 that was marked as secure memory, then the screen driver 480 would determine that the S bit was not asserted, and would not process the memory access request. Accordingly, it is envisaged that with appropriate design of the various memory devices, it may be possible to avoid the need for a partition checker 492 to be provided separately on the external bus.

In the above description of FIGS. 47 and 48, the "S bit" is said to identify whether the device issuing the memory access request is operating in secure domain or non-secure domain. Viewed another way, this S bit can be seen to indicate whether the memory access request pertains to the secure domain or the non-secure domain.

Figure 49:
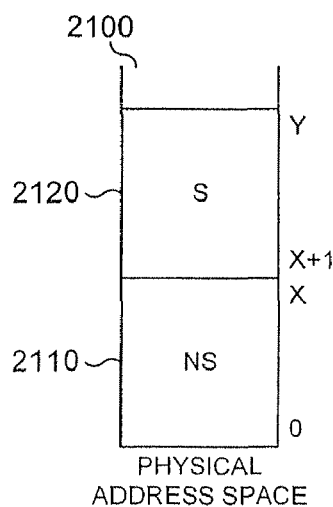
FIG. 49 illustrates the arrangement of physical memory in embodiments where a single set of page tables is used.

In the embodiments described with reference to FIGS. 37 and 38, a single MMU, along with a single set of page tables, was used to perform virtual to physical address translation. With such an approach, the physical address space would typically be segmented between non-secure memory and secure memory in a simplistic manner such as illustrated in FIG. 49. Here a physical address space 2100 includes an address space starting at address zero and extending to address Y for one of the memory units within the memory system, for example the external memory 56. For each memory unit, the addressable memory would typically be sectioned into two parts, a first part 2110 being allocated as non-secure memory and a second part 2120 being allocated as secure memory.

With such an approach, it will be appreciated that there are certain physical addresses which are not accessible to particular domain(s), and these gaps would be apparent to the operating system used in those domain(s). Whilst the operating system used in the secure domain will have knowledge of the non-secure domain, and hence will not be concerned by this, the operating system in the non-secure domain should ideally not need to have any knowledge of the presence of the secure domain, but instead should operate as though the secure domain were not there.

As a further issue, it will be appreciated that a non-secure operating system will see its address space for the external memory as starting at address zero and extending to address X, and the non-secure operating system need know nothing about the secure kernel and in particular the presence of the secure memory extending from address X+1 up to address Y. In contrast, the secure kernel will not see its address space beginning at address zero, which is not what an operating system would typically expect.

Figure 51:
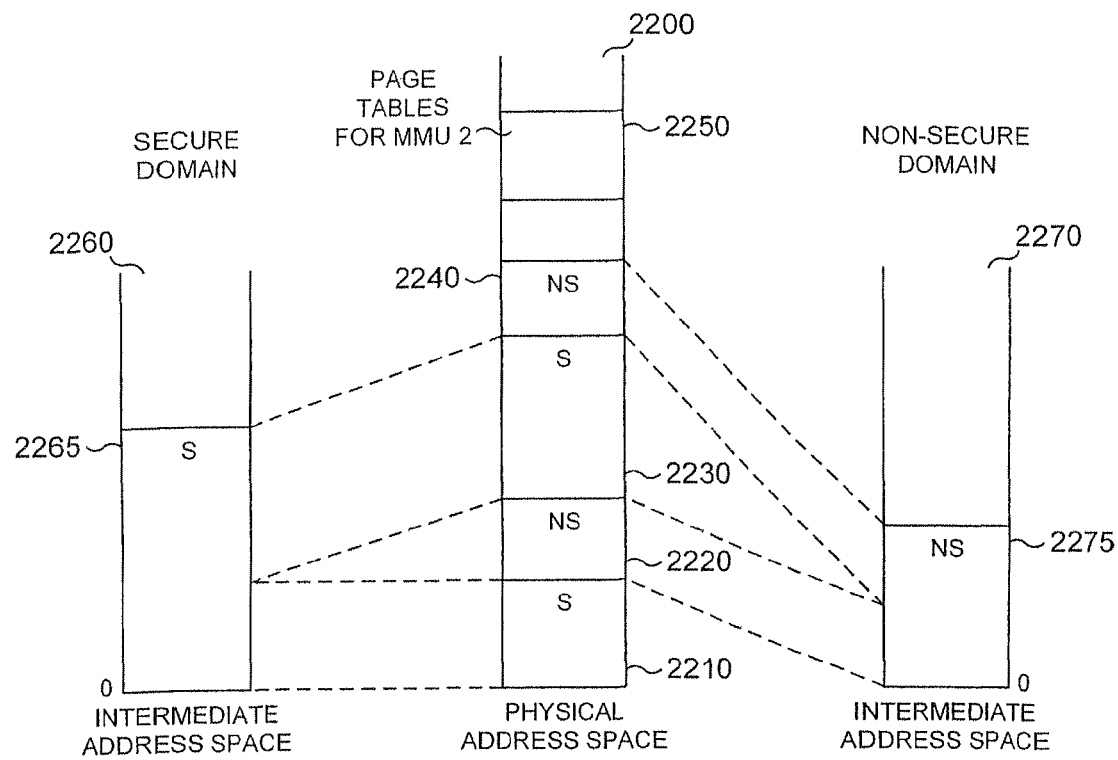
FIG. 51 illustrates, by way of example, the correspondence between physical address space and intermediate address space for both the secure domain and the non-secure domain.

One embodiment which alleviates the above concerns by allowing the secure memory regions to be completely hidden from the non-secure operating system's view of its physical address space, and by enabling both the secure kernel in the secure domain and the non-secure operating system in the non-secure domain to see their address space for external memory as beginning at address zero is illustrated schematically in FIG. 51. Here, the physical address space 2200 is able to be segmented at the page level into either secure or non-secure segments. In the example illustrated in FIG. 51, the address space for the external memory is shown as being segmented into four sections 2210, 2220, 2230, and 2240, consisting of two secure memory regions and two non-secure memory regions.

Rather than transitioning between the virtual address space and the physical address space via a single page table conversion, two separate layers of address translation are performed with reference to a first page table and a second page table, thereby enabling the concept of an intermediate address space to be introduced which can be arranged differently, dependent on whether the processor is in the secure domain or the non-secure domain. More particularly, as illustrated in FIG. 51, the two secure memory regions 2210 and 2230 in the physical address space can be mapped to the single region 2265 in the intermediate address space for the secure domain by use of descriptors provided within a secure page table within the set of page tables 2250. As far as the operating system running on the processor is concerned, it will see the intermediate address space as being the physical address space, and will use an MMU to convert virtual addresses into intermediate addresses within the intermediate address space.

Similarly, an intermediate address space 2270 can be configured for the non-secure domain, in which the two non-secure memory regions 2220 and 2240 in the physical address space are mapped to the non-secure region 2275 in the intermediate address space for the non-secure domain via corresponding descriptors in a non-secure page table within the set of page tables 2250.

Figure 50A:
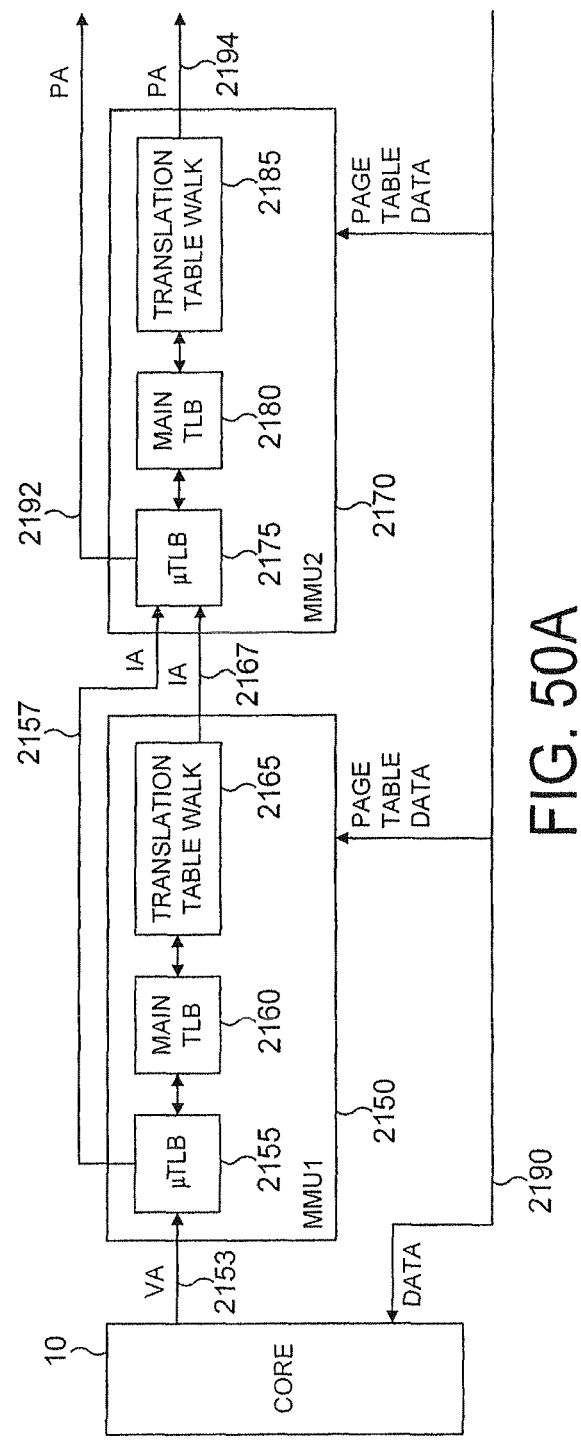
FIG. 50A illustrates an arrangement in which two MMUs are used to perform virtual to physical address translation via an intermediate address.

In one embodiment, the translation of virtual addresses into physical addresses via intermediate addresses is handled using two separate MMUs as illustrated in FIG. 50A. Each of the MMUs 2150 and 2170 in FIG. 50A can be considered as being constructed in a similar manner to the MMU 200 shown in FIG. 37, but for the sake of ease of illustration certain detail has been omitted in FIG. 50A.

The first MMU 2150 includes a micro-TLB 2155, a main TLB 2160 and translation table walk logic 2165, while similarly the second MMU 2170 includes a micro-TLB 2175, a main TLB 2180 and translation table walk logic 2185. The first MMU may be controlled by the non-secure operating system when the processor is operating in the non-secure domain, or by the secure kernel when the processor is operating in the secure domain. However, in preferred embodiments, the second MMU is only controllable by the secure kernel, or by the monitor program.

When the processor core 10 issues a memory access request, it will issue a virtual address over path 2153 to the micro-TLB 2155. The micro-TLB 2155 will store for a number of virtual address portions corresponding intermediate address portions retrieved from descriptors stored within the main TLB 2160, the descriptors in the main TLB 2160 having been retrieved from page tables in a first set of page tables associated with the first MMU 2150. If a hit is detected within the micro-TLB 2155, then the micro-TLB 2155 can issue over path 2157 an intermediate address corresponding to the virtual address received over path 2153. If there is no hit within the micro-TLB 2155, then the main TLB 2160 will be referenced to see if a hit is detected within the main TLB, and if so the relevant virtual address portion and corresponding intermediate address portion will be retrieved into the micro-TLB 2155, whereafter the intermediate address can be issued over path 2157.

If there is no hit within the micro-TLB 2155 and the main TLB 2160, then the translation table walk logic 2165 is used to issue a request for the required descriptor from a predetermined page table in a first set of page tables accessible by the first MMU 2150. Typically, there may be page tables associated with individual processes for both secure domain or non-secure domain, and the intermediate base addresses for those page tables will be accessible by the translation table walk logic 2165, for example from appropriate registers within the CP15 registers 34. Accordingly, the translation table walk logic 2165 can issue an intermediate address over path 2167 to request a descriptor from the appropriate page table.

The second MMU 2170 is arranged to receive any intermediate addresses output by the micro-TLB 2155 over path 2157, or by the translation table walk logic 2165 over path 2167, and if a hit is detected within the micro-TLB 2175, the micro-TLB can then issue the required physical address over path 2192 to memory to cause the required data to be retrieved over the data bus 2190. In the event of an intermediate address issued over path 2157, this will cause the required data to be returned to the core 10, whilst for an intermediate address issued over path 2167, this will cause the required descriptor to be returned to the first MMU 2150 for storage within the main TLB 2160.

In the event of a miss in the micro-TLB 2175, the main TLB 2180 will be referenced, and if there is a hit within the main TLB, the required intermediate address portion and corresponding physical address portion will be returned to the micro-TLB 2175, to then enable the micro-TLB 2175 to issue the required physical address over path 2192. However, in the absence of a hit in either the micro-TLB 2175 or the main TLB 2180, then the translation table walk logic 2185 will be arranged to output a request over path 2194 for the required descriptor from the relevant page table within a second set of page tables associated with the second MMU 2170. This second set of page tables includes descriptors which associate intermediate address portions with physical address portions, and typically there will be at least one page table for secure domain and one page table for non-secure domain. When a request is issued over path 2194, this will result in the relevant descriptor from the second set of page tables being returned to the second MMU 2170 for storing within the main TLB 2180.

The operation of the embodiment illustrated in FIG. 50A will now be illustrated further by way of a specific example as set out below, in which the abbreviation VA denotes virtual address, IA denotes intermediate address, and PA denotes physical address:

1) Core issues VA=3000 [IA=5000, PA=7000]
2) Miss in micro-TLB of MMU 1
3) Miss in main TLB of MMU 1
Page Table 1 Base Address=8000 IA [PA=10000]
4) Translation Table Walk logic in MMU 1 performs page table lookup
 -issues IA=8003
5) Miss in micro-TLB of MMU 2
6) Miss in main TLB of MMU 2
Page Table 2 Base Address=12000 PA
7) Translation Table Walk Logic in MMU 2 performs page table lookup
 -issues PA=12008
 "8000 IA=10000 PA" returned as page table data
8) -stored in main TLB of MMU 2
9) -stored in micro-TLB of MMU 2
10) Micro-TLB in MMU 2 now has hit
 -issues PA=10003
 "3000 VA=5000 IA" returned as page table data
11) -stored in main TLB of MMU 1
12) -stored in micro-TLB of MMU 1
13) Micro-TLB in MMU 1 now has hit
 issues IA=5000 to perform data access 14) miss in micro-TLB of MMU 2
15) miss in main TLB of MMU 2
16) Translation Table Walk Logic in MMU 2 performs page table lookup
   -issues PA=12005
   "5000 IA=7000 PA" returned as page table data
17) -stored in main TLB of MMU 2
18) - stored in micro-TLB of MMU 2
19) Micro-TLB in MMU 2 now has hit
   -issues PA=7000 to perform data access
20) Data at physical address 7000 returned to core
NEXT TIME CORE ISSUES A MEMORY ACCESS REQUEST (say VA 3001 . . . )
1) Core issues VA=3001
2) Hit in micro-TLB of MMU1, request IA 5001 issued to MMU2
3) Hit in micro-TLB on MMU2, request for PA 7001 issued to memory
4) Data at PA 7001 returned to core.

It will be appreciated that in the above example misses occur in both the micro-TLB and the main TLB of both MMUs, and hence this example represents the 'worst case' scenario. Typically, it would be expected that a hit would be observed in at least one of the micro-TLBs or main TLBs, thereby significantly reducing the time taken to retrieve the data.

Returning to FIG. 51, the second set of page tables 2250 will typically be provided within a certain region of the physical address space, in preferred embodiments a secure region. The first set of page tables can be split into two types, namely secure page tables and non-secure page tables. Preferably, the secure page tables will appear consecutively within the intermediate address space 2265, as will the non-secure page tables within the non-secure intermediate address space 2275. However, they need not be placed consecutively within the physical address space, and accordingly, by way of example, the secure page tables for the first set of page tables may be spread throughout the secure regions 2210, 2230, and in a similar way the non-secure page tables may be spread throughout the non-secure memory regions 2220 and 2240.

As mentioned previously, one of the main benefits of using the two-level approach of two sets of page tables is that for both the operating system of the secure domain and the operating system of the non-secure domain the physical address space can be arranged to start at zero, which is what would typically be expected by an operating system. Additionally the secure memory regions can be completely hidden from the non-secure operating system's view of its "physical address" space, since it sees as its physical address space the intermediate address space, which can be arranged to have a contiguous sequence of intermediate addresses.

Figure 52:
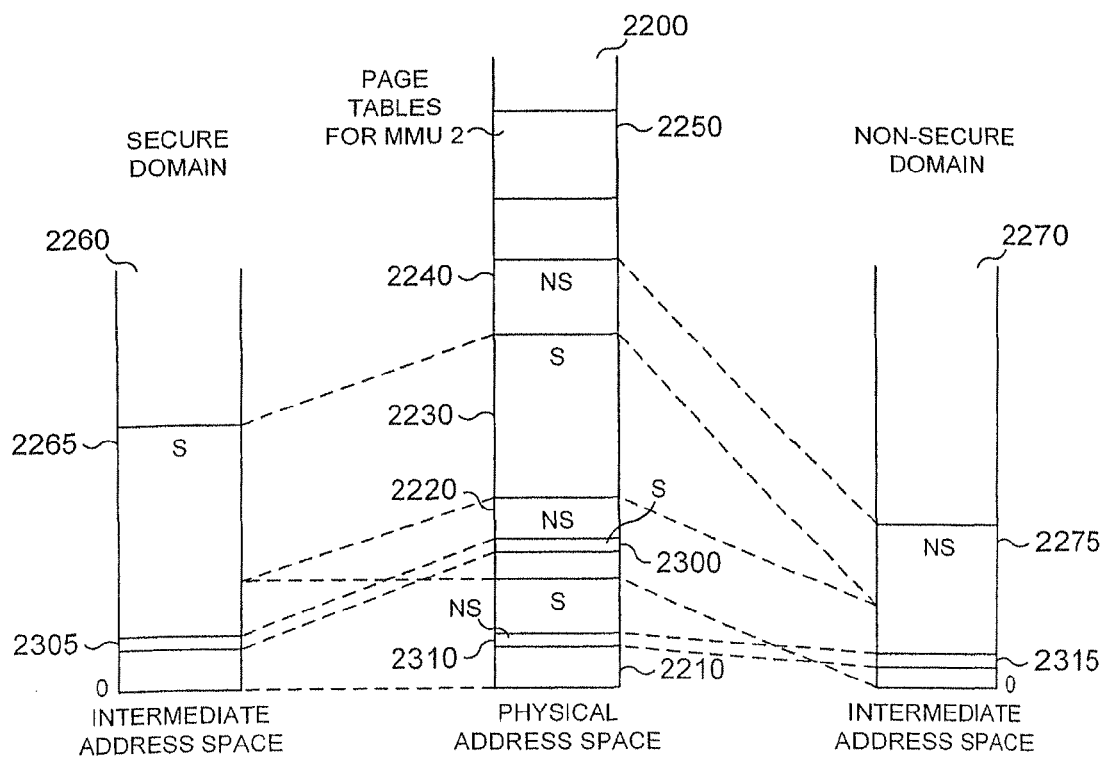
FIG. 52 illustrates the swapping of memory regions between secure and non-secure domains through manipulation of the page tables associated with the second MMU.

Additionally, the use of such an approach considerably simplifies the process of swapping regions of memory between non-secure memory and secure memory. This is illustrated schematically with reference to FIG. 52. As can be seen in FIG. 52, a region of memory 2300, which may for example be a single page of memory, may exist within the non-secure memory region 2220, and similarly a memory region 2310 may exist within the secure memory region 2210. However, these two memory regions 2300 and 2310 can readily be swapped merely by changing the relevant descriptors within the second set of page tables, such that the region 2300 now becomes a secure region mapped to region 2305 in the intermediate address space of the secure domain, whilst region 2310 now becomes a non-secure region mapped to the region 2315 in the intermediate address space of the non-secure domain. This can occur entirely transparently to the operating systems in both the secure domain the non-secure domain, since their view of the physical address space is actually the intermediate address space of the secure domain or non-secure domain, respectively. Hence, this approach avoids any redefinition of the physical address space within each operating system.

Figure 50B:
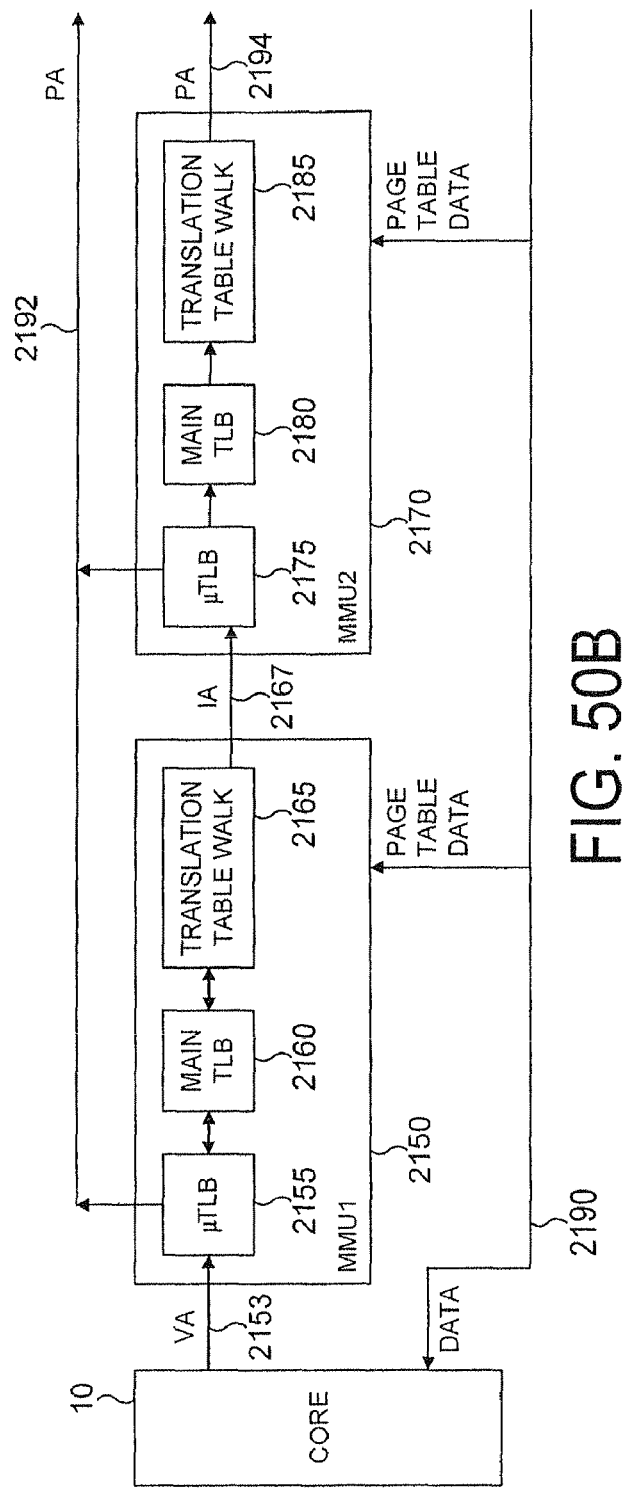
FIG. 50B illustrates an alternative arrangement in which two MMUs are used to perform virtual to physical address translation via an intermediate address.

An alternative embodiment of the present invention where two MMUs are also used, but in a different arrangement to that of FIG. 50A, will now be described with reference to FIG. 50B. As can be seen from a comparison of FIG. 50B with FIG. 50A, the arrangement is almost identical, but in this embodiment the first MMU 2150 is arranged to perform virtual address to physical address translation and the second MMU is arranged to perform intermediate address to physical address translation. Hence, instead of the path 2157 from the micro-TLB 2155 in the first MMU 2150 to the micro-TLB 2175 in the second MMU 2170 used in the FIG. 50A embodiment, the micro-TLB 2155 in the first MMU is instead arranged to output a physical address directly over path 2192, as shown in FIG. 50B. The operation of the embodiment illustrated in FIG. 50B will now be illustrated by way of the specific example as set out below, which details the processing of the same core memory access request as illustrated earlier for the FIG. 50A embodiment:

1) Core issues VA=3000 [IA=5000, PA=7000]
2) Miss in micro-TLB and main TLB of MMU 1
Page Table 1 Base Address=8000 IA [PA=10000]
3) Translation Table Walk logic in MMU1 performs page table lookup
   -issues IA=8003
4) IA 8003 misses in micro-TLB and main TLB of MMU 2
Page Table 2 Base Address=12000 PA
5) Translation Table Walk logic in MMU2 performs page table lookup
   -issues PA=12008
   "8000 IA=10000 PA" returned as page table data
6) "8000 IA=10000 PA" mapping stored in Main and micro-TLB of MMU2
7) Micro-TLB in MMU2 can now translate the request from step (3) to PA 10003 and issues fetch
   "3000 VA=5000 IA" returned as page table data
NOTE: This translation is retained in temporary storage by MMU1, but not stored directly in any TLB.
8) Translation table walk logic of MMU1 now issues request to MMU2 for IA=5000
9) IA 5000 misses in uTLB and main TLB of MMU 2
10) Translation Table Walk logic in MMU2 performs page table lookup
    -issues PA=12005
    "5000 IA=7000 PA" returned as page table data
11) MMU2 stores "5000 IA=7000 PA" in uTLB and main TLB. This translation is also communicated to MMU1.
12a) MMU2 issues the PA=7000 access to memory
12b) MMU1 combines the "3000 VA=5000 IA" and the "5000 IA=7000 PA" descriptors to give a "3000 VA=7000 PA" descriptor, which is stored in the main TLB and micro-TLB of MMU 1.
13) Data at PA 7000 is returned to the core.
NEXT TIME CORE ISSUES A MEMORY ACCESS REQUEST (say VA 3001 . . . )
1) Core issues VA=3001
2) Hit in micro-TLB of MMU1, MMU1 issues request for PA=7001
3) Data at PA 7001 is returned to the core.

As can bee seen from a comparison of the above example with that provided for FIG. 50A, the main differences here are in step 7 where MMU1 does not store the first table descriptor directly, and in step 12b (12a and 12b can happen at the same time) where MMU1 also receives the IA->PA translation and does the combination and stores the combined descriptor in its TLBs.

Hence, it can be seen that whilst this alternative embodiment still uses the two sets of page tables to convert virtual addresses to physical addresses, the fact that the micro-TLB 2155 and main TLB 2160 store the direct virtual address to physical address translation avoids the need for lookups to be performed in both MMUs when a hit occurs in either the micro-TLB 2155 or the main TLB 2160. In such cases the first MMU can directly handle requests from the core without reference to the second MMU.

It will be appreciated that the second MMU 2170 could be arranged not to include the micro-TLB 2175 and the main TLB 2180, in which case the page table walk logic 2185 would be used for every request that needed handling by the second MMU. This would save on complexity and cost for the second MMU, and might be acceptable assuming the second MMU was only needed relatively infrequently. Since the first MMU will need to be used for every request, it will typically be expedient to include the micro-TLB 2155 and main TLB 2160 in the first MMU 2150 to improve speed of operation of the first MMU.

It should be noted that pages in the page tables may vary in size, and it is hence possible that the descriptors for the two halves of the translation relate to different sized pages. Typically, the MMU1 pages will be smaller than the MMU2 pages but this is not necessarily the case. For example:

Table 1 maps 4 Kb at 0x40003000 onto 0x00081000
Table 2 maps 1 Mb at 0x00000000 onto 0x02000000
Here, the smallest of the two sizes must be used for the combined translation, so the combined descriptor is
4 Kb at 0x40003000 onto 0x02081000
However, where data is being swapped between worlds (as discussed earlier with reference to FIG. 52) it is possible that the reverse is true, for example:
Table 1 maps 1 Mb at 0xc0000000 onto 0x00000000
Table 2 maps 4 Kb at 0x00042000 onto 0x02042000
Now, a lookup at address 0xc0042010 from the core gives the mapping:
4 Kb at 0xc0042000 onto 0x02042000
i.e. the smaller of the two sizes is always used for the combined mapping.

Note that in the second case the process is less efficient, since the (1 Mb) descriptor in table 1 will be repeatedly looked up and discarded as different 4 Kb areas are accessed. However, in a typical system the table 2 descriptors will be larger (as in the first example) the majority of the time, which is more efficient (the 1 Mb mapping can be recycled for other 4 Kb pages which point into the appropriate section of IA space).

Figure 53:
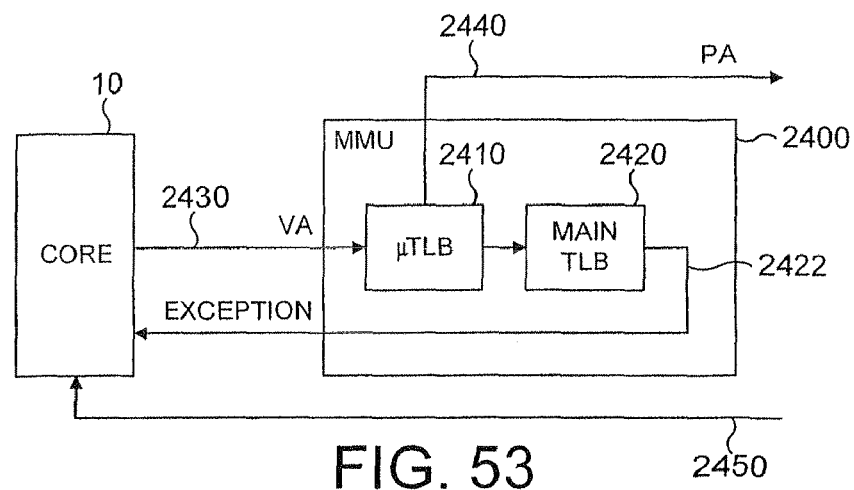
FIG. 53 is an embodiment illustrating an implementation using a single MMU, and where a miss in the main TLB causes an exception to be invoked to determine the virtual to physical address translation.

As an alternative to employing two separate MMUs as illustrated in FIGS. 50A and 50B, a single MMU can be used as illustrated in FIG. 53, where upon a miss in the main TLB 2420, an exception is generated by the MMU, which then causes software to be run within the core 10 to produce a virtual to physical address translation based on a combination of descriptors from the two different sets of page tables. More particularly, as shown in FIG. 53, the core 10 is coupled to an MMU 2400, which includes a micro-TLB 2410 and a main TLB 2420. When the core 10 issues a memory access request, the virtual address is provided over path 2430, and if a hit is observed in the micro-TLB, then the corresponding physical address is output directly over path 2440, causing the data to be returned over path 2450 into the core 10. However, if there is a miss in the micro-TLB 2410, the main TLB 2420 is referenced and if the relevant descriptor is contained within the main TLB the associated virtual address portion and corresponding physical address portion are retrieved into the micro-TLB 2410, whereafter the physical address can be issued over path 2440. However, if the main TLB also produces a miss, then an exception is generated over path 2422 to the core. The process performed within the core from receipt of such an exception will now be described further with reference to FIG. 54.

Figure 54:
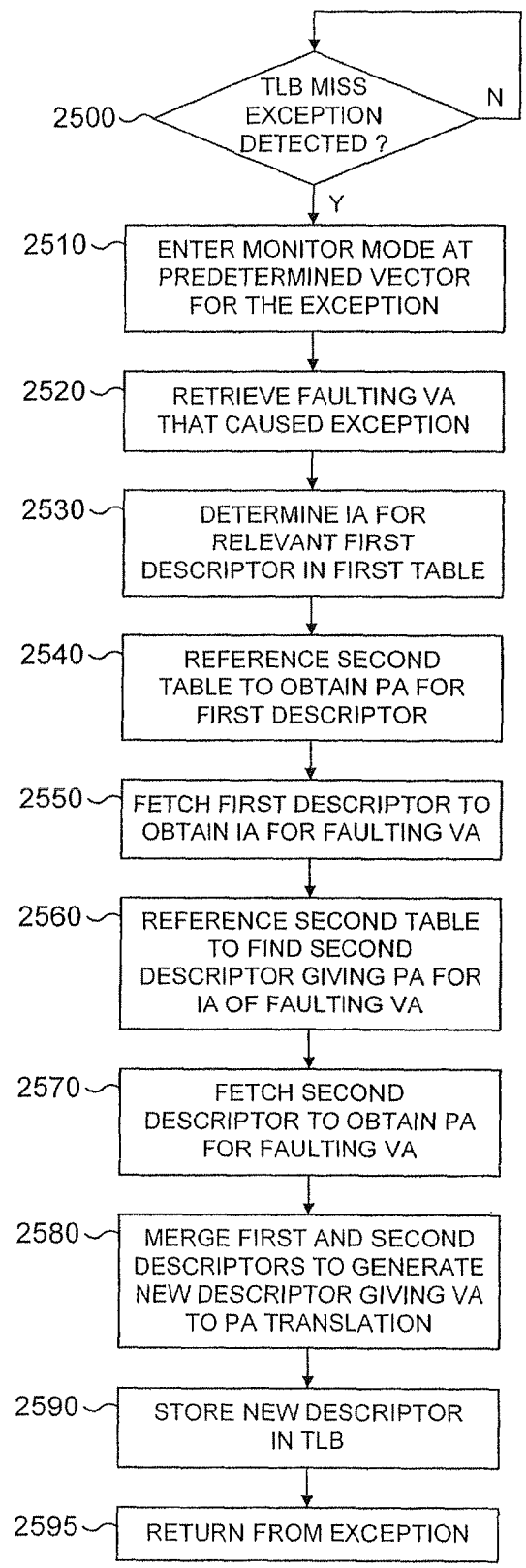
FIG. 54 is a flow diagram illustrating the process performed by the processor core in order to action an exception issued upon occurrence of a miss in the main TLB of the MMU of FIG. 53.

As shown in FIG. 54, if a TLB miss exception is detected by the core at step 2500, then the core enters the monitor mode at a predetermined vector for that exception at step 2510. This will then cause page table merging code to be run to perform the remainder of the steps illustrated in FIG. 54.

More particularly, at step 2520, the virtual address that was issued over path 2430, and that gave rise to the miss in both the micro-TLB 2410 and the main TLB 2420 (hereafter referred to as the faulting virtual address) is retrieved, whereafter at step 2530 the intermediate address for the required first descriptor is determined dependent on the intermediate base address for the appropriate table within the first set of tables. Once that intermediate address has been determined (typically by some predetermined combination of the virtual address with the intermediate base address), then the relevant table within the second set of tables is referenced in order to obtain the corresponding physical address for that first descriptor. Thereafter at step 2550 the first descriptor can be fetched from memory in order to enable the intermediate address for the faulting virtual address to be determined.

Then, at step 2560, the second table is again referenced to find a second descriptor giving the physical address for the intermediate address of the faulting virtual address. Thereafter at step 2570, the second descriptor is fetched to obtain the physical address for the faulting virtual address.

Once the above information has been obtained, then the program merges the first and second descriptors to generate a new descriptor giving the required virtual address to physical address translation, this step being performed at step 2580. In a similar manner to that described earlier with reference to FIG. 50B, the merging performed by the software again uses the smallest page table size for the combined translation. Thereafter, at step 2590, the new descriptor is stored within the main TLB 2420, whereafter the process returns from the exception at step 2595.

Thereafter, the core 10 will be arranged to reissue the virtual address for the memory access request over path 2430, which will still result in a miss in the micro-TLB 2410, but will now result in a hit in the main TLB 2420. Hence, the virtual address portion and corresponding physical address portion can be retrieved into the micro-TLB 2410, whereafter the micro-TLB 2410 can then issue the physical address over path 2440, resulting in the required data being returned to the core 10 over path 2450.

It will be appreciated that, as alternative embodiments to those described earlier with reference to FIGS. 50A and 50B, one or both MMUs in those embodiments could be managed by software using the principles described above with reference to FIGS. 53 and 54.

Irrespective of whether two MMUs are used as shown in FIGS. 50A or 50B, or one MMU is used as shown in FIG. 53, the fact that the second set of page tables is managed by the processor when operating in monitor mode (or alternatively in a privileged secure mode) ensures that those page tables are secure. As a result, when the processor is in the non-secure domain it can only see non-secure memory, since it is only the intermediate address space generated for the non-secure domain by the second set of page tables that the processor can see when in the non-secure domain. As a result, there is no need to provide a partition checker as part of the memory management logic 30 illustrated in FIG. 1. However, a partition checker would still be provided on the external bus to monitor accesses made by other bus masters in the system.

In the embodiments discussed earlier with reference to FIGS. 37 and 38, a partition checker 222 was provided in association with the MMU 200, and accordingly when an access is to be performed in the cache 38, a look-up will have already been performed in the micro-TLB 206 first, and accordingly access permissions, especially secure and non-secure permissions, would have been checked. Accordingly, in such embodiments, secure data cannot be stored in the cache 38 by non-secure applications. Access to the cache 38 is under the control of the partition checking performed by the partition checker 222, and accordingly no access to secure data can be performed in non-secure mode.

However, in an alternative embodiment of the present invention, a partition checker 222 is not provided for monitoring accesses made over the system bus 40, and instead the data processing apparatus merely has a single partition checker coupled to the external bus 70 for monitoring accesses to memory units connected to that external bus. In such embodiments, this then means that the processor core 10 can access any memory units coupled directly to the system bus 40, for example the TCM 36 and the cache 38, without those accesses being policed by the external partition checker, and accordingly some mechanism is required to ensure that the processor core 10 does not access secure data within the cache 38 or the TCM 36 whilst operating in a non-secure mode.

Figure 55:
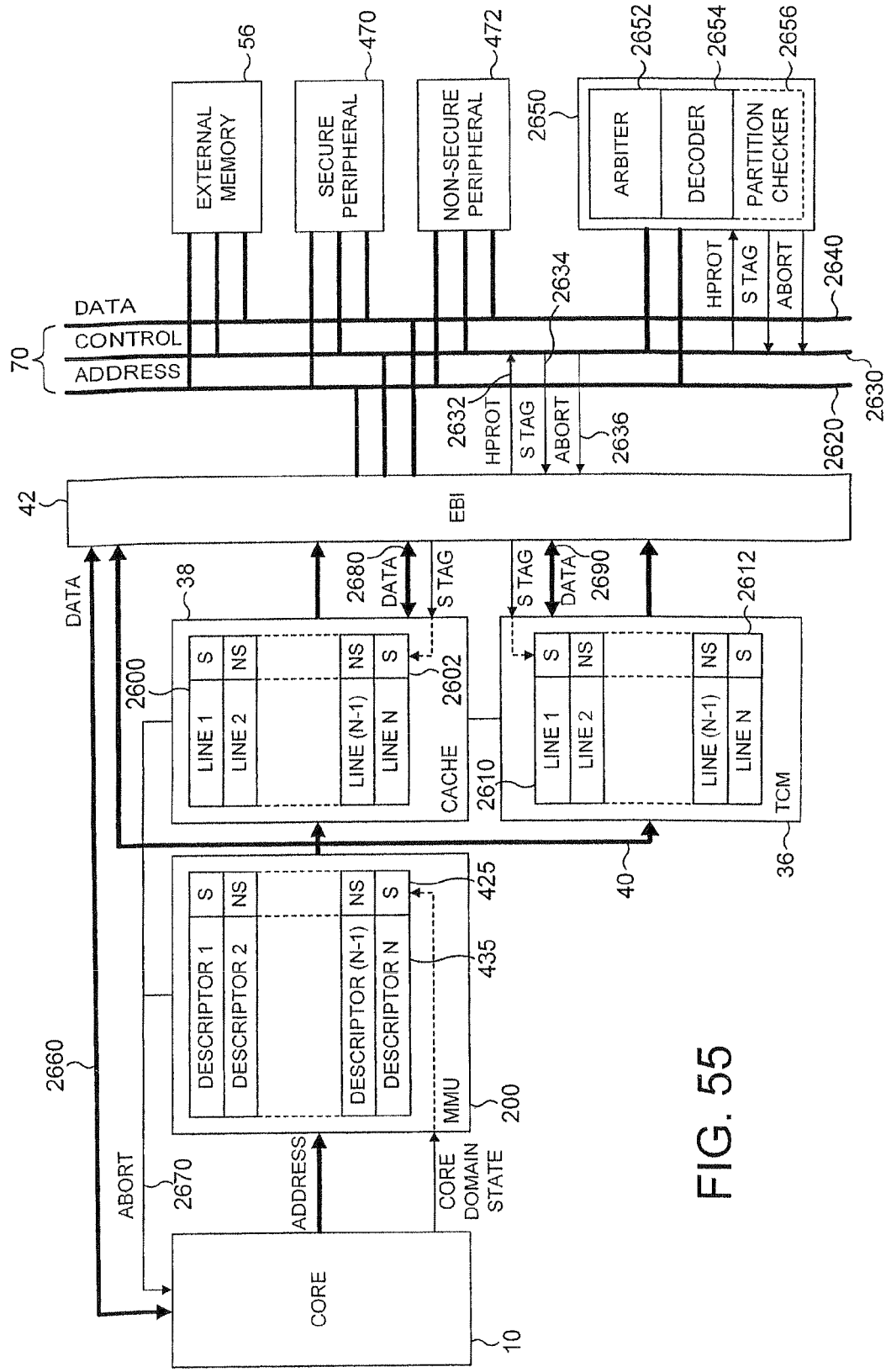
FIG. 55 is a block diagram illustrating components provided within a data processing apparatus of one embodiment, in which the cache is provided with information as to whether the data stored in individual cache lines is secure data or non-secure data.

FIG. 55 illustrates a data processing apparatus in accordance with one embodiment of the present invention, where a mechanism is provided to enable the cache 38 and/or the TCM 36 to control accesses made to them without the need for any partition checking logic to be provided in association with the MMU 200. As shown in FIG. 55, the core 10 is coupled via an MMU 200 to the system bus 40, the cache 38 and TCM 36 also being coupled to the system bus 40. The core 10, cache 38 and TCM 36 are coupled via the external bus interface 42 to the external bus 70, which as illustrated in FIG. 55 consists of an address bus 2620, a control bus 2630 and a data bus 2640.

The core 10, MMU 200, cache 38, TCM 36 and external bus interface 42 can be viewed as constituting a single device connected onto the external bus 70, also referred to as a device bus, and other devices may also be coupled to that device bus, for example the secure peripheral device 470 or the non-secure peripheral device 472. Also connected to the device bus 70 will be one or more memory units, for example the external memory 56. In addition, a bus control unit 2650 is connected to the device bus 70, and will typically include an arbiter 2652, a decoder 2654 and a partition checker 2656. For a general discussion of the operation of the components connected to the device bus, reference should be made to the earlier described FIG. 47. In the earlier described FIG. 47, the arbiter, decoder and partition checker were shown as separate blocks, but these elements work in the same manner when placed within a single control block 2650.

Figure 56:
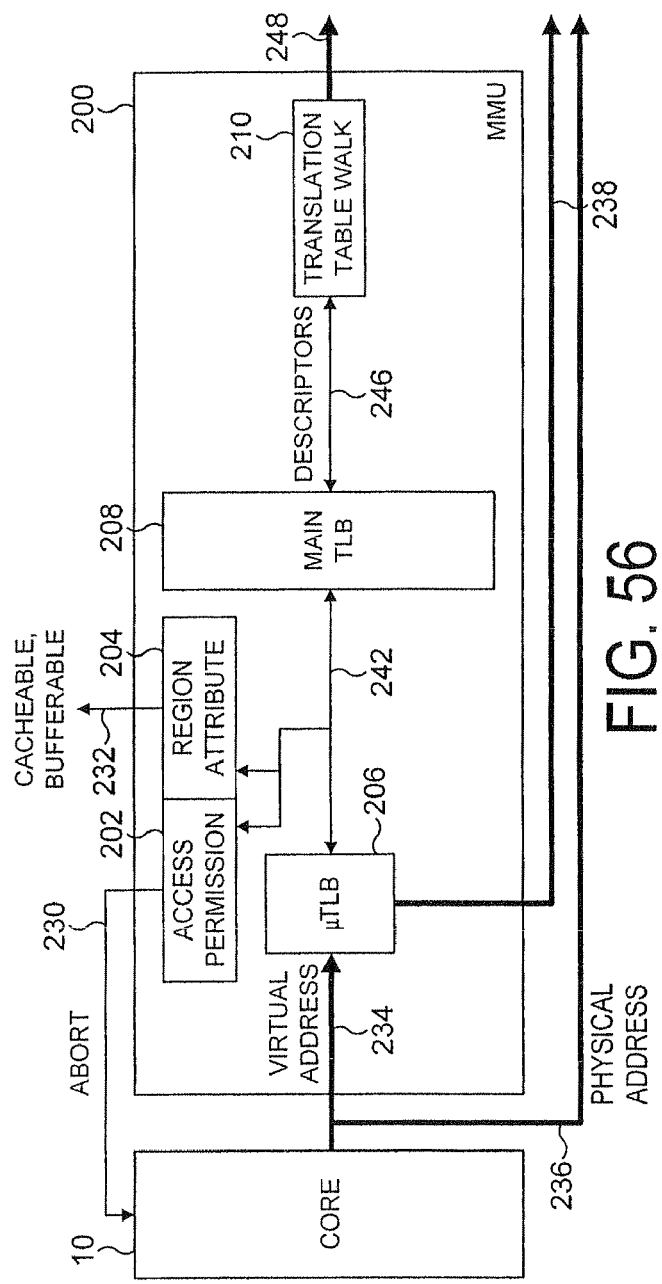
FIG. 56 illustrates the construction of the memory management unit illustrated in FIG. 55.

The MMU 200 of FIG. 55 is illustrated in more detail in FIG. 56. By comparison of FIG. 56 with FIG. 37, it can be seen that the MMU 200 is constructed in exactly the same way as the MMU of FIG. 37, the only difference being that a partition checker 222 is not provided for monitoring data sent over path 242 between the main TLB 208 and the micro-TLB 206. If the processor core 10 issues a memory request that specifies a virtual address, then that memory access request will be routed through the MMU 200, and will be processed as described earlier with reference to FIG. 37, resulting in a physical address being output onto the system bus 40 over path 238 from the micro-TLB 206. If, in contrast, the memory access request directly specifies a physical address, this will bypass the MMU 200, and instead will be routed directly onto the system bus 40 via path 236. In one embodiment only when the processor is operating in the monitor mode will it generate memory access requests that directly specify physical addresses.

As will be recalled from the earlier description of the MMU 200, and in particular from the description of FIG. 43, the main TLB 208 will contain a number of descriptors 435, and for each descriptor a domain flag 425 will be provided to identify whether the corresponding descriptor is from a secure page table or a non-secure page table. These descriptors 435 and associated domain flags 425 are illustrated schematically within the MMU 200 of FIG. 55.

When the core 10 issues a memory access request, this will result in a physical address for that memory access request being output on the system bus 40 and typically the cache 38 will then perform a look-up process to determine whether the data item specified by that address is stored within the cache. Whenever a miss occurs within the cache, i.e. it is determined that the data item subject to the access request is not stored within the cache, a linefill procedure will be initiating by the cache in order to retrieve from the external memory 56 a line of data that includes the data item the subject of the memory access request. In particular, the cache will output via the EBI 42 a linefill request onto the control bus 2630 of the device bus 70, with a start address being output on the address bus 2620. In addition, an HPROT signal will be output over path 2632 onto the control bus 2630, which will include a domain signal specifying the mode of operation of the core at the time the memory access request was issued. Hence, the linefill process can be viewed as the propagation of the original memory access request onto the external bus by the cache 38.

This HPROT signal will be received by the partition checker 2656, and accordingly will identify to the partition checker whether the device requesting the specified data from the external memory 56 (in this case the device incorporating the core 10 and the cache 38) was operating in the secure domain or the non-secure domain at the time the memory access request was issued. The partition checker 2656 will also have access to the partitioning information identifying which regions of memory are secure or non-secure, and accordingly can determine whether the device is allowed to have access to the data it is requesting. Hence, the partition checker can be arranged to only allow a device to have access to a secure part of the memory if the domain signal within the HPROT signal (also referred to herein as an S bit) is asserted to identify that access to this data was requested by the device whilst operating in a secure mode of operation.

If the partition checker determines that the core 10 is not allowed to have access to the data requested, for example because the HPROT signal has identified that the core was operating in a non-secure mode of operation, but the linefill request is seeking to retrieve data from the external memory that is within a secure region of memory, then the partition checker 2656 will issue an abort signal onto the control bus 2630, which will be passed back over path 2636 to the EBI 42, and from there back to the cache 38, resulting in an abort signal being issued over path 2670 to the core 10. However, if the partition checker 2656 determines that the access is allowed, then it will output an S tag signal identifying whether the data being retrieved from the external memory is secure data or non-secure data, and this S Tag signal will be passed back via path 2634 to the EBI 42, and from there back to the cache 38 to enable setting of the flag 2602 associated with the cache line 2600 the subject of the linefill process.

At the same time, the control logic 2650 will authorise the external memory 56 to output the linefill data requested, this data being passed back via the EBI 42 over path 2680 to the cache 38 for storing in the relevant cache line 2600. Hence, as a result of this process, the chosen cache line within the cache 38 will be filled with data items from the external memory 56, these data items including the data item that was the subject of the original memory access request from the core 10. The data item the subject of the memory access request from the core can then be returned to the core from the cache 38, or alternatively can be provided directly from the EBI 42 back to the core 10 over path 2660.

Since, in preferred embodiments, the original storage of data in a cache line will occur as a result of the above described linefill process, the flag 2602 associated with that cache line will be set based on the value provided by the partition checker 2656, and that flag can then be used by the cache 38 to directly control any subsequent access to the data items in that cache line 2600. Hence, if the core 10 subsequently issues a memory access request that produces a hit in a particular cache line 2600 of the cache 38, the cache 38 will review the value of the associated flag 2602, and compare that value with the current mode of operation of the core 10. In preferred embodiments, this current mode of operation of the core 10 is indicated by a domain bit set by the monitor mode within the CP 15 domain status register. Hence, cache 38 can be arranged to only allow data items in a cache line that the corresponding flag 2602 indicates is secure data to be accessed by the processor core 10 when the processor core 10 is operating in a secure mode of operation. Any attempt by the core to access secure data within the cache 38 whilst the core is operating in a non-secure mode will result in the cache 38 generating an abort signal over path 2670.

The TCM 36 can be set up in a variety of ways. In one embodiment, it can be set up to act like a cache, and in that embodiment will be arranged to include a plurality of lines 2610, each of which has a flag 2612 associated therewith in the same way as the cache 38. Accesses to the TCM 36 are then managed in exactly the same way as described earlier with reference to the cache 38, with any TCM miss resulting in a linefill process being performed, as a result of which data will be retrieved into a particular line 2610, and the partition checker 2656 will generate the required S tag value for storing in the flag 2612 associated with that line 2610.

In an alternative embodiment, the TCM 36 may be set up as an extension of the external memory 56 and used to store data used frequently by the processor, since access to the TCM via the system bus is significantly faster than access to external memory. In such embodiments, the TCM 36 would not use the flags 2612, and instead a different mechanism would be used to control access to the TCM. In particular, as described earlier, in such embodiments, a control flag may be provided which is settable by the processor when operating in a privileged secure mode to indicate whether the tightly coupled memory is controllable by the processor only when executing in a privileged secure mode or is controllable by the processor when executing in the at least one non-secure mode. The control flag is set by the secure operating system, and in effect defines whether the TCM is controlled by the privileged secure mode or by non-secure modes. Hence, one configuration that can be defined is that the TCM is only controlled when the processor is operating in a privileged secure mode of operation. In such embodiments, any non-secure access attempted to the TCM control registers will cause an undefined instruction exception to be entered.

In an alternative configuration, the TCM can be controlled by the processor when operating in a non-secure mode of operation. In such embodiments, the TCM is only used by the non-secure applications. No secure data can be stored to or loaded from the TCM. Hence, when a secure access is performed, no look-up is performed within the TCM to see if the address matched the TCM address range.

Figure 57:
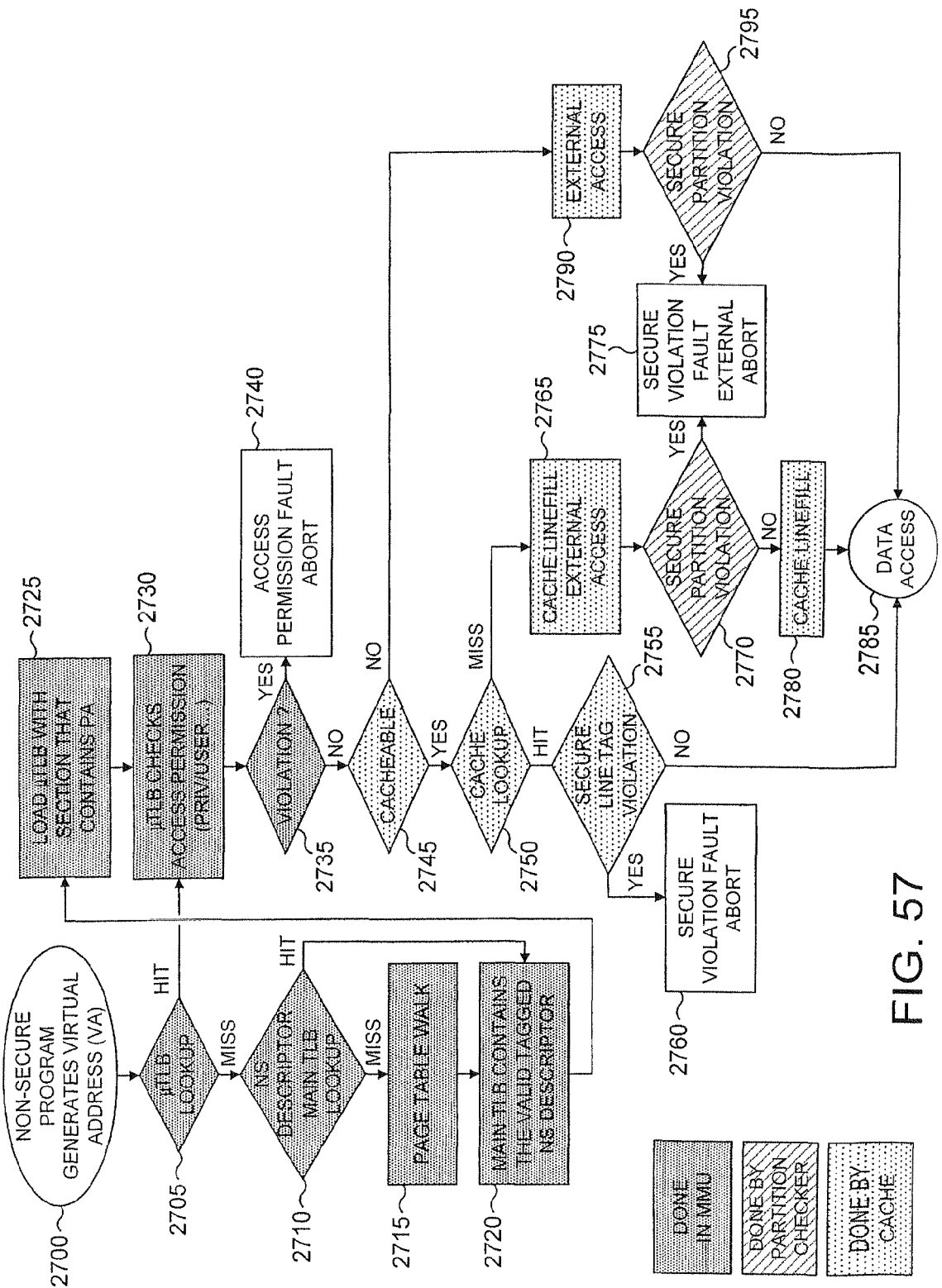
FIG. 57 is a flow diagram illustrating the processing performed within the data processing apparatus of FIG. 55 to process a non-secure memory access request.

FIG. 57 is a flow diagram illustrating the processing performed by the apparatus of FIG. 55 when a non-secure program operating on the processor core 10 generates a virtual address (step 2700). Firstly, at step 2705, a look-up is performed within the micro-TLB 206, and if this results in a hit, the micro-TLB then checks access permissions at step 2730. With reference to FIG. 56, this process can be viewed as being performed by the access permission logic 202.

If at step 2705, a miss occurs in the micro-TLB look-up, then a look-up is performed in the main TLB 208 amongst the non-secure descriptors stored therein (step 2710). If this results in a miss, then a page table walk process is performed at step 2715 (which has been discussed in detail previously with reference to FIG. 37), where after at step 2720 it is determined that the main TLB contains the valid tagged non-secure descriptor. If the look-up at step 2710 produces a hit, then the process proceeds directly to step 2720.

Thereafter, at step 2725, the micro-TLB is loaded with the section of the descriptor which contains the physical address, whereafter at step 2730 the micro-TLB checks the access permissions.

If at step 2730, it is determined that there is a violation of the access permissions, then the process proceeds to step 2740, where an abort signal is issued over path 230 to the processor core (analogous to path 2670 shown in FIG. 55). However, assuming there is no violation detected, then at step 2745 it is determined whether the access is related to a cacheable data item. If not, then an external access is initiated at step 2790 to seek to retrieve the data item from the external memory 56. At step 2795, the partition checker 2656 will determine whether there is a secure partition violation, i.e. if the processor core 10 is seeking to access a data item in secure memory whilst operating in a non-secure mode, and if a violation is detected, then the partition checker 2656 will generate an abort signal at step 2775. However, assuming there is no secure partition violation, then the process proceeds to step 2785, where the data access takes place.

If at step 2745 it was determined that the data item being requested is cacheable, then a cache look-up is performed at step 2750 within the cache, and if a hit is detected, the cache then determines whether there is a secure line tag violation at step 2755. Hence, at this stage, the cache will review the value of the flag 2602 associated with the cache line containing the data item, and will compare the value of that flag with the mode of operation of the core 10 to determine whether the core is entitled to access the data item requested. If a secure line tag violation is detected, then the process proceeds to step 2760, where a secure violation fault abort signal is generated by the cache 38 and issued over path 2670 to the core 10. However, assuming there is no secure line tag violation detected at step 2755, then the data access is performed at step 2785.

If when the cache look-up is performed at step 2750 a cache miss occurs, then a cache linefill is initiated at step 2765. At step 2770, the partition checker 2656 then detects whether there is a secure partition violation, and if so issues an abort signal at step 2775. However, assuming there is no secure partition violation detected, then the cache linefill proceeds at step 2780, resulting in the data access completing at step 2785.

As illustrated in FIG. 57, steps 2705, 2710, 2715, 2720, 2725, 2730 and 2735 are performed within the MMU, steps 2745, 2750, 2755, 2765, 2780 and 2790 are performed by the cache, and steps 2770 and steps 2795 are performed by the partition checker.

Figure 58:
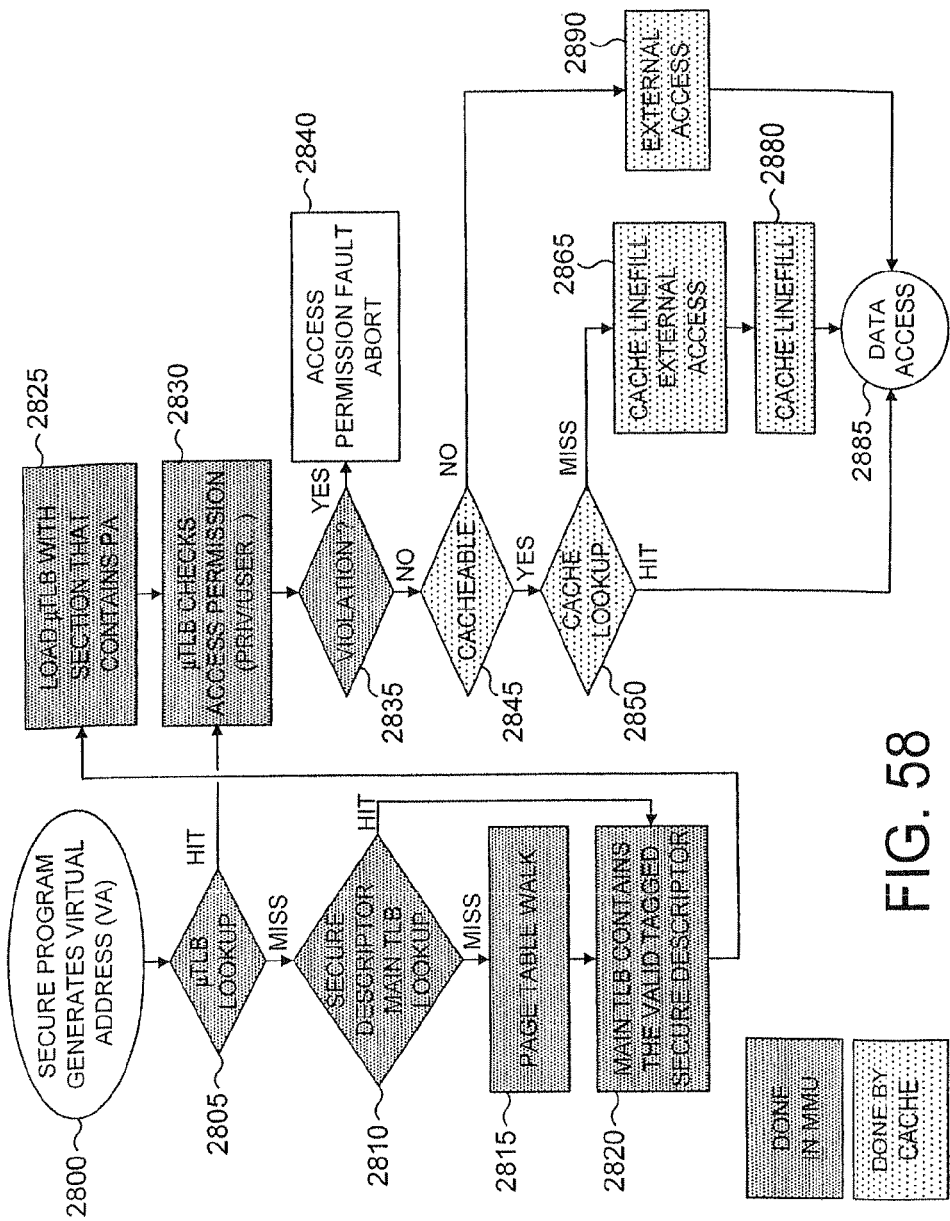
FIG. 58 is a flow diagram illustrating the processing performed within the data processing apparatus of FIG. 55 in order to process a secure memory access request.

FIG. 58 is a flow diagram showing the analogous process performed in the event that a secure program executing on the core generates a virtual address (step 2800). By comparison of FIG. 58 with FIG. 57, it will be appreciated that steps 2805 through 2835 performed within the MMU are analogous to the steps 2705 through 2735 described earlier with reference to FIG. 57. The only difference is at step 2810, where the look-up performed within the main TLB is performed in relation to any secure descriptors stored within the main TLB, as a result of which at step 2820 the main TLB contains valid tagged secure descriptors.

Within the cache, the cache no longer needs to look for any secure line tag violation, since in the embodiment illustrated with reference to FIG. 58, it is assumed that the secure program can access both secure data and non-secure data. Accordingly, if a hit occurs during the cache look-up at step 2850, then the process proceeds directly to the data access step 2885.

Similarly, in the event that an external access to the external memory is required (i.e. at steps 2865 or 2890), the partition checker need perform no partition checking, since again it is assumed that the secure program can access either secure data or non-secure data.

The steps 2845, 2850, 2865, 2880 and 2890 performed within the cache are analogous to the steps 2745, 2750, 2765, 2780 and 2790 described earlier with reference to FIG. 57.

Figure 59:
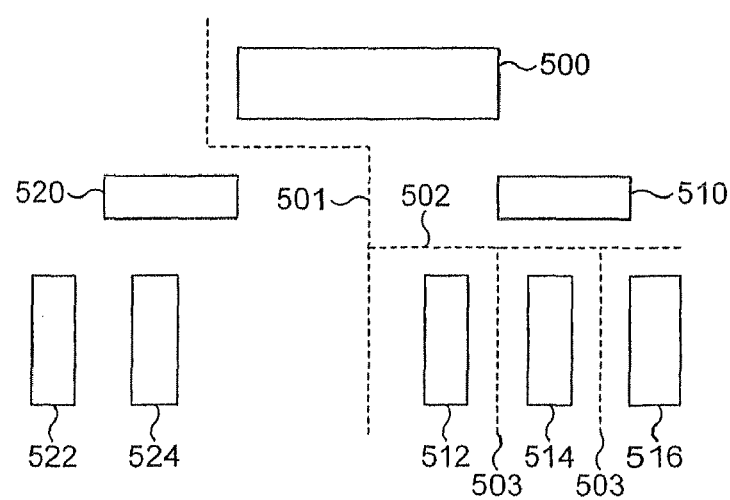
FIG. 59 schematically shows possible granularity of monitoring functions for different modes and applications running on a processor.

FIG. 59 shows different modes and applications running on a processor. The dashed lines indicate how different modes and/or applications can be separated and isolated from one another during monitoring of the processor according to an embodiment of the present invention.

The ability to monitor a processor to locate possible faults and discover why an application is not performing as expected is extremely useful and many processors provide such functions. The monitoring can be performed in a variety of ways including debug and trace functions.

In the processor according to the present technique debug can operate in several modes including halt debug mode and monitor debug mode. These modes are intrusive and cause the program running at the time to be stopped. In halt debug mode, when a breakpoint or watchpoint occurs, the core is stopped and isolated from the rest of the system and the core enters debug state. On entry the core is halted, the pipeline is flushed and no instructions are pre-fetched. The PC is frozen and any interrupts (IRQ and FIQ) are ignored. It is then possible to examine the core internal state (via the JTAG serial interface) as well as the state of the memory system. This state is invasive to program execution, as it is possible to modify current mode, change register contents, etc. Once Debug is terminated, the core exits from the Debug State by scanning in the Restart instruction through the Debug TAP (test access port). Then the program resumes execution.

In monitor debug mode, a breakpoint or watchpoint causes the core to enter abort mode, taking prefetch or Data Abort vectors respectively. In this case, the core is still in a functional mode and is not stopped as it is in Halt debug mode. The abort handler communicates with a debugger application to access processor and coprocessor state or dump memory. A debug monitor program interfaces between the debug hardware and the software debugger. If bit 11 of the debug status and control register DSCR is set (see later), interrupts (FIQ and IRQ) can be inhibited. In monitor debug mode, vector catching is disabled on Data Aborts and Prefetch Aborts to avoid the processor being forced into an unrecoverable state as a result of the aborts that are generated for the monitor debug mode. It should be noted that monitor debug mode is a type of debug mode and is not related to monitor mode of the processor which is the mode that supervises switching between secure world and non-secure world.

Debug can provide a snapshot of the state of a processor at a certain moment. It does this by noting the values in the various registers at the moment that a debug initiation request is received. These values are recorded on a scan chain (541, 544 of FIG. 67) and they are then serially output using a JTAG controller (18 or FIG. 1).

An alternative way of monitoring the core is by trace. Trace is not intrusive and records subsequent states as the core continues to operate. Trace runs on an embedded trace macrocell (ETM) 22, 26 of FIG. 1. The ETM has a trace port through which the trace information is exported, this is then analysed by an external trace port analyser.

The processor of embodiments of the present technique operates in two separate domains, in the embodiments described these domains comprise secure and non-secure domains. However, for the purposes of the monitoring functions, it will be clear to the skilled person that these domains can be any two domains between which data should not leak. Embodiments of the present technique are concerned with preventing leakage of data between the two domains and monitoring functions such as debug and trace which are conventionally allowed access to the whole system are a potential source of data leakage between the domains.

In the example given above of a secure and non-secure domain or world, secure data must not be available to the non-secure world. Furthermore, if debug is permitted, in secure world, it may be advantageous for some of the data within secure world to be restricted or hidden. The hashed lines in FIG. 59 shows some examples of possible ways to segment data access and provide different levels of granularity. In FIG. 59, monitor mode is shown by block 500 and is the most secure of all the modes and controls switching between secure and non-secure worlds. Below monitor mode 500 there is a supervisor mode, this comprises secure supervisor mode 510 and non-secure supervisor mode 520. Then there is non-secure user mode having applications 522 and 524 and secure user mode with applications 512, 514 and 516. The monitoring modes (debug and trace) can be controlled to only monitor non-secure mode (to the left of hashed line 501). Alternatively the non-secure domain or world and the secure user mode may be allowed to be monitored (left of 501 and the portion right of 501 that lies below 502). In a further embodiment the non-secure world and certain applications running in the secure user domain may be allowed, in this case further segmentation by hashed lines 503 occurs. Such divisions help prevent leakage of secure data between different users who may be running the different applications. In some controlled cases monitoring of the entire system may be allowed. According to the granularity required the following parts of the core need to have their access controlled during monitoring functions.

There are four registers that can be set on a Debug event; the instruction Fault Status Register (IFSR), Data Fault Status Register (DFSR), Fault Address Register (FAR), and Instruction Fault Address Register (IFAR). These registers should be flushed in some embodiments when going from secure world to non-secure world to avoid any leak of data.

PC sample register: The Debug TAP can access the PC through scan chain 7. When debugging in secure world, that value may be masked depending on the debug granularity chosen in secure world. It is important that non-secure world, or non-secure world plus secure user applications cannot get any value of the PC while the core is running in the secure world.

TLB entries: Using CP15 it is possible to read micro TLB entries and read and write main TLB entries. We can also control main TLB and micro TLB loading and matching. This kind of operation must be strictly controlled, particularly if secure thread-aware debug requires assistance of the MMU/MPU.

Performance Monitor Control register: The performance control register gives information on the cache misses, micro TLB misses, external memory requests, branch instruction executed, etc. Non-secure world should not have access to this data, even in Debug State. The counters should be operable in secure world even if debug is disabled in secure world.

Debugging in cache system: Debugging must be non-intrusive in a cached system. It is important is to keep coherency between cache and external memory. The Cache can be invalidated using CP15, or the cache can be forced to be write-through in all regions. In any case, allowing the modification of cache behaviour in debug can be a security weakness and should be controlled.

Endianness: Non-secure world or secure user applications that can access to debug should not be allowed to change endianness. Changing the endianness could cause the secure kernel to malfunction. Endianness access is prohibited in debug, according to the granularity.

Access of the monitoring functions to portions of the core can be controlled at initiation of the monitoring function. Debug and trace are initialised in a variety of ways. Embodiments of the present technique control the access of the monitoring function to certain secure portions of the core by only allowing initialisation under certain conditions.

Embodiments of the present technique seek to restrict entry into monitoring functions with the following granularity:

By controlling separately intrusive and observable (trace) debug;

By allowing debug entry in secure user mode only or in the whole secure world;

By allowing debug in secure user mode only and moreover taking account of the thread ID (application running).

In order to control the initiation of a monitoring function it is important to be aware of how the functions can be initiated. FIG. 60 shows a table illustrating the possible ways of initiating a monitoring function, the type of monitoring function that is initiated and the way that such an initiation instruction can be programmed.

Generally, these monitoring instructions can be entered via software or via hardware, i.e. via the JTAG controller. In order to control the initiation of monitoring functions, control values are used. These comprise enable bits which are condition dependent and thus, if a particular condition is present, monitoring is only allowed to start if the enable bit is set. These bits are stored on a secure register CP14 (debug and status control register, DSCR), which is located in ICE 530 (see FIG. 67).

In a preferred embodiment there are four bits that enable/disable intrusive and observable debug, these comprise a secure debug enable bit, a secure trace enable bit, a secure user-mode enable bit and a secure thread aware enable bit. These control values serve to provide a degree of controllable granularity for the monitoring function and as such can help stop leakage of data from a particular domain. FIG. 61 provides a summary of these bits and how they can be accessed.

These control bits are stored in a register in the secure domain and access to this register is limited to three possibilities. Software access is provided via ARM coprocessor MRC/MCR instructions and these are only allowed from the secure supervisor mode. Alternatively, software access can be provided from any other mode with the use of an authentication code. A further alternative relates more to hardware access and involves the instructions being written via an input port on the JTAG. In addition to being used to input control values relating to the availability of monitoring functions, this input port can be used to input control values relating to other functions of the processor.

Further details relating to the scan chain and JTAG are given below.

Register Logic Cell

Every integrated circuit (IC) consists of two kind of logic:

Combinatory logic cells; like AND, OR, INV gates. Such gates or combination of such gates is used to calculate Boolean expressions according to one or several input signals.

Figure 62:
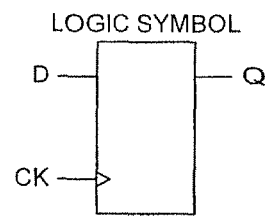
FIG. 62 shows a positive-edge triggered FLIP-FLOP view.

Register logic cells; like LATCH, FLIP-FLOP. Such cells are used to memorize any signal value. FIG. 62 shows a positive-edge triggered FLIP-FLOP view:

When positive-edge event occurs on the clock signal (CK), the output (Q) received the value of the input (D); otherwise the output (Q) keeps its value in memory.

Scan Chain Cell

Figure 63:
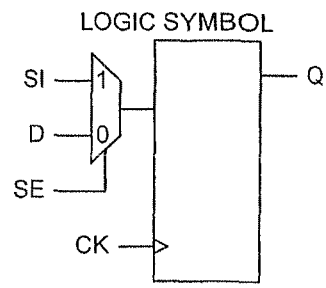
FIG. 63 a scan chain cell.

For test or debug purpose, it is required to bypass functional access of register logic cells and to have access directly to the contents of the register logic cells. Thus register cells are integrated in a scan chain cell as shown in FIG. 63.

In functional mode, SE (Scan Enable) is clear and the register cell works as a single register cell. In test or debug mode, SE is set and input data can come from SI input (Scan In) instead of D input.

Scan Chain

Figure 64:
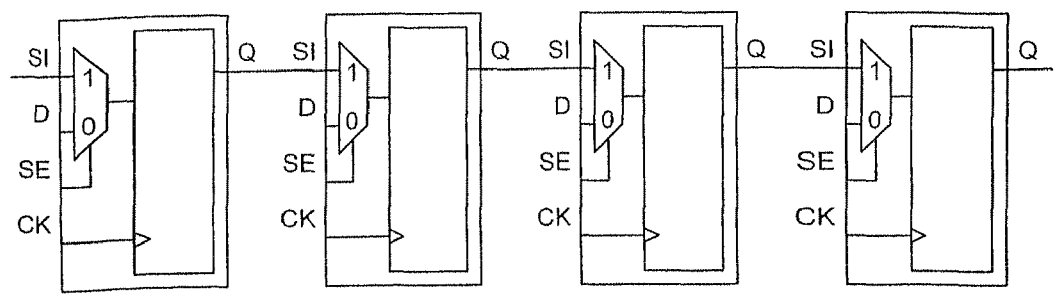
FIG. 64 shows a plurality of scan chain cells in a scan chain.

All scan chain cells are chained in scan chain as shown in FIG. 64.

In functional mode, SE is clear and all register cells can be accessed normally and interact with other logic of the circuit. In Test or Debug mode, SE is set and all registers are chained between each other in a scan chain. Data can come from the first scan chain cell and can be shifted through any other scan chain cell, at the cadence of each clock cycle. Data can be shifted out also to see the contents of the registers.

TAP Controller

Figure 65:
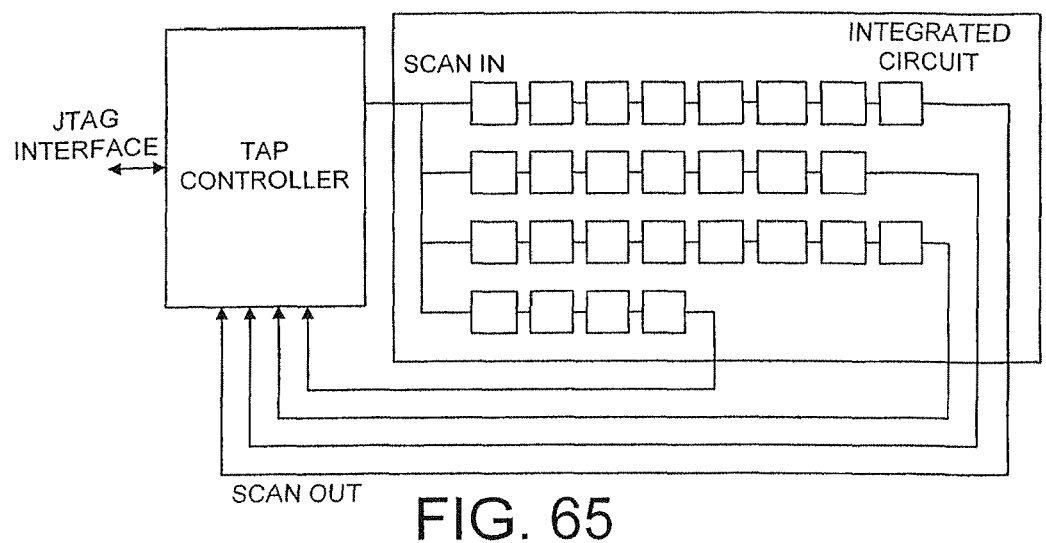
FIG. 65 shows a debug TAP controller.
Figure 66A:
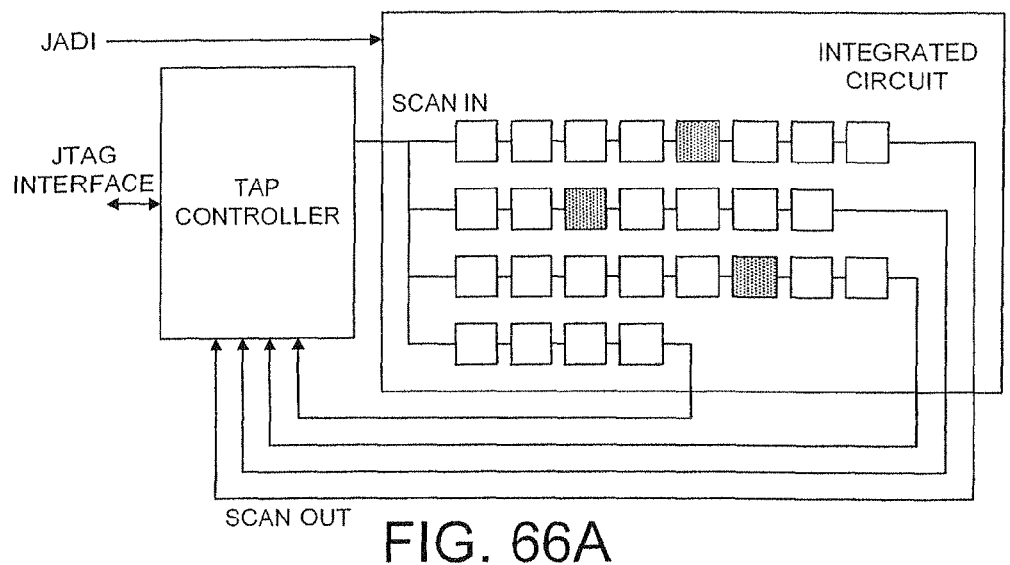
FIG. 66A shows a debug TAP controller with a JADI input.
Figure 66B:
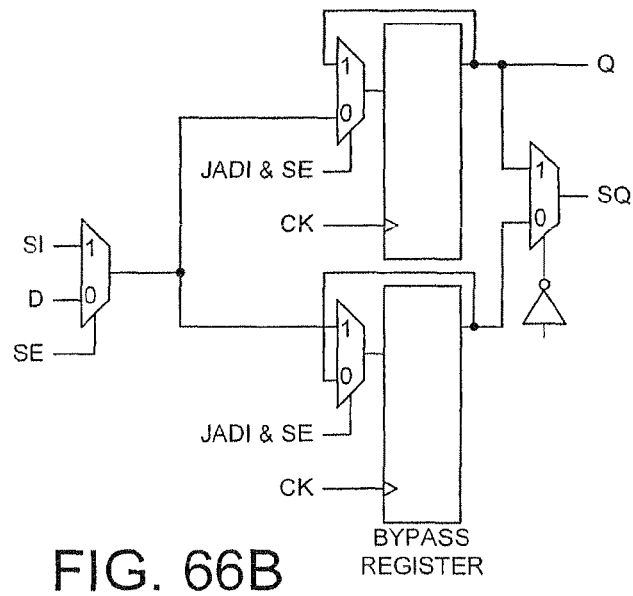
FIG. 66B shows a scan chain cell with a bypass register.

A debug TAP controller is used to handle several scan chains. The TAP controller can select a particular scan chain: it connects "Scan In" and "Scan Out" signals to that particular scan-chain. Then data can be scanned into the chain, shifted, or scanned out. The TAP controller is controlled externally by a JTAG port interface. FIG. 65 schematically illustrates a TAP controller JTAG Selective Disable Scan Chain Cell For security reasons, some registers might not be accessible by scan chain, even in debug or test mode. A new input called JADI (JTAG Access Disable) can allow removal dynamically or statically of a scan chain cell from a whole scan chain, without modifying the scan chain structure in the integrated circuit. FIGS. 66A and B schematically show this input.

If JADI is inactive (JADI=0), whether in functional or test or debug mode, the scan chain works as usual. If JADI is active (JADI=1), and if we are in test or debug mode, some scan chain cells (chosen by designer), may be "removed" from the scan chain structure. In order to keep the same number of scan-chain cell, the JTAG Selective Disable Scan Chain Cell use a bypass register. Note that Scan Out (SO) and scan chain cell output (Q) are now different.

Figure 67:
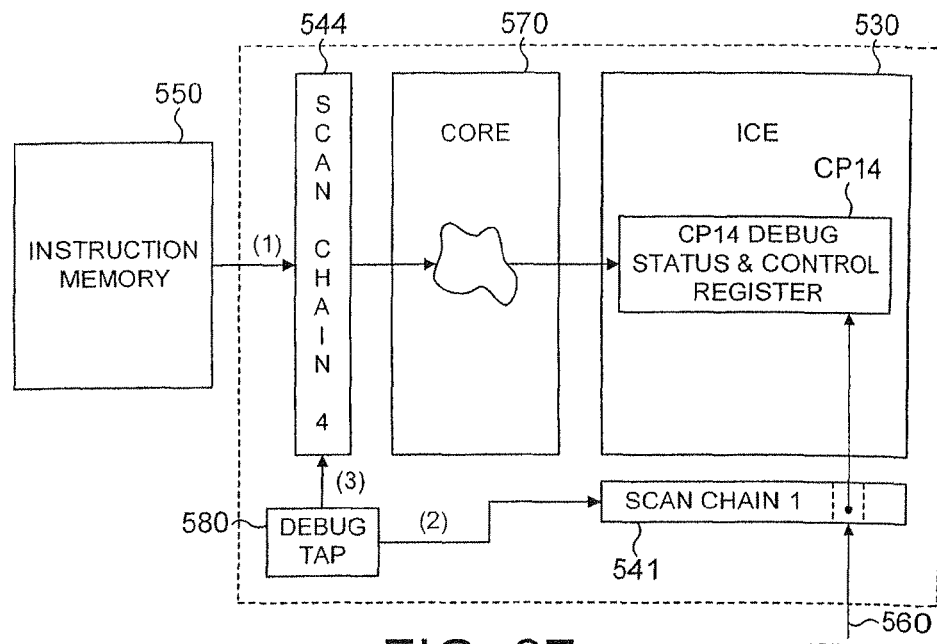
FIG. 67 schematically illustrates a processor comprising a core, scan chains and a Debug Status and Control Register.

FIG. 67 schematically shows the processor including parts of the JTAG. In normal operation instruction memory 550 communicates with the core and can under certain circumstances also communicate with register CP14 and reset the control values. This is generally only allowable from secure supervisor mode.

When debug is initiated instructions are input via debug TAP 580 and it is these that control the core. The core in debug runs in a step by step mode. Debug TAP has access to CP14 via the core (in dependence upon an access control signal input on the JSDAEN pin shown as JADI pin, JTAG ACCESS DISABLE INPUT in FIG. 45) and the control values can also be reset in this way.

Access to the CP14 register via debug TAP 580 is controlled by an access control signal JSDAEN. This is arranged so that in order for access and in particular write access to be allowed JSDAEN must be set high. During board stage when the whole processor is being verified, JSDAEN is set high and debug is enabled on the whole system. Once the system has been checked, the JSDAEN pin can be tied to ground, this means that access to the control values that enable debug in secure mode is now not available via Debug TAP 580. Generally processors in production mode have JSDAEN tied to ground. Access to the control values is thus, only available via the software route via instruction memory 550. Access via this route is limited to secure supervisor mode or to another mode provided an authentication code is given (see FIG. 68).

It should be noted that by default debug (intrusive and observable—trace) are only available in non-secure world. To enable them to be available in secure world the control value enable bits need to be set.

The advantages of this are that debug can always be initiated by users to run in non-secure world. Thus, although access to secure world is not generally available to users in debug this may not be a problem in many cases because access to this world is limited and secure world has been fully verified at board stage prior to being made available. It is therefore foreseen that in many cases debugging of the secure world will not be necessary. A secure supervisor can still initiate debug via the software route of writing CP14 if necessary.

Figure 68:
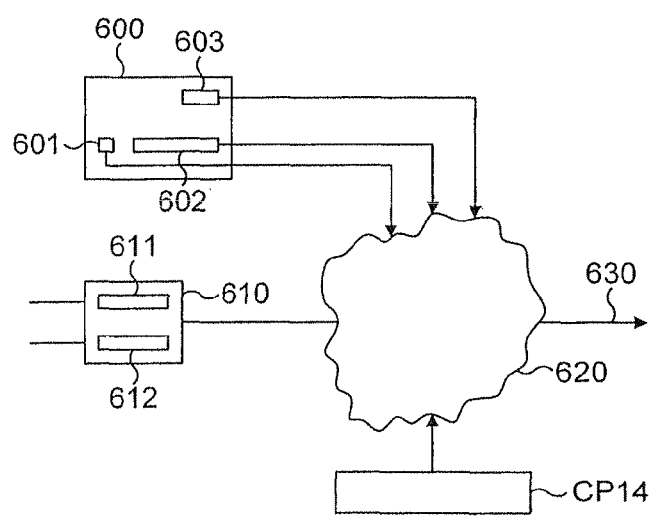
FIG. 68 schematically illustrates the factors controlling debug or trace initialisation.

FIG. 68 schematically shows the control of debug initialisation. In this Figure a portion of the core 600 comprises a storage element 601 (which may be a CP15 register as previously discussed) in which is stored a secure status bit S indicative of whether the system is in secure world or not. Core 600 also comprises a register 602 comprising bits indicative of the mode that the processor is running in, for example user mode, and a register 603 providing a context identifier that identifies the application or thread that is currently running on the core.

When a breakpoint is reached comparator 610, which compares a breakpoint stored on register 611 with the address of the core stored in register 612, sends a signal to control logic 620. Control logic 620 looks at the secure state S, the mode 602 and the thread (context identifier) 603 and compares it with the control values and condition indicators stored on register CP14. If the system is not operating in secure world, then a "enter debug" signal will be output at 630. If however, the system is operating in secure world, the control logic 620 will look at the mode 602, and if it is in user mode will check to see if user mode enable and debug enable bits are set. If they are then debug will be initialised provided that a thread aware bit has not been initialised. The above illustrates the hierarchical nature of the control values.

The thread aware portion of the monitoring control is also shown schematically in FIG. 68 along with how the control value stored in register CP14 can only be changed from secure supervisor mode (in this embodiment the processor is in production stage and JSDAEN is tied to ground). From a secure user mode, secure supervisor mode can be entered using an authentication code and then the control value can be set in CP14.

Control logic 620 outputs an "enter debug" signal when address comparator 610 indicates that a breakpoint has been reached provided thread comparator 640 shows that debug is allowable for that thread. This assumes that the thread aware initialisation bit is set in CP14. If the thread aware initialisation bit is set following a breakpoint, debug or trace can only be entered if address and context identifiers match those indicated in the breakpoint and in the allowable thread indicator. Following initiation of a monitoring function, the capture of diagnostic data will only continue while the context identifier is detected by comparator 640 as an allowed thread. When a context identifier shows that the application running is not an allowed one, then the capture of diagnostic data is suppressed.

It should be noted that in the preferred embodiment, there is some hierarchy within the granularity. In effect the secure debug or trace enable bit is at the top, followed by the secure user-mode enable bit and lastly comes the secure thread aware enable bit. This is illustrated in FIGS. 69A and 69B (see below).

The control values held in the "Debug and Status Control" register (CP14) control secure debug granularity according to the domain, the mode and the executing thread. It is on top of secure supervisor mode. Once the "Debug and Status Control" register CP14 is configured, it's up to secure supervisor mode to program the corresponding breakpoints, watchpoints, etc to make the core enter Debug State.

FIG. 69A shows a summary of the secure debug granularity for intrusive debug. Default values at reset are represented in grey colour.

It is the same for debug granularity concerning observable debug. FIG. 69B shows a summary of secure debug granularity in this case, here default values at reset are also represented in grey colour.

Note that Secure user-mode debug enable bit and Secure thread-aware debug enable bit are commonly used for intrusive and observable debug.

A thread aware initialisation bit is stored in register CP14 and indicates if granularity by application is required. If the thread aware bit has been initialised, the control logic will further check that the application identifier or thread 603 is one indicated in the thread aware control value, if it is, then debug will be initialised. If either of the user mode or debug enable bits are not set or the thread aware bit is set and the application running is not one indicated in the thread aware control value, then the breakpoint will be ignored and the core will continue doing what it was doing and debug will not be initialised.

In addition to controlling initialisation of monitoring functions, the capture of diagnostic data during a monitor function can also be controlled in a similar way. In order to do this the core must continue to consider both the control values, i.e. the enable bits stored in register CP14 and the conditions to which they relate during operation of the monitoring function.

FIG. 70 shows schematically granularity of a monitoring function while it is running. In this case region A relates to a region in which it is permissible to capture diagnostic data and region B relates to region in which control values stored in CP14 indicate that it is not possible to capture diagnostic data.

Thus, when debug is running and a program is operating in region A, diagnostic data is output in a step-by-step fashion during debug. When operation switches to Region B, where the capture of diagnostic data is not allowed, debug no longer proceeds in a step by step fashion, rather it proceeds atomically and no data is captured. This continues until operation of the program re-enters region A whereupon the capture of diagnostic data starts again and debug continues running in a step-by-step fashion.

In the above embodiment, if secure domain is not enabled, a SMI instruction is always seen as an atomic event and the capture of diagnostic data is suppressed.

Furthermore, if the thread aware initialisation bit is set then granularity of the monitoring function during operation with respect to application also occurs.

With regard to observable debug or trace, this is done by ETM and is entirely independent of debug. When trace is enabled ETM works as usual and when it is disabled, ETM hides trace in the secure world, or part of the secure world depending on the granularity chosen. One way to avoid ETM capturing and tracing diagnostic data in the secure domain when this is not enabled is to stall ETM when the S-bit is high. This can be done by combining the S-bit with the ETMPWR-DOWN signal, so that the ETM values are held at their last values when the core enters secure world. The ETM should thus trace a SMI instruction and then be stalled until the core returns to non-secure world. Thus, the ETM would only see non-secure activity.

A summary of some of the different monitoring functions and their granularity is given below.

Intrusive Debug at Board Stage

At board stage when the JSDAEN pin is not tied, there is the ability to enable debug everywhere before starting any boot session. Similarly, if we are in secure supervisor mode we have similar rights.

If we initialise debug in halt debug mode all registers are accessible (non-secure and secure register banks) and the whole memory can be dumped, except the bits dedicated to control debug.

Debug halt mode can be entered from whatever mode and from whatever domain. Breakpoints and watchpoints can be set in secure or in non-secure memory. In debug state, it is possible to enter secure world by simply changing the S bit via an MCR instruction.

As debug mode can be entered when secure exceptions occur, the vector trap register is extended with new bits which are;

SMI vector trapping enable
Secure data abort vector trapping enable
Secure prefetch abort vector trapping enable
Secure undefined vector trapping enable.

In monitor debug mode, if we allow debug everywhere, even when an SMI is called in non-secure world, it is possible to enter secure world in step-by-step debug. When a breakpoint occurs in secure domain, the secure abort handler is operable to dump secure register bank and secure memory.

The two abort handlers in secure and in non-secure world give their information to the debugger application so that debugger window (on the associated debug controlling PC) can show the register state in both secure and non-secure worlds.

FIG. 71A shows what happens when the core is configured in monitor debug mode and debug is enabled in secure world. FIG. 71B shows what happens when the core is configured in monitor debug mode and the debug is disabled in secure world. This later process will be described below.

Intrusive Debug at Production Stage

In production stage when JSDAEN is tied and debug is restricted to non-secure world, unless the secure supervisor determines otherwise, then the table shown in FIG. 71B shows what happens. In this case SMI should always be considered as an atomic instruction, so that secure functions are always finished before entering debug state.

Entering debug halt mode is subject to the following restrictions:

External debug request or internal debug request is taken into account in non-secure world only. If EDBGRQ (external debug request) is asserted while in secure world, the core enters debug halt mode once secure function is terminated and the core is returned in non-secure world.

Programming a breakpoint or watchpoint on secure memory has no effect and the core is not stopped when the programmed address matches.

Vector Trap Register (details of this are given below) concerns non-secure exceptions only. All extended trapping enable bits explained before have no effect.

Once in halt debug mode the following restrictions apply:

S bit cannot be changed to force secure world entry, unless secure debug is enabled.

Mode bits can not be changed if debug is permitted in secure supervisor mode only.

Dedicated bits that control secure debug cannot be changed.

If a SMI is loaded and executed (with system speed access), the core re-enters debug state only when secure function is completely executed.

In monitor debug mode because monitoring cannot occur in secure world, the secure abort handler does not need to support a debug monitor programme. In non secure world, step-by-step is possible but whenever an SMI is executed secure function is executed entirely in other words an XWSI only "step-over" is allowed while "step-in" and "step-over" are possible on all other instructions. XWSI is thus considered an atomic instruction.

Once secure debug is disabled, we have the following restrictions:

Before entering monitor mode:

Breakpoints and watchpoints are only taken into account in non-secure world. If bit S is set, breakpoints/watchpoints are bypassed. Note that watchpoints units are also accessible with MCR/MRC (CP14) which is not a security issue as breakpoint/watchpoint has no effect in secure memory.

BKPT are normally used to replace the instruction on which breakpoint is set. This supposes to overwrite this instruction in memory by BKPT instruction, which will be possible only in non-secure mode.

Vector Trap Register concerns non-secure exceptions only. All extended trapping enable bits explained before have no effect. Data abort and Pre-fetch abort enable bits should be disabled to avoid the processor being forced in to an unrecoverable state.

Via JTAG, we have the same restrictions as for halt mode (S bit cannot be modified, etc)

Once in monitor mode (non-secure abort mode)

The non-secure abort handler can dump non-secure world and has no visibility on secure banked registers as well as secure memory.

Executes secure functions with atomic SMI instruction

S bit cannot be changed to force secure world entry.

Mode bits can not be changed if debug is permitted in secure supervisor mode only.

Note that if an external debug request (EDBGRQ) occurs,
In non-secure world, the core terminates the current instruction and enters then immediately debug state (in halt mode).

In secure world, the core terminates the current function and enters the Debug State when it has returned in non-secure world.

The new debug requirements imply some modifications in core hardware. The S bit must be carefully controlled, and the secure bit must not be inserted in a scan chain for security reason.

In summary, in debug, mode bits can be altered only if debug is enabled in secure supervisor mode. It will prevent anybody that has access to debug in the secure domain to have access to all secure world by altering the system (modifying TBL entries, etc). In that way each thread can debug its own code, and only its own code. The secure kernel must be kept safe. Thus when entering debug while the core is running in non-secure world, mode bits can only be altered as before.

Embodiments of the technique use a new vector trap register. If one of the bits in this register is set high and the corresponding vector triggers, the processor enters debug state as if a breakpoint has been set on an instruction fetch from the relevant exception vector. The behaviour of these bits may be different according to the value of 'Debug in Secure world Enable' bit in debug control register.

The new vector trap register comprises the following bits: D_s_abort, P_s_abort, S_undef, SMI, FIQ, IRQ, Unaligned, D_abort, P_abort, SWI and Undef.

D_s_abort bit: should only be set when debug is enabled in secure world and when debug is configured in halt debug mode. In monitor debug mode, this bit should never bit set. If debug in secure world is disabled, this bit has no effect whatever its value.

P_s_abort bit: same as D_s_abort bit.

S_undef bit: should only be set when debug is enable in secure world. If debug in secure world is disabled, this bit has no effect whatever its value is.

SMI bit: should only be set when debug is enabled in secure world. If debug in secure world is disabled, this bit has no effect whatever its value is.

FIQ, IRQ, D_abort, P_abort, SWI, undef bits: correspond to non-secure exceptions, so they are valid even if debug in secure world is disabled. Note that D_abort and P_abort should not be asserted high in monitor mode.

Reset bit: as we enter secure world when reset occurs, this bit is valid only when debug in secure world is enabled, otherwise it has no effect.

Although a particular embodiment of the invention has been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. A processor operable in a plurality of modes, and a plurality of domains, said plurality of domains comprising a first domain and a second domain, the processor comprising:
monitoring logic configured to perform a debug or trace function to monitor said processor and to capture diagnostic data in response to performing said debug or trace function;
a storage element configured to store at least one control parameter;
control logic configured to control said monitoring logic in dependence on said at least one control parameter and the domain in which said processor is operating to suppress capturing of diagnostic data relating to predetermined activities of said processor in said first domain while allowing capturing of diagnostic data relating to predetermined activities of said processor in said second domain.

2. A processor according to claim 1, wherein the first domain is a secure domain and the second domain is a non-secure domain, said processor being configured such that when executing a program in a secure mode within said secure domain said program has access to secure data which is not accessible when said processor is operating in a non-secure mode within said non-secure domain.

3. A processor according to claim 1, wherein the at least one control parameter provides an indication of said domain of operation of the processor, said control logic being configured to suppress capturing of diagnostic data when said processor switches from second to first domain.

4. A processor according to claim 1, wherein said at least one control parameter identifies an application, said control logic being configured to suppress capturing of diagnostic data when said processor switches from an identified application in said first domain to an application in said first domain not identified by said at least one control parameter.

5. A processor according to claim 1, wherein said first domain comprises a plurality of modes and said at least one control parameter identifies a particular mode within said first domain, said control logic being configured to suppress capturing of diagnostic data when said processor switches between an identified mode within said first domain and a mode within said first domain not identified by said at least one control parameter.

6. A processor according to claim 5, wherein said plurality of modes in said first domain comprise a user mode and a privileged mode.

7. A processor according to claim 1, wherein said control logic is configured to control said monitoring logic to resume capturing of diagnostic data when said processor switches back from said predetermined activity to an activity for which capturing of diagnostic data is not suppressed.

8. A processor according to claim 1, wherein said control logic suppresses capture of said diagnostic data by removing power input to the monitoring logic.

9. A method of controlling a debug or trace function for monitoring a processor and capturing diagnostic data from said processor, said processor being operable in a plurality of modes and a plurality of domains, said plurality of domains comprising a first domain and a second domain, the method comprising:
setting a control parameter indicative of whether capturing of diagnostic data is allowable;
monitoring said processor to capture diagnostic data;
suppressing capturing of diagnostic data relating to predetermined activities of said processor in said first domain while allowing capturing of diagnostic data relating to predetermined activities of said processor in said second domain in dependence on said control parameter.

10. A method according to claim 9, wherein said first domain comprises a secure domain and said second domain comprises a non-secure domain, said processor being operable such that when executing a program in a secure mode within said secure domain said program has access to secure data which is not accessible when said processor is operating in a non-secure mode within said non-secure domain.

11. A method according to claim 9, wherein said at least one control parameter provides an indication of the domain of operation of said processor, data capture being suppressed when said processor switches operation from second to first domain.

12. A method according to claim 9, wherein said at least one control parameter identifies an application, diagnostic data capture being suppressed when operation of said processor switches from an identified application in said first domain to an application in said first domain not identified by said at least one control parameter.

13. A method according to claim 9, wherein said first domain comprises a plurality of modes and said at least one control parameter identifies a particular mode within said first domain, capturing of diagnostic data being suppressed when said processor switches between an identified mode within said first domain and a mode within said first domain not identified by said at least one control parameter.

14. A method according to claim 13, wherein said plurality of modes in said first domain comprise a user mode and a privileged mode.

15. A method according to claim 9, comprising the further step of:

resuming capturing of diagnostic data when said processor switches back from said predetermined activity to an activity for which capturing of diagnostic data is not suppressed.

* * * * *